United States Patent
Miura et al.

(10) Patent No.: US 11,086,418 B2
(45) Date of Patent: Aug. 10, 2021

(54) METHOD AND SYSTEM FOR PROVIDING INPUT TO A DEVICE

(71) Applicant: DOUZEN, INC., San Francisco, CA (US)

(72) Inventors: Kentaro Miura, San Francisco, CA (US); Julian Orbanes, Arlington, MA (US)

(73) Assignee: DOUZEN, INC., San Francisco, CA (US)

( * ) Notice: Subject to any disclaimer, the term of this patent is extended or adjusted under 35 U.S.C. 154(b) by 0 days.

(21) Appl. No.: 15/396,138

(22) Filed: Dec. 30, 2016

(65) Prior Publication Data

US 2017/0228048 A1    Aug. 10, 2017

Related U.S. Application Data

(63) Continuation-in-part of application No. 29/553,799, filed on Feb. 4, 2016, now Pat. No. Des. 866,553.

(51) Int. Cl.
| | |
|---|---|
| *G06F 3/0362* | (2013.01) |
| *G06F 3/0485* | (2013.01) |
| *G06F 3/0483* | (2013.01) |
| *G06F 3/023* | (2006.01) |
| *G06F 3/0481* | (2013.01) |
| *G06F 3/0482* | (2013.01) |
| *G06F 3/0484* | (2013.01) |

(52) U.S. Cl.
CPC .......... *G06F 3/0362* (2013.01); *G06F 3/0236* (2013.01); *G06F 3/0481* (2013.01); *G06F 3/0482* (2013.01); *G06F 3/0483* (2013.01); *G06F 3/0485* (2013.01); *G06F 3/04847* (2013.01)

(58) Field of Classification Search
CPC .... G06F 3/0362; G06F 3/0483; G06F 3/0236; G06F 3/0481; G06F 3/0482; G06F 3/04847; G06F 3/0485
See application file for complete search history.

(56) References Cited

U.S. PATENT DOCUMENTS

| | | | |
|---|---|---|---|
| D112,545 S | 12/1938 | Younghusband | |
| D221,010 S | 6/1971 | Tavela | |
| 4,733,214 A * | 3/1988 | Andresen | G05G 5/06 324/207.24 |
| D299,140 S * | 12/1988 | Nakamura | D14/417 |
| D324,106 S | 2/1992 | Greenblatt | |
| 5,168,221 A * | 12/1992 | Houston | G01B 7/003 324/207.13 |
| 5,432,530 A * | 7/1995 | Arita | G05G 1/06 273/148 B |

(Continued)

OTHER PUBLICATIONS https://www.youtube.com/watch?v=28EJmEaNEgE; Cube Computer Channel, Dec. 30, 2011.*

(Continued)

*Primary Examiner* — Chad M Dicke
(74) *Attorney, Agent, or Firm* — David Lewis

(57) ABSTRACT

A control device is provided that is intended to be used for navigating between and within pages of a graphic user interface on a computer monitor. The top shell of the device is intended to rotated with respect to the bottom shell for scrolling and by pressing down on the top shell a selection can be made.

23 Claims, 64 Drawing Sheets

(56) References Cited

U.S. PATENT DOCUMENTS

| | | | |
|---|---|---|---|
| D361,558 S | 8/1995 | Siano, Jr. | |
| D361,559 S | 8/1995 | Siano, Jr. | |
| 5,491,497 A * | 2/1996 | Suzuki | G06F 3/0338 345/157 |
| 5,521,617 A * | 5/1996 | Imai | G06F 3/03549 345/157 |
| 5,565,891 A * | 10/1996 | Armstrong | G05G 9/04737 345/156 |
| D380,210 S | 6/1997 | Allana et al. | |
| D382,261 S * | 8/1997 | Kaneko | D14/417 |
| 5,706,027 A * | 1/1998 | Hilton | B25J 13/085 345/156 |
| 5,850,142 A * | 12/1998 | Rountos | G01D 5/145 324/207.2 |
| 5,943,233 A * | 8/1999 | Ebina | G06F 3/0304 250/221 |
| D430,358 S | 8/2000 | Papiernik | |
| 6,097,372 A * | 8/2000 | Suzuki | G06F 3/0312 345/162 |
| D432,130 S | 10/2000 | Smith et al. | |
| 6,126,561 A * | 10/2000 | Mark | A63B 67/14 473/588 |
| D434,038 S | 11/2000 | Ho | |
| 6,157,371 A * | 12/2000 | Smeets | G06F 3/0236 345/156 |
| D440,206 S | 4/2001 | Carroll et al. | |
| 6,225,980 B1 * | 5/2001 | Weiss | G06F 3/0362 345/156 |
| D465,733 S | 11/2002 | Hill | |
| D467,585 S | 12/2002 | Li | |
| D475,288 S | 6/2003 | Hoffmann et al. | |
| D487,450 S | 3/2004 | Hakoda | |
| 6,707,446 B2 * | 3/2004 | Nakamura | G06T 3/4084 345/157 |
| 6,727,889 B2 * | 4/2004 | Shaw | G06F 3/0338 345/161 |
| 6,738,043 B2 * | 5/2004 | Endo | G06F 3/0338 324/207.13 |
| D493,792 S | 8/2004 | Rueb et al. | |
| D494,591 S | 8/2004 | Rueb et al. | |
| D508,915 S | 8/2005 | Nejigaki | |
| D521,005 S | 5/2006 | Lin | |
| D534,536 S | 1/2007 | Matsuoka | |
| D541,228 S | 4/2007 | Thursfield | |
| 7,233,318 B1 * | 6/2007 | Farag | G06F 3/03543 345/163 |
| D555,651 S * | 11/2007 | Pascucci | D14/408 |
| D563,412 S | 3/2008 | Faurous | |
| D564,900 S | 3/2008 | Green | |
| D568,885 S | 5/2008 | Solland | |
| 7,409,635 B2 * | 8/2008 | Epstein | G06F 17/217 715/243 |
| 7,436,398 B2 * | 10/2008 | Yuasa | B60K 37/06 200/5 A |
| D579,937 S | 11/2008 | Cohen | |
| 7,474,296 B2 * | 1/2009 | Obermeyer | G05G 9/047 345/156 |
| D589,046 S * | 3/2009 | Pascucci | D14/408 |
| D602,915 S | 10/2009 | Song et al. | |
| D605,197 S | 12/2009 | Pascucci | |
| D612,245 S | 3/2010 | Canamasas Puigbo | |
| D624,543 S | 9/2010 | Kettula | |
| D624,917 S | 10/2010 | Andre | |
| D645,468 S * | 9/2011 | Skulina | D14/388 |
| D663,731 S | 7/2012 | Pajic | |
| D685,790 S | 7/2013 | Tang | |
| D692,547 S | 10/2013 | Wirz | |
| D696,298 S | 12/2013 | Britt, Jr. et al. | |
| D719,248 S | 12/2014 | Smith, Jr. et al. | |
| D731,579 S | 6/2015 | Bart et al. | |
| D732,033 S | 6/2015 | Sakaguchi | |
| D738,376 S | 9/2015 | Sakaguchi | |
| D747,984 S | 1/2016 | Zhao et al. | |
| D748,095 S | 1/2016 | Oikawa | |
| 9,261,984 B2 * | 2/2016 | Farag | G06F 3/03543 |
| 9,317,110 B2 * | 4/2016 | Lutnick | G07F 17/3209 |
| D758,557 S | 6/2016 | Jih | |
| D760,648 S | 7/2016 | Lee et al. | |
| D762,130 S | 7/2016 | Hays | |
| D762,132 S | 7/2016 | Hays | |
| D765,617 S | 9/2016 | Mackiewicz et al. | |
| D778,876 S | 2/2017 | Zhang | |
| 9,690,390 B2 * | 6/2017 | Olsson | G06F 3/0338 |
| 9,807,453 B2 * | 10/2017 | Wang | H04N 21/44008 |
| 10,088,913 B1 * | 10/2018 | Olsson | G06F 3/0338 |
| 10,095,463 B2 * | 10/2018 | Enzmann | H04M 1/7253 |
| 2001/0011997 A1 * | 8/2001 | Suzuki | G06F 3/03549 345/167 |
| 2002/0007377 A1 * | 1/2002 | Ogishi | G06F 3/0485 715/201 |
| 2002/0030665 A1 * | 3/2002 | Ano | G06F 1/1616 345/168 |
| 2002/0084986 A1 * | 7/2002 | Armstrong | |
| 2002/0122067 A1 * | 9/2002 | Geigel | G06F 17/30265 715/788 |
| 2003/0117370 A1 * | 6/2003 | Van Brocklin | G06F 1/169 345/156 |
| 2004/0080670 A1 * | 4/2004 | Cheatle | G06T 11/60 348/441 |
| 2004/0145565 A1 * | 7/2004 | Yang | G06F 1/169 345/163 |
| 2004/0150657 A1 * | 8/2004 | Wittenburg | G06F 3/04815 345/619 |
| 2004/0257339 A1 * | 12/2004 | Takahashi | G06F 3/0338 345/156 |
| 2005/0044485 A1 * | 2/2005 | Mondry | G06Q 10/043 715/247 |
| 2005/0149877 A1 * | 7/2005 | Rice | A61B 5/0059 715/764 |
| 2005/0210414 A1 * | 9/2005 | Angiulo | G06F 17/3089 715/838 |
| 2005/0257152 A1 * | 11/2005 | Shimizu | G11B 27/034 715/723 |
| 2005/0259077 A1 * | 11/2005 | Adams | G06F 3/0213 345/163 |
| 2006/0109283 A1 * | 5/2006 | Shipman | G06F 3/04815 345/629 |
| 2006/0271691 A1 * | 11/2006 | Jacobs | H04N 1/00132 709/228 |
| 2006/0274060 A1 * | 12/2006 | Ni | G06F 3/0482 345/419 |
| 2007/0106483 A1 * | 5/2007 | Kelley | G01P 15/0891 702/141 |
| 2007/0174790 A1 * | 7/2007 | Jing | G06F 16/54 715/838 |
| 2007/0226646 A1 * | 9/2007 | Nagiyama | G06F 3/016 715/784 |
| 2008/0001919 A1 * | 1/2008 | Pascucci | G05G 1/01 345/163 |
| 2008/0069480 A1 * | 3/2008 | Aarabi | G06F 17/30259 382/305 |
| 2008/0143670 A1 * | 6/2008 | Vayda | G06F 3/0234 345/156 |
| 2008/0189603 A1 * | 8/2008 | Kikuchi | G06F 17/248 715/243 |
| 2008/0256439 A1 * | 10/2008 | Boreham | G06F 17/211 715/246 |
| 2008/0256440 A1 * | 10/2008 | Boreham | G06F 17/211 715/247 |
| 2008/0279475 A1 * | 11/2008 | Lee | G06F 3/0481 382/276 |
| 2008/0300055 A1 * | 12/2008 | Lutnick | G07F 17/3209 463/39 |
| 2009/0071808 A1 * | 3/2009 | Kang | H01H 25/065 200/336 |
| 2009/0115749 A1 * | 5/2009 | Kim | G06F 3/03548 345/184 |
| 2009/0128507 A1 * | 5/2009 | Hoshino | G06F 3/016 345/173 |

(56) References Cited

U.S. PATENT DOCUMENTS

| | | | |
|---|---|---|---|
| 2009/0191893 A1* | 7/2009 | Smith | H04L 67/18 455/456.1 |
| 2009/0249196 A1* | 10/2009 | Yamaji | G06F 17/211 715/243 |
| 2009/0295713 A1* | 12/2009 | Piot | G06F 3/0346 345/156 |
| 2009/0327872 A1* | 12/2009 | Kamiyama | G06F 17/24 715/243 |
| 2010/0194863 A1* | 8/2010 | Lopes | G06T 7/12 348/50 |
| 2011/0084904 A1* | 4/2011 | Tan | G06F 3/0238 345/163 |
| 2011/0137727 A1* | 6/2011 | Chung | G06F 3/0346 705/14.55 |
| 2011/0157192 A1* | 6/2011 | Gong | H04N 19/98 345/505 |
| 2011/0164066 A1* | 7/2011 | Beals | G06F 1/1626 345/685 |
| 2011/0181617 A1* | 7/2011 | Tsuda | G06F 3/0481 345/619 |
| 2011/0234480 A1* | 9/2011 | Fino | G11B 27/34 345/156 |
| 2011/0235109 A1* | 9/2011 | Yamaguchi | G03G 15/502 358/1.15 |
| 2011/0246929 A1* | 10/2011 | Jones | G06F 3/04883 715/777 |
| 2012/0047462 A1* | 2/2012 | Moon | H04N 5/45 715/810 |
| 2012/0179960 A1* | 7/2012 | Cok | H04N 1/00164 715/243 |
| 2012/0188161 A1 | 7/2012 | Shih et al. | |
| 2012/0198384 A1* | 8/2012 | Kumamoto | G06F 3/04855 715/786 |
| 2012/0206496 A1* | 8/2012 | Cok | G06Q 10/00 345/672 |
| 2012/0210266 A1* | 8/2012 | Jiang | H04N 21/233 715/772 |
| 2012/0223966 A1* | 9/2012 | Lim | G06F 3/011 345/633 |
| 2012/0226971 A1* | 9/2012 | Tocchini | G06F 17/30905 715/234 |
| 2013/0040696 A1* | 2/2013 | Forstall | G06F 3/038 455/550.1 |
| 2013/0055055 A1* | 2/2013 | Turcotte | G06F 9/4443 715/201 |
| 2013/0063344 A1* | 3/2013 | Obermuller | G06F 1/1694 345/156 |
| 2013/0212504 A1* | 8/2013 | Zalewski | G06F 1/1626 715/765 |
| 2013/0276030 A1* | 10/2013 | Fujimoto | G06F 3/0482 725/40 |
| 2014/0006948 A1* | 1/2014 | Yang | G11B 19/025 715/716 |
| 2014/0026039 A1* | 1/2014 | Lundgren | G06F 17/212 715/244 |
| 2014/0108012 A1* | 4/2014 | Reichardt | G11B 27/105 704/246 |
| 2014/0139466 A1* | 5/2014 | Sakaguchi | G06F 3/011 345/173 |
| 2014/0258849 A1* | 9/2014 | Chung | G06F 17/212 715/243 |
| 2015/0277690 A1* | 10/2015 | Fujiwara | G06F 3/0485 715/784 |
| 2015/0286295 A1* | 10/2015 | Pepe | G06F 3/0362 345/163 |
| 2016/0037157 A1* | 2/2016 | Kim | G09G 5/00 348/54 |
| 2016/0154464 A1* | 6/2016 | Croisonnier | G06F 3/017 345/168 |
| 2016/0154481 A1* | 6/2016 | Sallas | G06F 3/0383 345/157 |
| 2016/0248993 A1* | 8/2016 | Sato | H04N 5/2628 |
| 2016/0334952 A1* | 11/2016 | Jia | G06F 3/04817 |
| 2017/0153700 A1 | 6/2017 | Kondo | |
| 2018/0117458 A1* | 5/2018 | Andersson | A63F 13/24 |

OTHER PUBLICATIONS https://www.youtube.com/watch?v=LbuUvVe_Gqc (Year: 2015).*
https://web.archive.org/web/20150316041043/https://smallbusiness.chron.com/use-usbtousb-connect-laptop-tv-59625.html (Year: 2015).*
https://lifehacker.com/use-ctrl-mouse-wheel-to-zoom-and-change-view-types-in-e-5617898 (Year: 2010).*
Turecky; 2012; https://www.youtube.com/watch?v=i84T37SA6_w.*
U.S. Appl. No. 29/553,799, filed Feb. 4, 2016, Kentaro Miura.
Title: Hale Orb—The NEW Way to Share Photos and Videos | Hi-tech chic URL: https://www.hi-techchic.com/hale-orb-the-new-way-to-share-photos-and-videos/ Date: Posted on Jun. 1, 2017 ; 6 Pages.
Title: Mono and Stereo High-End Audion Magazine: Encore 7 remote contro URL: http://www.monoandstero.com/2014/04/encore-7-remote-control.html Date: Posted on Apr. 2014; 9 Pages.
Title: New Jupiter Mouse Accelerometer: Less, But Better. URL: https://phys.org/news/200/3-11-jupiter-mouse-accelerometer.html Date: Posted Nov. 10, 2008; 3 Pages.
Title: This Spherical Gadget Will Bless Your Computer with Wireless AC Speeds—Mikeshouts URL: https://mikeshouts.com/d-link-ac1900-ultra-wifi-usb-adapter-dwa-192/ Date: Posted Jul. 30, 2015; 5 Pages.

* cited by examiner

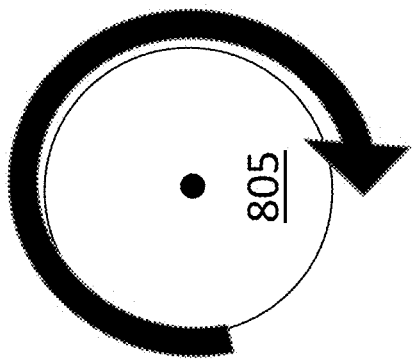
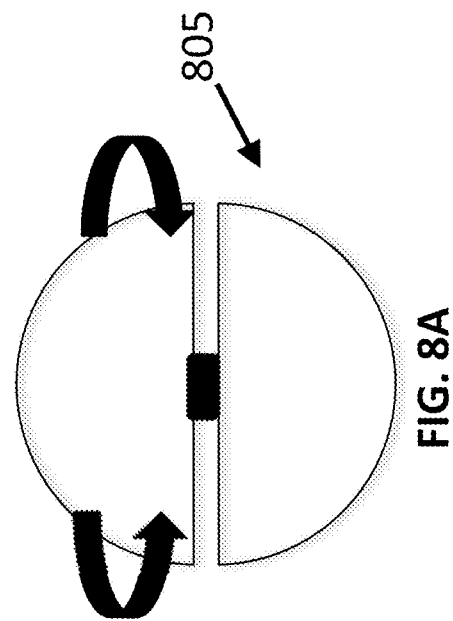
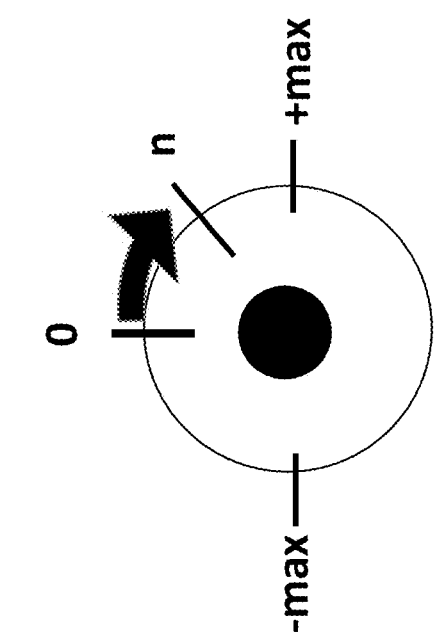
FIG. 8B
FIG. 8A
FIG. 8C

| | Rotate (left/right) (R) behavior | Press (tap) (a) Transition Toggle (R) and (M) | Long-press (b) and (c) Transition To calendar view | Rotate while Pressing (C) calendar View Behavior |
|---|---|---|---|---|
| 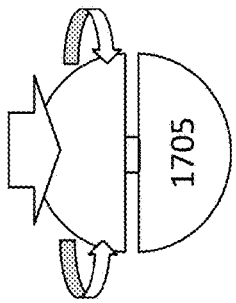 | | | | |
| 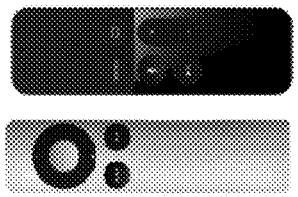 | Left/Right | Tap or double tap center button | Long press button or double tap to switch the view mode | Left/Right (after switching view mode) |
|  | Swipe (in air) Left/Right | A "selection" action Like form a fist or raising han | Distinctive motion like circle or making a fist to switch view | Swipe left/right After switching view |

FIG. 17

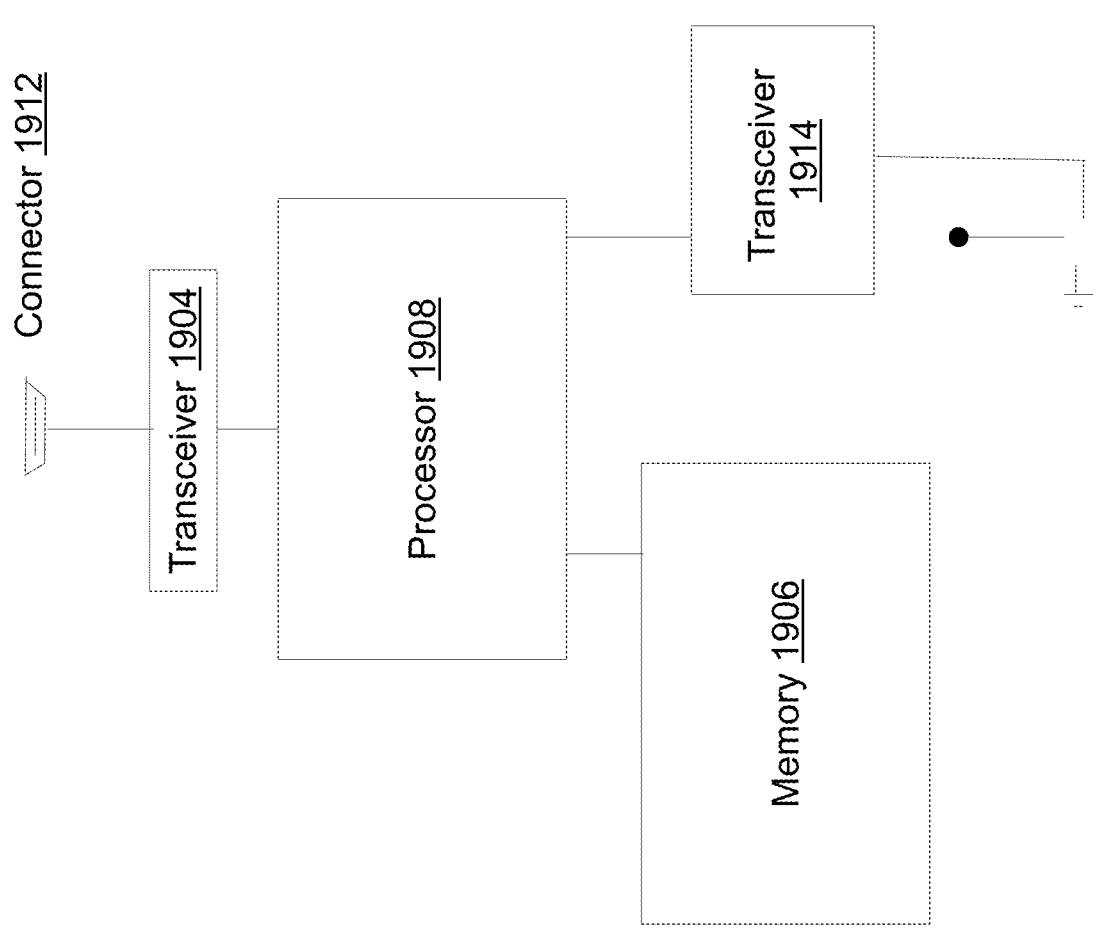

METHOD AND SYSTEM FOR PROVIDING INPUT TO A DEVICE

CROSS REFERENCE TO RELATED APPLICATIONS

This application is a continuation-in-part of U.S. Design patent application Ser. No. 29/553,799, filed Feb. 4, 2016, by Kentaro Miura, entitled "INPUT DEVICE," and which is incorporated herein, by reference, in its entirety.

FIELD

This specification generally relates to a control device.

BACKGROUND

The subject matter discussed in the background section should not be assumed to be prior art merely as a result of its mention in the background section. Similarly, a problem and the understanding of the causes of a problem mentioned in the background section or associated with the subject matter of the background section should not be assumed to have been previously recognized in the prior art. The subject matter in the background section may merely represents different approaches, which in and of themselves may also be inventions.

There are many input devices on the market that can be used with a variety of screens and Graphical User Interfaces (GUIs).

SUMMARY

A system for viewing images includes a control device via which the user navigates between and within pages on a computer monitor. In this specification, the terms image, picture, block, and photo are used interchangeably and may be substituted one for another to obtain different embodiments. The term block is used to refer to a location set aside for content such as one or more images or pictures. A block that contains a picture (or image) may not necessarily have same aspect ratio of the picture, but may crop some of the picture. The top portion of the device is intended to rotated with respect to the bottom portion for scrolling and by pressing down on the top portion a selection can be made. The control device may be a wireless input device.

A method and device for a wireless user input device to control, navigate, and view digital images displayed on a large screen. The system includes a highly fluid and animated user interface and content visualization is provided.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

FIG. 2B shows the device of FIG. 2A being pushed down.

FIG. 8A shows a diagram of an embodiment of an input device being rotated.

FIG. 8B shows a top view of an embodiment of an input device being rotated.

FIG. 8C shows a side view representation of an embodiment of an input device being rotated from the top of the device.

FIG. 17 shows a diagram of comparing the actions that the user makes with a wireless input device compared to the actions the user makes with other devices, to accomplish the same or a similar result.

FIG. 19A shows a block diagram of an embodiment of a computer used by the input device to communicate with a GUI on a screen of a display device.

DETAILED DESCRIPTION

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

In general, at the beginning of the discussion of each of FIGS. 1-7, 18-19 is a brief description of each element, which may have no more than the name of each of the elements in the one of FIGS. 1-7, 18-19 that is being discussed. After the brief description of each element, each element is further discussed in numerical order. In general, each of FIGS. 1-44 is discussed in numerical order and the elements within FIGS. 1-28 are also usually discussed in numerical order to facilitate easily locating the discussion of a particular element. Nonetheless, there is no one location where all of the information of any element of FIGS. 1-44 is necessarily located. Unique information about any particular element or any other aspect of any of FIGS. 1-44 may be found in, or implied by, any part of the specification.

In various places in discussing the drawings a range of letters, such as "a-f" are used to refer to individual elements of various series of elements that are the same. In each of these series, the ending letters are integer variables that can be any number. Unless indicated otherwise, the number of elements in each of these series is unrelated to the number of elements in others of these series. Specifically, even though one letter (e.g. "f") comes earlier in the alphabet than another letter (e.g., "c"), the order of these letters in the alphabet does not mean that the earlier letter represents a smaller number. The value of the earlier letter is unrelated to the later letter, and may represent a value that is greater the same or less than the later letter.

Figure 1:
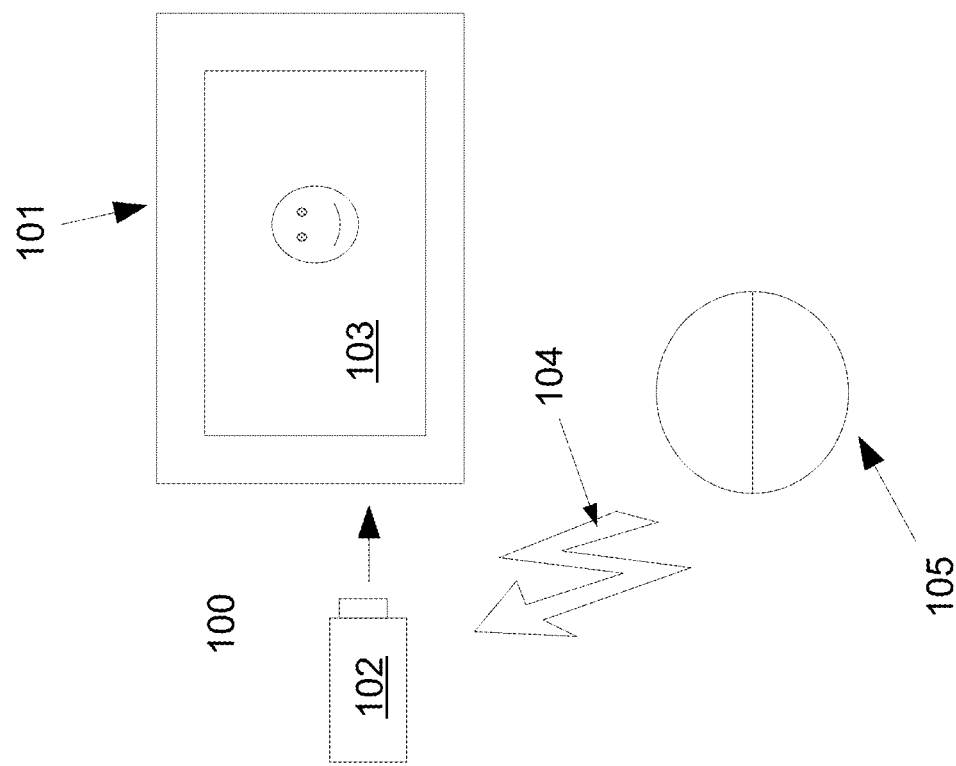
FIG. 1 shows a block diagram of an embodiment of an input device system.

FIG. 1 shows a diagram of an embodiment of a system 100 for the use of the input device. The system may include a screen 101, a computer 102, a viewing area 103, a wireless connection 104 and an input device 105. In other embodiments the system 100 may not have all of the elements or features listed and/or may have other elements or features instead of or in addition to those listed.

The system 100 is a system for controlling, navigating, and viewing digital images displayed on a screen with highly fluid and animated user interface and content visualization. The system allows the user to manipulate the digital images using a wireless device. The system allows a wireless user input device 105 to control, navigate, and view digital images displayed on a user interface, such as a television screen with a highly fluid and animated user interface and content visualization. In other words, when the user moves the input device, the screenshots on the user interface move fluidly from one screen or photograph to the next. Further, when choosing a new screen or photograph, the images on the screen morph into the final state (e.g., filling the screen). The transitions between screens and the transitions when a particular view or photograph/image is chosen are smooth and fluid. The term "morph" refers to the continuous resizing, reshaping, rearranging, fading in, and/or fading out of block within a viewing area that are performed when transitioning from one layout of blocks to another layout of blocks (as opposed to a sudden change of the content in the viewing area, such as a jump in position or size of an image).

The combination of the device to wirelessly control content on a large screen such as the home television is unique. Hence it is the unique combination of a physical input device 105, which is wirelessly connected to a High-Definition Multimedia Interface- (HDMI) based stick computer that is physically attached to the screen (TV) and wirelessly connected to the internet via Wi-Fi and cellular connection, and the expression of graphical user interface (GUI) that reacts to the motion of the user input device, that is notable.

The screen 101 can be the screen of any display device, running a user interface (GUI, graphical user interface) that can display digital images. The screen can be a computer screen, a television screen, monitor, or a projection screen, for example. The screen can be a monitor including a CRT (Cathode Ray Tube), LCD (Liquid Crystal Display), or LED (Light-Emitting Diodes) monitor, which may be associated with a TV. The TV screen can be a plasma, LCD, LED, OLED screen. In some embodiments, the screen is a typical television screen that can be found in any home. Alternatively, the screen 101 may be associated with a personal computer, laptop computer, or smart phone, for example.

The computer 102 may run and store the software that allows the input device to manipulate the images on the screen. The software included in computer 102, converts signals generated by the movement of the input device 105 to control signals that cause the television to navigate between images being displayed and/or manipulate the images effecting the movement of the pictures, objects, photographs, or any type of digital images. Throughout this specification the terms "object," "photograph," "picture," and "digital image" are used interchangeably, and may be substituted one for the other to obtain different embodiments. The computer 102 may be an HDMI stick computer. The computer 102 may be a small sick-based computer physically attached to the screen that drives the application with its commuting resources. Instead of a stick shape, the computer could also be in the form of a set top box with cables attached to the screen. In an embodiment, computer 102 may have a form factor of remote control device or a thumb drive, for example.

The viewing area 103 may be associated with a user interface that allows the user to interact with the images on the screen 101. The viewing area 103 is the area in which the photos or other images associated with the system are displayed. If screen 101 is the screen of a computer, viewing area may be a window or display area of a browser. The viewing area 103 may be associated with a user interface that may include a regular/multiple/calendar view, which may make browsing very intuitive, instead of relying on a complex folder structure. For example, when in one view, such as the multiple view, the user simply taps on the device (pushes down on the top shell) to transition to the regular view, rather than browsing through one or more folders. The ability of the user interface to sift through photographs and video content by rotating a physical wheel (the input device 105) is unique. The user interface dynamically transitions the sizes and layout of the images on the screen in a smooth and connected and animated manner, the user never loses context of the correlation between the movement of the images on the user interface based on the rotation, pushing, and rotation while pushing of the input device 105. The correlation between movement of the images on the user interface and the rotation of the top shell of the input device (as well as other manipulations of the input device) results in a very intuitive experience for the user. For example, the user turns the top shell to move right and left and pushes down on the top shell to transition to other views based on what image is in the center of the screen.

In an embodiment, the user interface includes a tool, via which the photographs and/or video can be fetched from the internet being displayed. The movement and size of the images are manipulated by the input device 105, via the user interface.

The wireless connection 104 to the internet may be via Wi-Fi or Bluetooth. In some embodiments, the wireless connection may be via a cellular telephone network.

The input device 105 manipulates the digital images on the screen remotely. The input device 105 sends commands and voice data wirelessly in a digital format to connect to the commuter attached to the screen. The input is used to control the application displayed on the screen (the user interface). The input device 105 is a handheld control device that includes a top shell, a bottom shell, and a button between the top shell and the bottom shell. The top shell can be moved clockwise or counterclockwise by the user. The top shell of the user input device 105 can be pushed down toward the bottom shell to allow the user to choose an image or a view in the graphical user interface. Other movements and combinations will be explained in association with the functions of the input device 105. For example, pressing the button down and holding for longer than the pre-determined threshold time may result in the objects being displayed in a different view (e.g., a calendar view). The rotation of the top shell and either the speed of rotation or the angle of the rotation or both may determine the speed of the movement of the objects displayed on the screen.

In at least one embodiment, the input device 105 includes sensors that are connected to the button and/or shell for detecting movement of the shell rotationally, the amount of movement, movement of pushing the shell down (activating a button), the amount of movement of the button and/or the amount of time the button is pressed down, and/or motion sensors (e.g., accelerometers) that may detect large movements of the device.

The input device 105 is wirelessly connected to the screen and the user interface. The input device 105 remotely controls the images provided by the user interface 103. The wireless device 105 functions such that, upon the user physically rotating the top of the wireless device 105, the plurality of the objects (including the digital photographic images) moves in accordance with the speed of the rotation of the device to the right or left.

FIGS. 2A and 2B are diagrams of an embodiment of an input device 205 showing how the gap is reduced when a user pushes down on the top shell of the input device 205. FIG. 2A shows a diagram of an embodiment of a input device 205 from the side. The input device 205 may include a top shell 210, a gap 230, a bottom shell 280 and a base 285. In other embodiments the input device 205 may not have all of the elements or features listed and/or may have other elements or features instead of or in addition to those listed.

The input device 205 may be an embodiment of input device 105 in FIG. 1.

The top shell 210 is that top portion of the housing that retains and/or supports the mechanical and electronic components within the input device 205. In at least one embodiment, the top shell 210 is a hemisphere (or half) of a sphere. The top shell 210 fits onto the bottom shell with a gap between the top shell 210 and the bottom shell. The top shell 210 may be constructed of a material that is protective of the components inside (e.g., a hard plastic). In at least one embodiment the top shell 210 is constructed of a material that is resistant to breakage if dropped.

The gap 230 is a space between the top shell 210 and the bottom shell that allows movement of the top shell toward and away from the bottom shell when the button is pushed. The gap 230 indicates whether the button has been pushed. In at last one embodiment, the gap 230 may include a light. The light and/or the color of the light may indicate the mode in which the input device 205 is in. For example, what the button is clicked (and has be pushed past the threshold), the mode of the input device 205 may change and the light may illuminate. In some embodiments, the light turns on when the button has been activated—when the top has been pushed down enough past a threshold amount that the button has been clicked. In some embodiments, the pushing down may also be accompanied by a clicking sound that indicated the button has been pushed.

The bottom shell 280 is the bottom part of the housing that includes the top shell and the bottom shell. The outside of the bottom shell 280 may be constructed similarly to the top shell 210 in order for the two shells to fit together. In some embodiments, the bottom shell includes a base (e.g., a flat portion) that allows the user to set the input device 205 on a surface (e.g., a table).

The base 285 is a flat portion of the bottom shell 280 that allows the user to set the device on a surface. In some embodiments, the input device 205 does not have a base 285.

The input device 205 may also include one or more external buttons that allow the user to turn the input device 205 off. Alternatively or additionally, the external button any turn the screen off, turn the GUI off, cause the user to exit the application, etc. The input device 205 may include one or more ports that allow the user to attach a plug for charging the batteries. The plug may allow for use of a wall outlet for charging the batteries. In alternative embodiments, input device 205 includes a USB port, and the plug includes a USB connector that connects to and allows for use with a USB port for charging the batteries.

FIG. 2B shows the input device 205 of FIG. 2A being pushed down reducing the size of the gap 230. In other embodiments the device 205 may not have all of the elements or features listed and/or may have other elements or features instead of or in addition to those listed.

In FIG. 2B, the top shell 210 is shown being pushed down to activate a button on the inside of the device. When the top shell 210 is pushed down, the size of the gap 230 is reduced. In some embodiments, the amount that the size of the gap is reduced may be used for different functions. In some embodiments, the button includes one or more springs that keep the button in a position such that the gap is open (see FIG. 2A). When the button is pushed, when the top shell is pushed down, the gap is reduced or closed and the button is activated or clicked.

In at least one embodiment, pushing the top shell down activates a button. The button is inside the input device 205, so it is not shown in the FIG. 2 (see 455 in FIG. 4 for an embodiment of the button)

Although the movement is not shown in FIGS. 2A and 2B, the top shell can also be rotated clockwise or counterclockwise to perform other functions. The rotation of the device will be discussed more with respect to FIGS. 8-9. In some embodiments, the combination of pushing the button and rotating the top shell can be detected by sensors in the input device 205 and different operations can be activated based on which combination is chosen.

Figure 2:
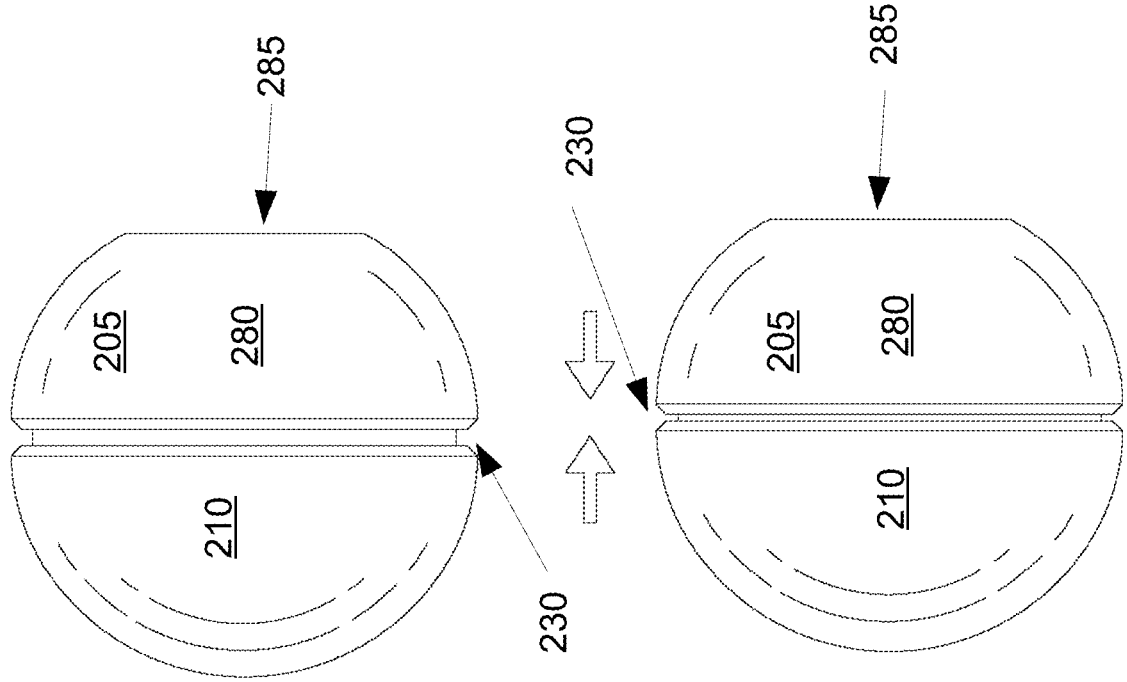
FIGS. 2A and 2B show front views of an embodiment of an input device.
Figure 3:
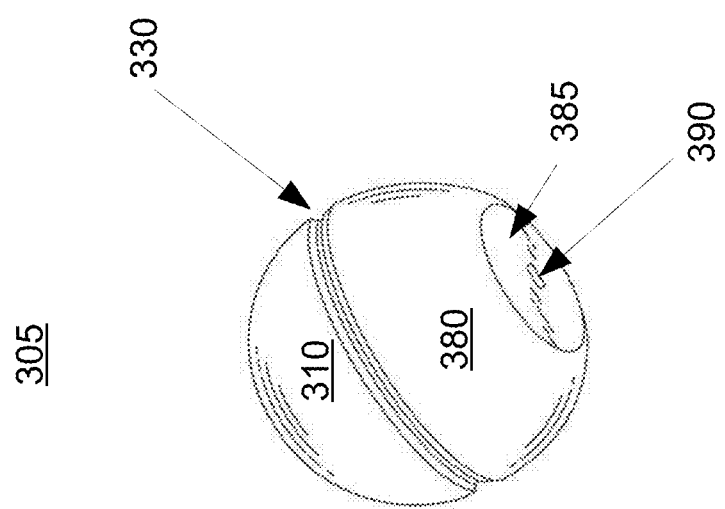
FIG. 3 shows a perspective view of an embodiment of an input device.

FIG. 3 shows a perspective diagram of an embodiment of a input device 305 from an angle showing the side and bottom of the input device. The device 305 may include a top shell 310, a gap 330, a bottom shell 380, a base 385, and a port 390. In other embodiments the device 305 may not have all of the elements or features listed and/or may have other elements or features instead of or in addition to those listed. Input device 305, top shell 310, gap 330, bottom shell 380, and base 385 may be embodiments of input device, 205, top shell 210, gap 230, bottom shell 280, and base 285, which were discussed in conjunction with FIG. 2.

Port 390 may be any type of port that allows attachment of an electrical cord to recharge the batteries. Port 390 may be a USB port. Although port is shown located on the base 395 of the input device 305, port 390 may be placed anywhere on the input device 305 such as the bottom shell, and/or the top shell.

Figure 4A:
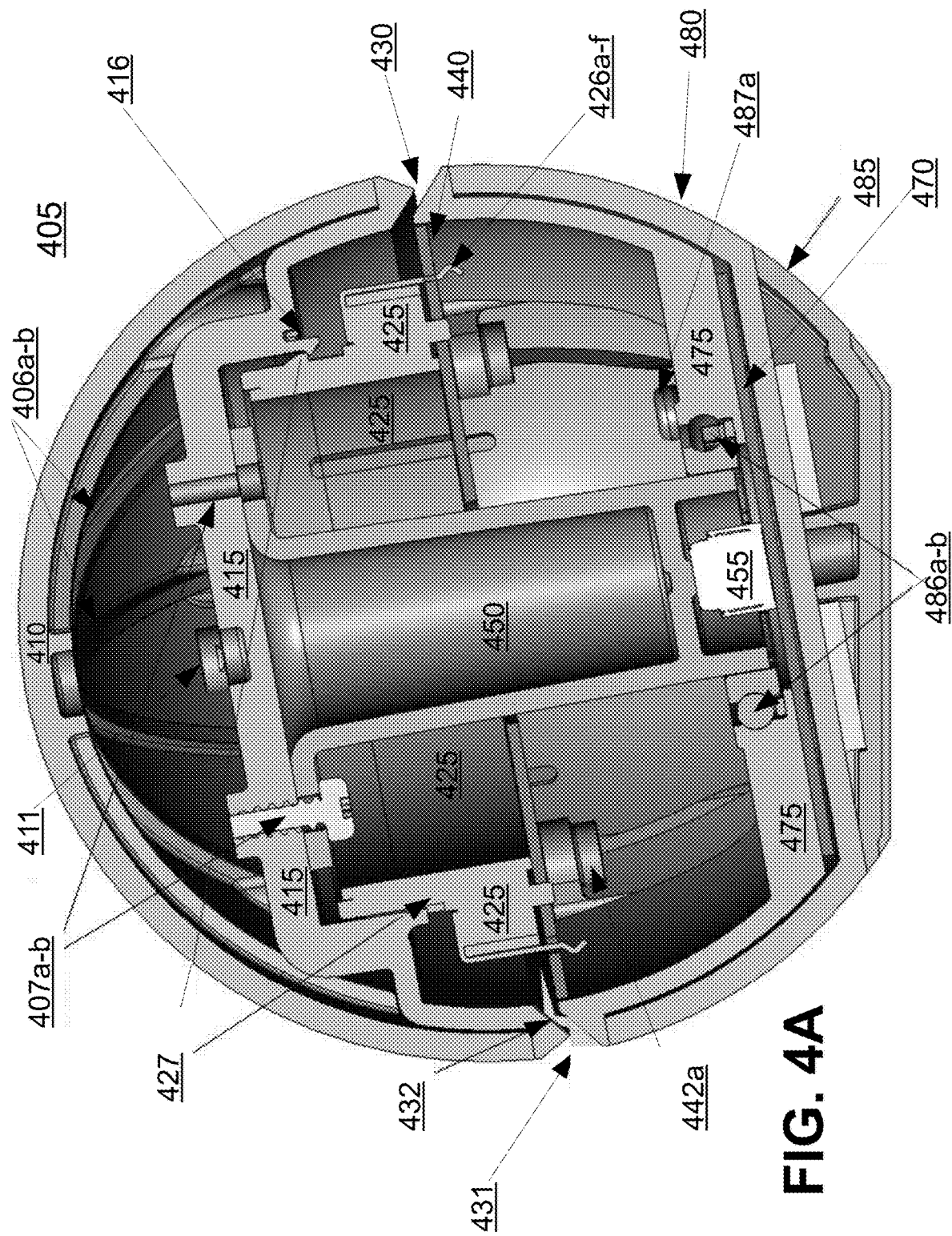
FIGS. 4A and 4B show cross sections of an embodiment of the input device.
Figure 4B:
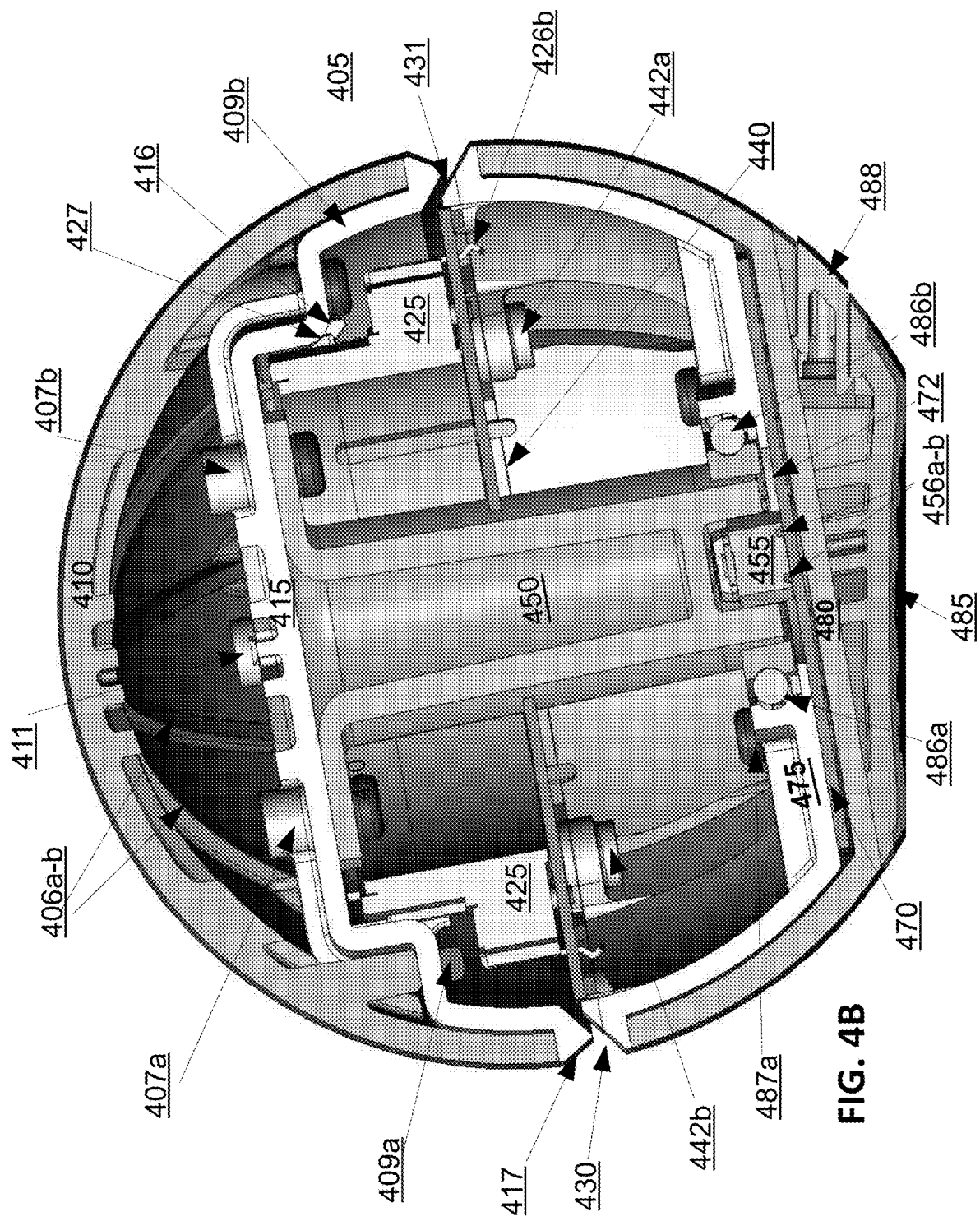

FIGS. 4A and 4B show cross sectional diagrams of two embodiments of the inside of input devices 405. FIG. 4A shows a cross section diagram of the inside of an embodiment of an input device 405 cut down the center (showing 50% of the device.). The device 405 may include, ribs 406a-b, top screws 407a-b, shell screws 409a-b, a top shell 410, screw cap 411, top inner shell 415, a top inner shell protuberance 416, top inner shell lip 417a and b, an encoder 425, encoder tabs 426a, an encoder protuberance 427, a gap 430, one or more lights 431, one or more light diffusers 432, a top plate 440, device screw wells 442a-b, center post 450, button 455, bottom plate 470, bottom inner shell 475, a bottom shell 480, a base 485, ball bearing 486a, bottom shell screw well 487a, and on/off button 488. In other embodiments the device 405 may not have all of the elements or features listed and/or may have other elements or features instead of or in addition to those listed. In other embodiments the device 405 may not have all of the elements or features listed and/or may have other elements or features instead of or in addition to those listed.

Top shell 420, gap 430, bottom shell 480, base 485, and port 490 are embodiments of top shell 220, gap 230, bottom shell 280, and base 285, which were discussed in FIG. 2A.

Ribs 406a-b are two of multiple ribs 406a-f that may be constructed on the inside of the top shell. Ribs 406a-b are optional and physically strengthen the top shell structure. The ribs 406a-b may be formed with the top shell or may be added after formation of the top shell. There may be any number of ribs 406a-f, from 1 to 20. In at least one embodiment, the ribs 406a-b may interact with the inner top shell to help to hold it in place.

Top screw wells 407a-b are wells that attach to corresponding screws to attach the top inner shell to the center post. One or more screws may be used and may include one or more screw wells 407a-f. Using screws for the attachment is optional. Other methods of attachment may be used, including but not limited to, forming the two parts together, adhesive, bots, heat, etc. In the embodiment shown in FIG. 4A two screw wells 407a and b are provided to attach the center post to the bottom inner shell. However, other embodiments may use a single screw or more than two screws to attach to the screw wells.

Shell screw wells 409a-b attach to screws to attach the top shell to the top inner shell to create a top shell structure. Two screw wells 409a-b are shown in FIG. 4A, but other embodiments may have one or more screws functioning to hold the shells together.

Top inner shell 415 provides an attachment site for the inner shell (which activates the button), the encoder, and other parts of the device 405. The top inner shell 415 is shown having a cross section that has a bracket shape. However, the top inner shell 415 may have any shape that allows insertion into the top shell. The top inner shell 415 also includes top inner shell lip 417 that goes around the shell and fits over the edge of top shell within the gap.

Top inner shell protuberance 416 is a protuberance on the top inner shell 415. Top inner shell protuberance 416 holds the encoder onto the top shell via attachment to the top inner shell. The protuberance 416 is shown with a tab shape. However, in other embodiments, the protuberance 416 may have any shape that fits with an appropriate shape on the encoder to hold the encoder in the top shell 410. There may be a top inner shell protuberance 416 on one or both sides of the top inner shell 415.

Encoder 425 is a structure that allows rotational movement of the top shell clockwise or counterclockwise (around the stationary bottom shell). Encoder 425 senses the direction and the amount of movement of the top shell in a clockwise or counterclockwise direction. Encoder 425 is discussed in more detail in FIG. 5.

Encoder tabs 426a and b are tabs on the encoder 425 that function to hold the top plate onto the top shell structure. The encoder tabs 426a and b are one method of holding the top plate onto the top shell, however other methods may attach the encoder 425 to another part of the top shell structure, including the top shell or the top inner shell.

Encoder protuberance 427 is a protuberance, which may be a tab, on the encoder 425 that holds the encoder 425 onto the top shell 410 via attachment to the top inner shell 415. The protuberance 427 is shown having a tab shape. However, in other embodiments, the protuberance 427 may have any shape that fits with an appropriate shape on the inner shell 415 to hold the encoder 425 in the top shell.

One or more lights 431 may be included within input device 405 that light up when the user has pushed the top shell down toward the bottom shell. The light may light up when the top is pushed enough to activate a button and/or when there is another change of state of the system. The one or more lights may be LED lights. The one or more lights may be placed next to the gap. The one or more lights may form a ring (of one or more LEDs). One or more lights may be included that lights up the gap. The light may be one or more lights positioned in the gap (see 431). The light(s) may be installed on the top surface of the gap. In an embodiment, the light includes one or more light emitting diodes (LED). In an embodiment, the light is powered by one or more batteries or a built-in battery inside the housing. In other embodiments, the light may be in other shapes, sizes and/or locations. In at least one embodiment, the light may light up in various manners indicating function and/or results. For example, the light may light up when the button has been pushed enough (past the threshold) to activate the button, the light may light up differently depending on how long the pushing lasts (e.g., different colors, different brightness, steady or flashing, etc.), the light may light up differently depending on how much the button is pushed down.

The one or more light diffusers 432 may be transparent or translucent and may include a roughened surface, so that the light from the one or more lights travels through the light diffusers and is scattered (or diffused).

Figure 5:
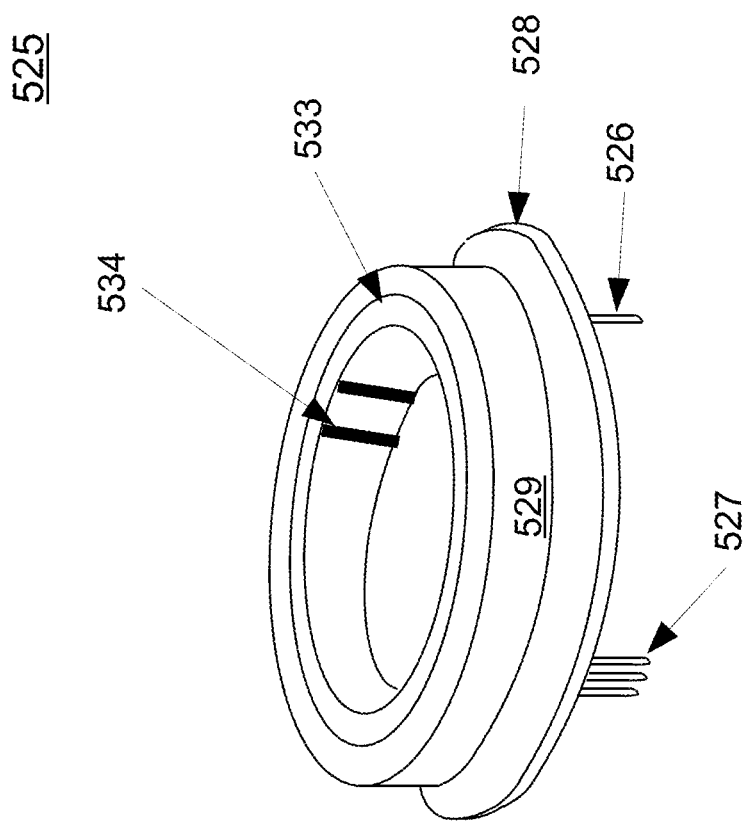
FIG. 5 shows top perspective view of an embodiment of an encoder.

Top plate 440 attaches the top shell to the bottom shell. The top plate 440 may be attached to the top shell via any method know to the skilled artisan. The top plate may be attached to any part of the top shell structure including but not limited to the top shell, the top inner shell, and the encoder. In FIG. 5, the top plate is attached to the top shell structure, via one or more tabs (see 526a and b) on the encoder 525 that fit within a slot in the top plate. Top plate may also include other slots or holes that allow attachment to structures on the encoder and/or on the top inner and outer shells.

Figure 6A:
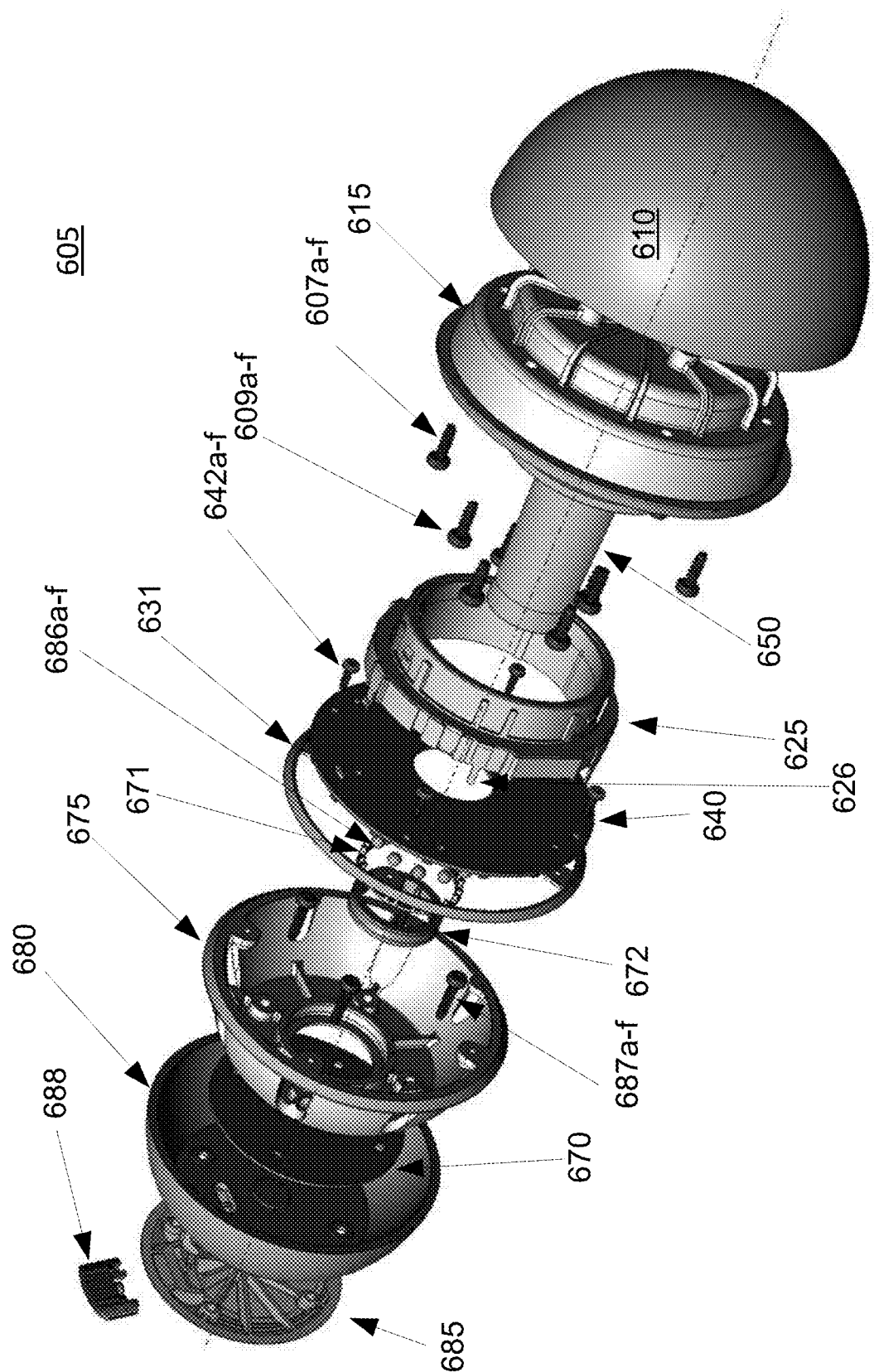
FIGS. 6A-6B show exploded views of two embodiments of input devices.

FIG. 4A shows two 442a-b of the multiple device screw wells 442a-f. There may be two or more than two screw wells (442a-b). Screw wells 442a-b attach the top shell 410 to the bottom shell 480 via the top plate 440 on the top shell and a screw holder on the side of the bottom shell. Top plate 440 sits on top of screw wells 442a-f (see FIG. 6A), and there are holes in the top plate 440 that align with the screw wells 442a-f (see FIG. 6A). The screws (642a-f in FIG. 6A) are inserted from the top of top plate 440, through the top plate 440 and then into screw wells 442a-f. Screw wells 442a-f are rigidly attached to the walls of the inner bottom shell 480—e.g., they are likely formed as part of the same mold that makes the rest of the inner bottom shell 480. Although in other embodiments, it is possible to have the the screw wells 442a-f attached rigidly to the outer bottom shell 480 instead. The screw wells 442a-d and and the holes in the top plate of FIG. 6a are not labeled. Labeling them may facilitate explaining the above in connection with FIG. 6A.

Center post 450 pushes on a button when the top shell 410 is pushed down with respect to the bottom shell. Center post 450 may be hollow or may be any shape that is capable of pushing on the button. In an embodiment, center post 450 has cross section that has a rectangular shape (having a barrel or cylindrical shape) with two arms. The arms function to attach the center post 450 to the top inner shell 415 via screws 407a-f. The bottom of the rectangular shape on the center post 450 pushes down on a button at the bottom of the device which activates a function in the application.

Button 455 may include one or more springs that keep button pushed up and keeps the gap 440 between the top shell and bottom shell open. In other embodiments, button 455 may be made from a resilient shape-retaining material that returns to its original shape after being deformed, thereby acting as a spring to keep the gap 440 between the top shell 410 and bottom shell, when the user is not pushing down on the top shell 410. When the user pushes down on the top shell 410, the center post 450 pushes down on the button 455 activating a function in the application. In some embodiments, pushing down on the button 455 activates the one or more lights to light up, indicating to the user that the button was pressed down enough to activate a function. In some embodiments, pushing down on the button 455 may also include a clicking noise. In some embodiments, the function that is activated by pushing down on button 455 may depend on what is centered on the screen of a TV, such as choosing a picture that is shown in the center of the screen or choosing a date (month and/or year) for searching for a picture. In at least one embodiment, if the force applied to the button in response to the user pushing the top shell 410 down toward the bottom shell is greater than a predetermined threshold, the click/pressing is registered by the button. This threshold may be registered by a sensor in the button 455 or in the input device 405.

Button 455 may include one or more button sensors. Button sensors may detect the time, and/or amount that the button is depressed. In other words, the user pushes down on the top shell and button sensors may detect how long the user pushes down (e.g., in milliseconds, tenths of a second, hundredths of a second, etc.), how far the user pushes the button down (e.g., halfway, all of the way), and whether the user pushes the button down past a threshold. In some embodiments, the length of time the button is pushed is registered by a sensor in the button.

Bottom plate 470 holds button 455 onto the bottom of the device. Bottom 470 plate may also function to hold the bottom inner shell to the bottom of the device. In an embodiment, bottom plate 470 has two guides (or tabs, not shown) that hold the button 455 in place. The guides may be two vertical walls shorter than the button that are formed on the bottom plate 470. Alternatively a well may be formed on the bottom plate to fit the button into. Bottom plate 470 is mounted on the bottom inner shell of input device 405. Bottom plate 470 is optional, and button 455 and may be mounted directly on the bottom inner shell.

Bottom inner shell 475 may contain parts of the input device 405 related to the button, the lights, and the ball bearings. Bottom inner shell 475 includes the button and includes structures that hold the button 455 in place. Bottom inner shell 475 includes an area to attach the one or more lights 431, and/or to attach the light guide diffuser 432. Bottom inner shell 475 is attached to the top inner and outer shells such that a gap 430 is created. Further a space is created between the bottom of the bottom inner shell and the base for including buttons and/or ports. Bottom inner shell 475 is attached to bottom shell via two screws in FIG. 4A.

FIG. 4A shows one ball bearing 486a. However, the input device 405 includes multiple ball bearings 486a-f. The ball bearings help the top shell to rotate smoothly. Ball bearings 486a-f reduce wobble of the input device 405 when the input device 405 is being rotated while sitting on a table. The ring encoder 425 in combination with the ball bearings 486*a-f* guide the rotational movement and reduce wobble. In other embodiments, instead of ball bearings 486*a-f*, a slippery rail or track may be included to hold central post 450 in place. Optionally, the channel in which ball bearings 486*a-f* are held may include bumps or protrusions to act as partitions to hold the ball bearings 486*a-f* so they do not bunch up.

Bottom shell wells 487*a-f* attach to screws in the bottom plate 470 to attach the bottom inner shell 475 to the bottom shell 480.

Figure 9:
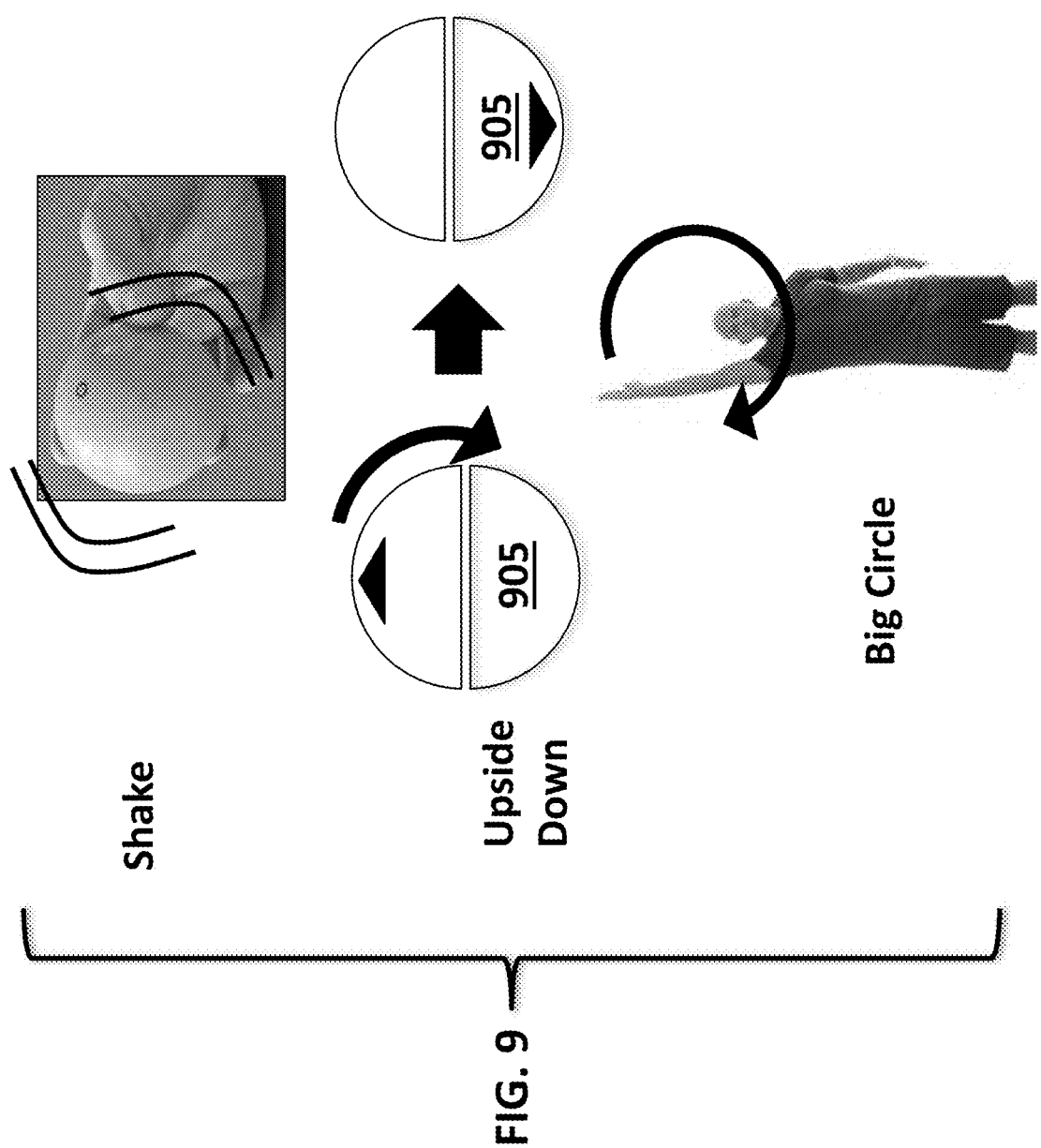
FIG. 9 shows a diagram of an embodiment of an input device being shaken, a top view of an embodiment of an input device being turned upside-down, and a view of an embodiment of an input device being moved in a large circle.

On/off button 488 turns the microphone off, if a microphone is included. On/off button 488 or another button may be included to turn the input device 405, the application and/or the screen (see 101 in FIG. 1) on or off. In other embodiments, the input device 405 may include one or more additional sensors. Throughout this specification, the sensors connected to the button and/or shells are configured to detect click operations, rotational operations, and larger operations. Other sensors (gyro sensor or accelerometers for example) are included in the encoder to detect motion such as waving hand motion. One or more motion sensors may allow the user to make large movements with the device that result in different functions. An example is shown in FIG. 9.

Rotational sensors (in the encoder) detect the amount and direction of rotation of the top shell with respect to the bottom shell (see e.g., FIGS. 8A-8C).

In other embodiments, the input device 405 may also include a port. For example, port 390 was discussed in FIG. 3 as port 390. Other embodiments may include one or more antennae or transmitters.

A microphone allows the user to use voice commands instead of manipulating the device by hand. The microphone may be included in any part of the input device 405, including the top inner shell 410, the bottom inner shell 480, or the gap 430.

FIG. 4B shows an embodiment of the input device 405, showing more detail of the button 455. In FIG. 4B the cutline is slightly off from the middle, so that FIG. 4B shows only about 45% of the device.

The button 455 in FIG. 4B has two springs 456*a-b* at the bottom attached to the bottom plate. The button 455 in FIG. 4B is an embodiment of the button 455 in FIG. 4A.

The collar 472 is shown in FIG. 4B as a ring within the bottom inner shell 475 that holds the button 455 in place. The collar 475 may be a hole in the bottom of the bottom inner shell 475 or may be a rail attached to the bottom inner shell 475 or the bottom plate 470 as long as it functions to hold the button 455 in place during movement of the input device 405.

Some of the details of switch 488 are shown in FIG. 4B. The switch 488 is electronically connected to the light.

FIG. 5 shows top perspective view of an embodiment of an encoder 525. The encoder 525 may include an inner tube 533 having oval protuberances 534, a middle tube 529, and an outer tube 528 having tabs 526 and leads 527. In other embodiments the encoder 525 may not have all of the elements or features listed and/or may have other elements or features instead of or in addition to those listed.

In at least one embodiment, the encoder 525 is a ring encoder. The ring encoder 525 may include three rings. The middle ring 529 rotates when the top shell (see 410 in FIG. 4) is rotated clockwise or counterclockwise. The outer shell 528 attaches to the top inner shell (and the top plate) via the tabs 526. The three leads 527 on the outer shell of the encoder 525 are conductive. The tabs 526 hold the encoder in place within the device.

The ring encoder 525 may include one or more rotational sensors. The ring encoder 525 keeps track of the absolute position of the top shell with respect to the bottom shell. As the top shell (see 410 in FIG. 4) is turned, the sensor(s) keep track of the position and the direction of turning. This may work by having a resistive material that goes around the rim of the encoder with a break in the resistor material. At one end an electrode is fixed and another electrode moves as the top shell is turned. The amount of resistance changes as the top shell is turned. The amount of resistance can be correlated with the direction and how far the top shell is turned.

Optionally the ring encoder 525 may have a series of electrodes and each electrode may have its own signal associated with it. The electrode attached to the top shell (see 410 in FIG. 4) as it turns may activate each different signal depending on the direction the top shell turns (clockwise or counterclockwise) and how far the top shell is turned.

Figure 6B:
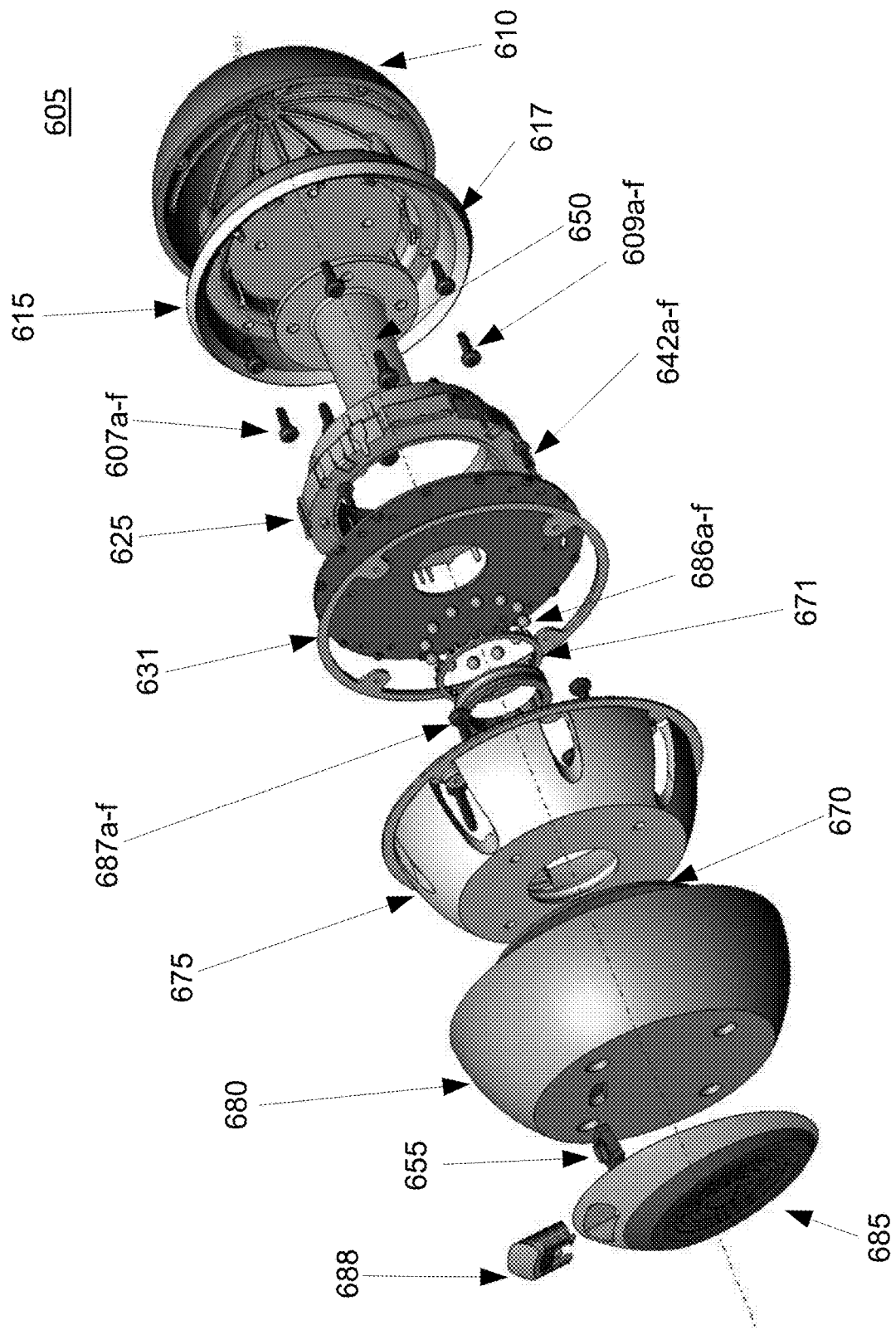

FIGS. 6A-6B show embodiments of the input device 605 as exploded views. FIG. 6A shows an exploded perspective view from the top, FIG. 6B shows an exploded perspective view from the bottom and FIG. 6C shows an exploded view from the side. The input device 605 may include, top screws 607*a-f*, shell screws 609*a-f*, a top shell 610, top inner shell 615, top inner shell lip 617, an encoder 625, encoder tab 626, one or more lights 631, a top plate 640, device screws 642*a-f*, center post 650, button 655 (shown in FIG. 6B, but not in FIG. 6A), bottom plate 670, ball bearing ring 671, bottom ring 672, bottom inner shell 675, a bottom shell 680, a base 685, ball bearings 686*a-f*, bottom shell screws 687*a-f*, and on/off button 688. In other embodiments the device 605 may not have all of the elements or features listed and/or may have other elements or features instead of or in addition to those listed. In other embodiments the device 605 may not have all of the elements or features listed and/or may have other elements or features instead of or in addition to those listed.

Top screws 607*a-f*, shell screws 609*a-f*, a top shell 610, top inner shell 615, top inner shell lip 617, an encoder 625, encoder tab 626, one or more lights 631, a top plate 640, device screws 642*a-f*, center post 650, button 655 (shown in FIG. 6B, but not in FIG. 6A), bottom plate 670, ball bearing ring 671, bottom ring 672, bottom inner shell 675, a bottom shell 680, a base 685, ball bearings 686*a-f*, bottom shell screws 687*a-f*, and on/off button 688 have been discuss in FIG. 4A as top screws 407*a-f*, shell screws 409*a-f*, top shell 410, top inner shell 415, top inner shell lip 417, an encoder 425, encoder tab 426, gap 430, one or more lights 431, top plate 440, device screws 442*a-f*, center post 450, button 455, bottom plate 470, bottom inner shell 475, bottom shell 480, base 485, ball bearings 486*a* and *b*, bottom shell screws 487*a-f*, and on/off button 488.

However, FIGS. 6A-6B show more details of the components of the input device 605 and how the components of input device 605 fit together. In FIG. 6A, more details of the top of the top inner shell and bottom inner shell are shown. The top inner shell 615 shape is shown in more detail. Further, the placement and number of screws 609*a-f* used to attach the top inner shell 615 to the top outer shell 610 are shown. The bottom inner shell 675 shape is shown in more detail, providing an indication of how the ball bearing and bottom ring are attached. FIG. 6A shows an embodiment in which the LED light and diffuser are provided together as a ring (see 631 and 632).

Ball bearing ring 671 holds the ball bearings (686*a-f*) in place and allows them to move within the ball bearing ring. The ball bearings 686*a-f* are held between the teeth on the ball bearing ring so the ball bearings do not bunch up.

Bottom ring 672 fits around post 650. Post 650 sticks through bottom ring 672 and together with ball bearings 686a-f helps to keep the bottom of post 650 from wobbling while top shell 610 spins.

FIG. 6B shows more details of the bottom of the top inner shell 615 and bottom inner shell 675 shapes. This view gives a better perspective on how the ball bearing ring and bottom ring function with the ball bearings and how the center post 650 fits within all of the ring-shaped objects. The base 685 is a flattened area that fits onto the bottom shell 680 to allow the user to set the input device 605 on a surface without it rolling off. Base 685 includes areas for attachment of one or more buttons (see on/off button 688) and/or ports. The base is attached to the bottom shell 680 via two or more screws (see 487a and b in FIG. 4A or 4B).

Figure 7:
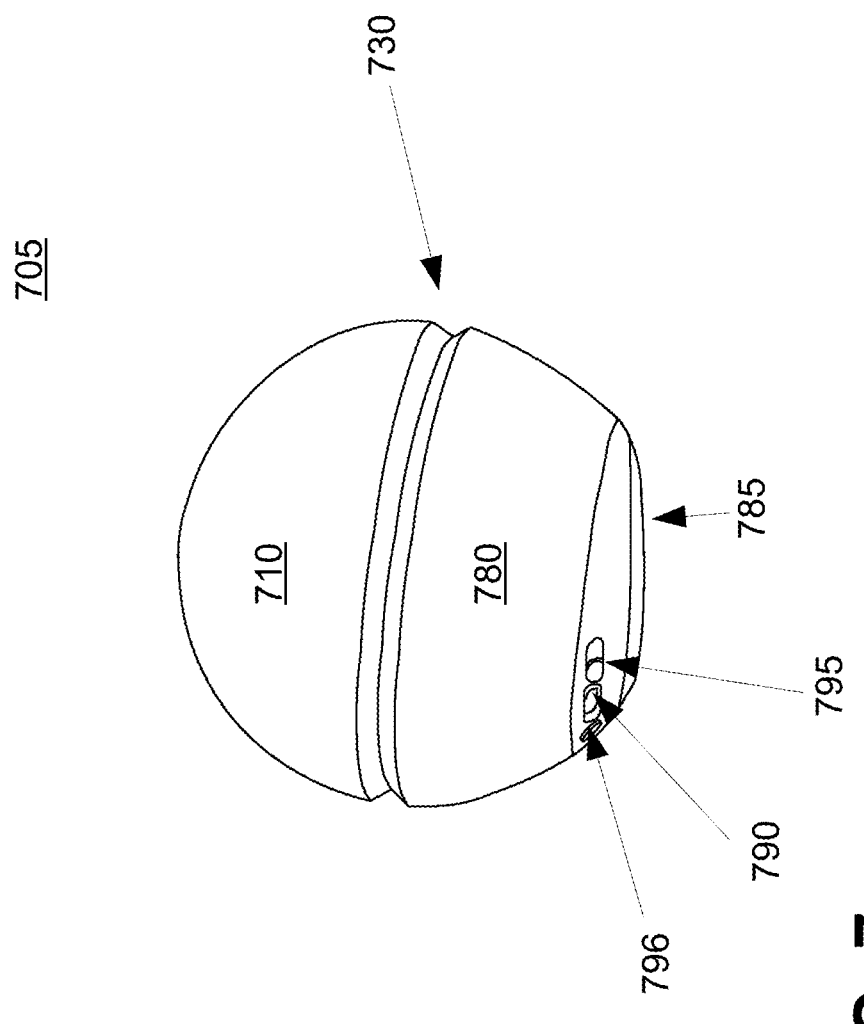
FIG. 7 shows a front view of an embodiment of a wireless input device.

FIG. 7 shows a an embodiment of a input device 705 from the side. The device 710 may include a top shell 710, a gap 730, a bottom shell 780, a base 785, a port 790, and switches 795 and 796. In other embodiments the input device 705 may not have all of the elements or features listed and/or may have other elements or features instead of or in addition to those listed.

Top shell 710, gap 730, bottom shell 780, and base 785, are embodiments of top shell 210, gap 230, bottom shell 280, and base 285, respectively, which were discussed in FIG. 2. Port 790 is an embodiment of port 490, which was discussed in FIG. 4.

Switches 795 and 796 may be used to turn parts of the system on and off. For example, switch 795 may be used to turn the microphone off. The switches may be placed anywhere on the input device 705, including the base, the top shell and/or the bottom shell. In FIG. 7, the port 790 and the switches 795 and 796 are placed on the side of the bottom shell, close to the base 795. Switch may be a slide switch that can be pushed to stop at two positions, on or off. The switch may be located in a position that is unlikely to interfere with the normal finger and hand operations, so that the switch is unlikely to be turned on and/or off inadvertently while performing other tasks.

FIG. 7 provides an example of how the input device 705 may be constructed to include a clear demarcation between the shells and the gap. In the FIG. 7, the shells are a different color than the gap. In addition, the base may be the same color as the gap 730. The port and switches may be placed on the base. The materials used to cover or construct the shells may be a material that is easy to grasp and/or not so slick that the input device 705 may slide out of the user's grasp. In other words, the material may make the input device easier to hold onto when the user is holding the input device off of a table (e.g., see FIG. 9). The material may have a rough surface and/or a slightly tacky texture.

FIGS. 8A, 8B and 8C show a side view, a top view in which the top shell is not pressed down, and a top view with the top shell pressed down, respectively, of the rotation of the top shell of the input device 805. The input device 805 may include a top shell 820, a gap 830, a cylindrical column 850, a bottom shell 880, and a base 885. In other embodiments, the input device 805 may not have all of the elements or features listed and/or may have other elements or features instead of or in addition to those listed.

Top shell 820, gap 830, cylindrical column 850, bottom shell 880, and base 885, may be embodiments of top shell 210, gap 230, bottom shell 280, and base 285, respectively, which were discussed in FIG. 2. Input device 805 can be an embodiment of input device 105 in FIG. 1, input device 205 in FIG. 2, input device 305 in FIG. 3, input device 405 in FIG. 4, input device 605 in FIG. 6, and input device 705 in FIG. 7.

In FIG. 8A, the basic motions of the input device 805 are shown. The arrows that indicate turning right and left show the rotation clockwise, and counterclockwise of the top shell 810 of the input device 805. The large arrow pointing down shows the motion of pressing down the top shell 810 of the input device toward the bottom shell 880 activating a button within the input device 805. Also shown in a motion that is a combination of rotating the top shell 810 and pressing down on the top shell 810. The combination of motions may have other functions. The basic motions of the input device 805 may include the following: 1. rotate clockwise, 2. rotate counterclockwise, 3. press down and release, 4. press down and hold (e.g., for more than 500 ms to 1000 ms, or for more than 500 ms, 550 ms, 600 ms, 650 ms, 700 ms, 750 ms, 800 ms, 850 ms, 900 ms, 950 ms, 1000 ms or any other time that would be appropriate), 5. push down and, while holding, rotate clockwise and hold, and 6. push down and, while holding, rotate counter-clockwise and hold. The motions that include pressing down input device 805, act on the top shell 810 of the input device 805 and press it down toward the bottom shell 880. The motions that include rotating input device 805, act on the top shell 810 of the input device 805. In some embodiments, the movements may include the rotation of the top shell 810 and a single push on the top shell 810 toward the bottom shell at the same time. Each movement may result in a different outcome. For example, in some embodiments, rotating the top shell 810 results in movement of a group of images left or right. In some embodiments, pushing or pressing down on the top shell 810 results in choosing a particular image.

The clockwise rotations and counterclockwise rotations of the top shell 810 of the input device 805 are free rotations (meaning there is no stopping point), where the speed (angular velocity) of rotation may determine how fast and far the GUI moves through the content list when pointing the input device 805 at a screen showing the GUI. There is no end to the physical rotation, and as long as there is movement (rotation), the GUI element will be instructed to react to that physical rotational motion of the input device.

FIG. 8B is a top view of the input device 805 showing how the top shell 810 can be rotated clockwise at least 360 degrees or more, when the top shell is not pressed down. In some embodiments, the top shell may be rotated in discrete increments and the user may be given a signal that the user has rotated to a specific increment (e.g., a click).

FIG. 8C shows an embodiment of the input device 805, with the top shell pressed down, which places input device 805 in a mode in which the amount of rotation the top shell can rotate is limited. The amount of rotation (0 to n) can be measured as angular rotation by a sensor in the input device 805. In the embodiment shown in FIG. 8C, there is a minimum and a maximum (−max and +max) and the angle (n) can be measured between the min (which is denoted as −max) and max. In an embodiment, in contrast to the embodiments of FIGS. 8A and 8B, in FIG. 8C the top shell can only rotate between −max and max.

In an embodiment, while pressed, a sensor (e.g., ring encoder 550, FIG. 5) within the input device 805 measures how much angular rotation is made from the "position 0" to "position n", and the distance (or angle of rotation) that the user rotates the top shell 810 dictates, proportionally to the rotated distance, the speed at which a GUI list moves (see points 5) and 6) in the FIG. 8A description). The GUI list can be a list of any type of view of photograph or image. As long as this angle is held in position (while pressed), the speed of GUI scroll will remain constant. For example, the user may rotate the top shell 810 to "n" in FIG. 8C and then the user may press down on the top shell 810 keeping the shell at position "n." Adjusting the rotation of the top shell 810 results in different speeds for the images shown on the GUI. Rotating the top shell 810 in the opposite direction results in movement in the opposite direction (scrolling in the opposite direction)—negative velocity—in a similar manner.

FIGS. 9A, 9B and 9C shows other special gestures of the input device 905. Input device 905 may be an embodiment of input device 105 in FIG. 1, input device 205 in FIG. 2, input device 305 in FIG. 3, input device 405 in FIG. 4, input device 605 in FIG. 6, input device 705 in FIG. 7, and input device 805 in FIG. 8.

FIG. 9 shows an embodiment in which the input device 905 may be shaken (e.g., quick multiple shaking of the input device 905 with the hand). The shaking may result from the user picking the input device 905 up from a table and shaking the input device 905 in the air. In some embodiments, the shaking action of the input device 905 may result in one of the following application: go back to home view, or reset current screen.

In FIG. 9, the input device 905 is shown being turned upside down. The input device 905 is picked up by a user with the top pointing up (with the top shell 810 is at the top—at the highest location on input device 905, and the input device 905 is right side up), then the input device 905 is rotated 180 degrees to make a distinct upside down motion so that the top shell 810 is now on the bottom—at the lowest location on input device 905, and the input device 905 is upside down. The user may leave the device upside-down for a period of time. Then, the user may move the input device 905 back to the initial orientation (right side up). In some embodiments, the movement of the input device 905 upside down and then right side up, results in the closing of the application (the GUI) and/or turning off the TV.

In FIG. 9, the input device 905 is shown being manipulated in a big circle, either clockwise or counter clockwise by a user. The input device 905 is picked up and the user makes distinctive circular motions in one direction or another to convey input signal. The circle motion could be large, with the whole arm, or smaller (5-10 inches in diameter) as long as the circular motion can be detected and distinct from the upside-down motion. The big circular motion may result in switching through folders (jumping through a series of folders by jumping from folder to folder from within one to within another folder) containing images or photographs. Alternatively, the big circular motion of the input device 905 may result in switching through other higher level organization of content (where the content may be images or photographs, for example).

Motion detection software and hardware (e.g., accelerometer, gyro sensors) detects any of the motions discussed in FIG. 9. The software then translates the motion into the result, such as going back to a home view, resetting the current screen, turning off the TV, and/or switching through folders or tabs or other higher levels of organization.

Figure 10:
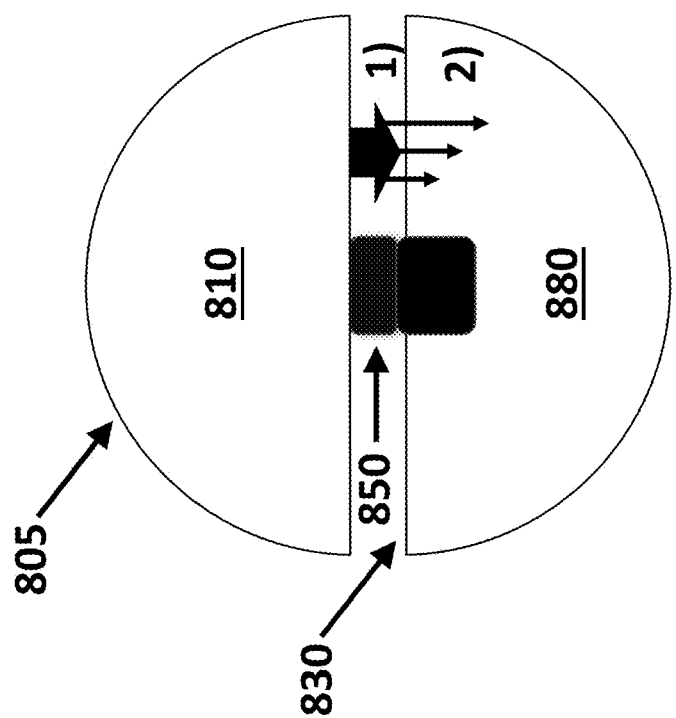
FIG. 10 shows a side view representation of an embodiment of an input device being pushed down activating a button.

FIG. 10 shows a diagram of an embodiment of a input device 1005 from the side. Input device 1005 can be an embodiment of input device 105 in FIG. 1, input device 205 in FIG. 2, input device 305 in FIG. 3, input device 405 in FIG. 4, input device 605 in FIG. 6, input device 705 in FIG. 7, input device 805 in FIG. 8 and input device 905 in FIG. 9.

FIG. 10 shows an embodiment in which the varying degree of pushing of the button (see 455 in FIG. 4) (discrete or continuous) decides the action that results. The large arrow in FIG. 10 shows a continuous motion resulting in the button being pushed down. The smaller arrows indicate different discrete amounts that the button can be pushed down. The gap (see 430 in FIG. 4) indicates whether the button has been pushed. In at least one embodiment, the gap may include a light. The light may indicate whether the button is clicked (has be pushed past the threshold). In some embodiments, the light turns on when the button has been activated—when the top has been pushed down enough past a threshold amount that the button has been clicked. In some embodiments, the pushing down may also be accompanied by a clicking sound that indicates that the button has been pushed. The discrete pushes may use a combination of single click/push button and a pressure sensitive sensor. The button is springy or a spring in the device allows the top shell to be pushed toward the bottom shell, reducing the size of the gap. The spring keeps the button or gap in the default state. A pressure sensitive sensor senses the amount of pushing. In an embodiment, when released, the button returns to the original non-depressed position.

A single push down with enough force will cause the mechanical spring system of the button (which may or may not be combined with a rotary encoder) to "click" and be registered as a discrete signal for a single push. The pressed state of the system after the click will be maintained as long as the minimum force is applied to hold the button in place. After the applied force becomes less than the minimum force needed to keep the button in the pressed state, the system will return to the default state of the beginning (while the GUI reacts to the gesture of the input device.

In an embodiment, while in the "pressed state" shown by the number "1)" in FIG. 10, further pressure can be applied in the same direction (downward in the illustrated orientation shown by the number "2)" in FIG. 10). The varying amount of pressure is detected by a pressure sensitive sensor placed either above/inside/below that of the button or any other parts that receive and detect force resulting from the push down of the top shell touching the hand. The proportionate amount of applied force is interpreted and translated by the system, and is expressed in the GUI in which the system is connected to. In an embodiment, button 1050 includes multiple buttons (e.g., 3 buttons) of different heights, and the further the user presses down, the more of the buttons are depressed. As each of the buttons is depressed, a new function is activated. In another embodiment, the button may include a potentiometer. As the button is depressed, the setting of the potentiometer is changed, changing the resistance across the potentiometer. The voltage across (or the current through) the potentiometer may be kept constant, and the change current (or the change in the voltage) may be measured as an indication of the resistance and of how much the button is depressed.

Methods of Using the Input Device

FIGS. 11-16 show different methods of using the input device to view and choose pictures on a screen.

Figure 11:
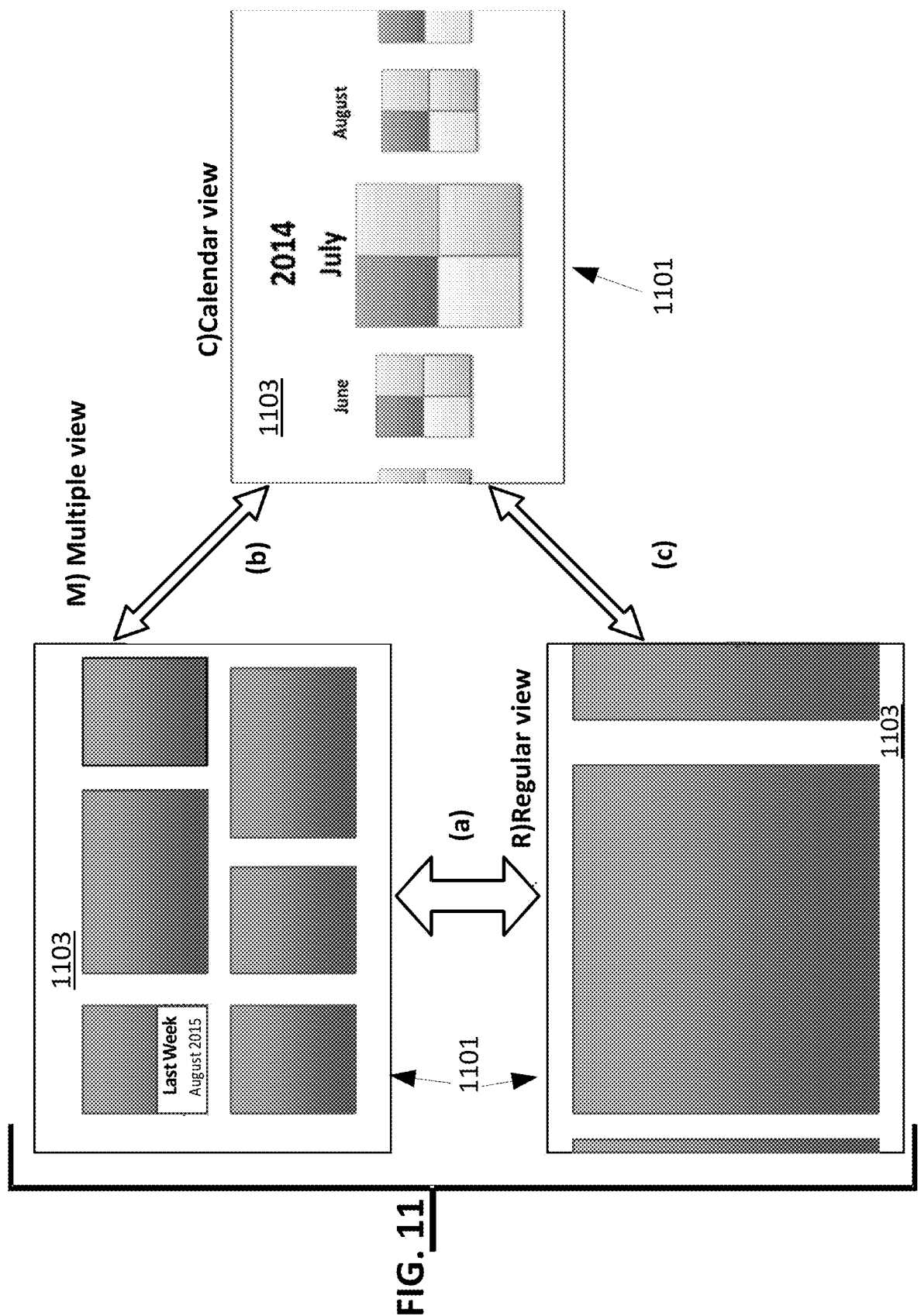
FIG. 11 shows a diagram of an embodiment of a user interface for use with an input device.

FIG. 11 shows a diagram of an embodiment of a user interface for use with the input device showing three basic views in a system 1100 of using an input device. The system 1100 can include a screen 1101 and a user interface 1103. In some embodiments, the user interface 1103 and screen 1101 can be embodiments of the user interface 103 and screen 101 in FIG. 1. In other embodiments the system 1100 may not have all of the elements or features listed and/or may have other elements or features instead of or in addition to those listed.

The User Interface 1103 includes a multiple view (M), a calendar view (C) and a regular view (R). The diagram shows how the user can move between views using the input device 1105 to find a particular photograph. For example, the user can scroll through the calendar view (C) to find a particular year and month (see 2014 and July) by turning the top shell clockwise or counterclockwise. When the user finds the year and month of interest, the user may push down on the top shell to "choose" the date. The view in July may show a variety of photographs that were taken in July of 2014. The variety may include four photographs. The photographs may be taken from a single date in July or from a variety of dates in July. The arrow shown as (b) shows how the user can move between the calendar view and the multiple view back and forth until the correct year and month is found.

The user may then choose the Multiple view of the photographs in July of 2014 (e.g., by pushing down on the top shell of the input device see 1005 in FIG. 10). The Multiple view may be organized by weeks, days, etc. depending on the number of photographs taken in that month. The multiple view may be organized in two rows of photographs and the photographs may not all be the same size and/or shape. The user may choose a particular photograph by scrolling right and left (rotating the top shell clockwise or counterclockwise) until the picture of choice appears in the view and then the user may choose the photograph by pushing down on the top shell (clicking)—see the Regular view. The arrow (a) shows how the user may move back and forth between the multiple view and the regular view until the right week and/or photograph is found. Optionally, the user may scroll within the regular view to find another photograph or to find the photograph they were looking for by rotating the top shell clockwise or counterclockwise.

The user may then move back to the calendar view to find another photograph as shown by the arrow (c) in FIG. 11.

Figure 12:
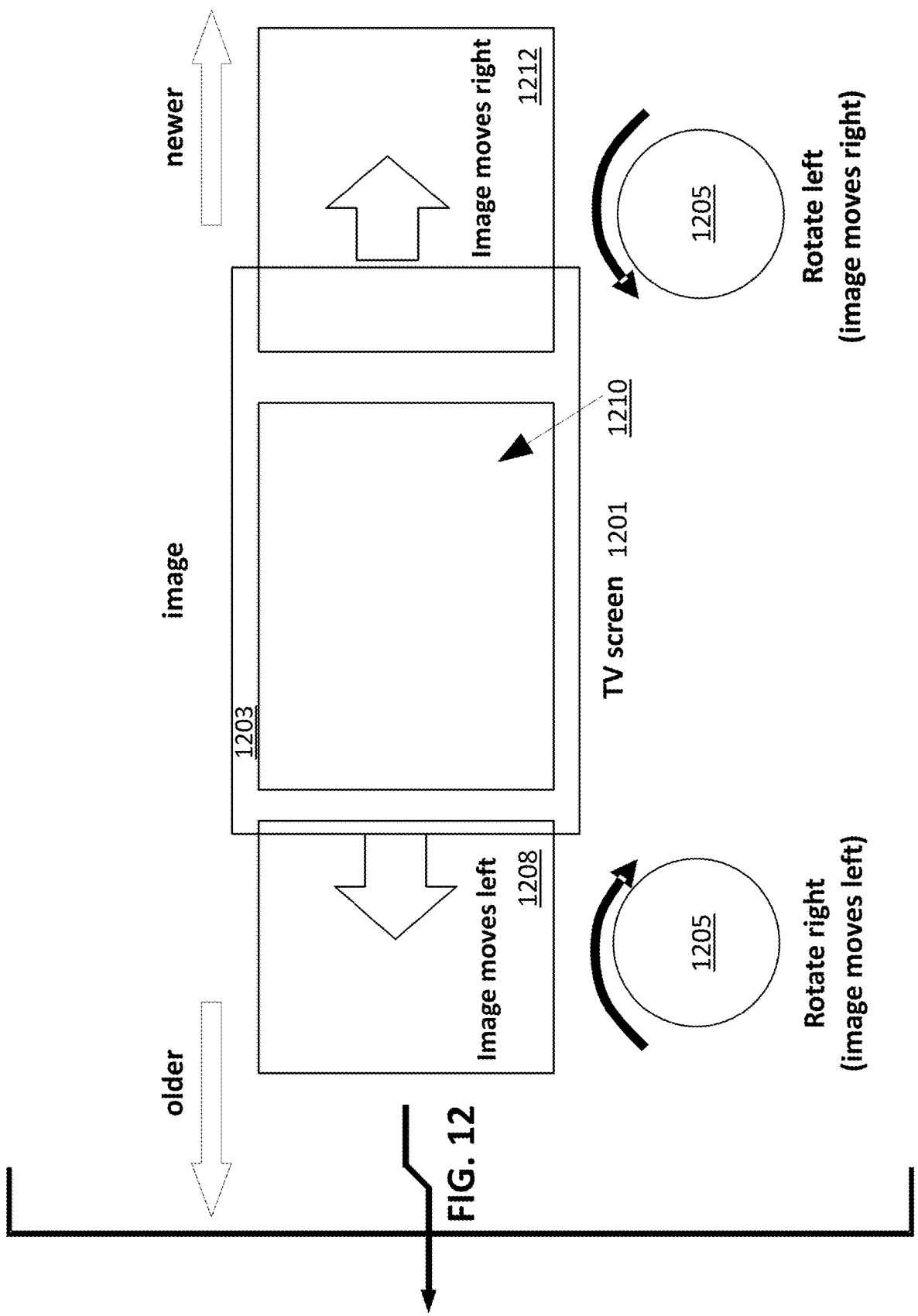
FIG. 12 shows a diagram of an embodiment of a method of using a wireless input device with a user interface.

FIG. 12 shows a diagram of an embodiment of a method of using the input device 1205 with a user interface, in a system 1200 of using an input device. The system 1200 can include a screen 1201, a user interface 1103 and an input device 1105. In other embodiments the system 1200 may not have all of the elements or features listed and/or may have other elements or features instead of or in addition to those listed. In some embodiments the user interface 1203 and screen 1201 can be embodiments of the user interface 103 and screen 101 in FIG. 1. Input device 1205 may be an embodiment of input device 105 in FIG. 1, input device 205 in FIG. 2, input device 305 in FIG. 3, input device 405 in FIG. 4, input device 605 in FIG. 6, input device 705 in FIG. 7, input device 805 in FIG. 8, input device 905 in FIG. 9 and input device 1005 in FIG. 10. FIG. 12 provides more information about the regular view behavior than was given in FIG. 11.

In the embodiment of FIG. 12, rotating the top shell of input device 1205 moves the images displayed on a separate screen device (e.g., a television). The images are aligned in a linear matter, with older images to the left and newer images to the right. The motion of the scroll is right or left, while the motion of the input device 1205 is rotational. Turning the input device 1205 moves the images on the screen, with the speed corresponding to the speed and direction of rotation of the input device 1205. In other embodiments, older images may be on the right and newer images on the left or older images may be on the top and newer images may be on the bottom (or the reverse).

The FIG. 12 shows how movement of the top shell of the input device clockwise and counterclockwise correspond to the movement of the pictures. As the (top shell of the) input device 1205 is rotated right (clockwise), the images move left. As the top shell of the input device 1205 is rotated left (counterclockwise) the images move right. In other alternatives clockwise rotation of the top shell of the input device may move images left or may move images up or down (and the reverse for counter clockwise).

In other embodiments, the organization of the pictures may vary and the newer images may be on the left and the older images may be on the right.

Figure 13:
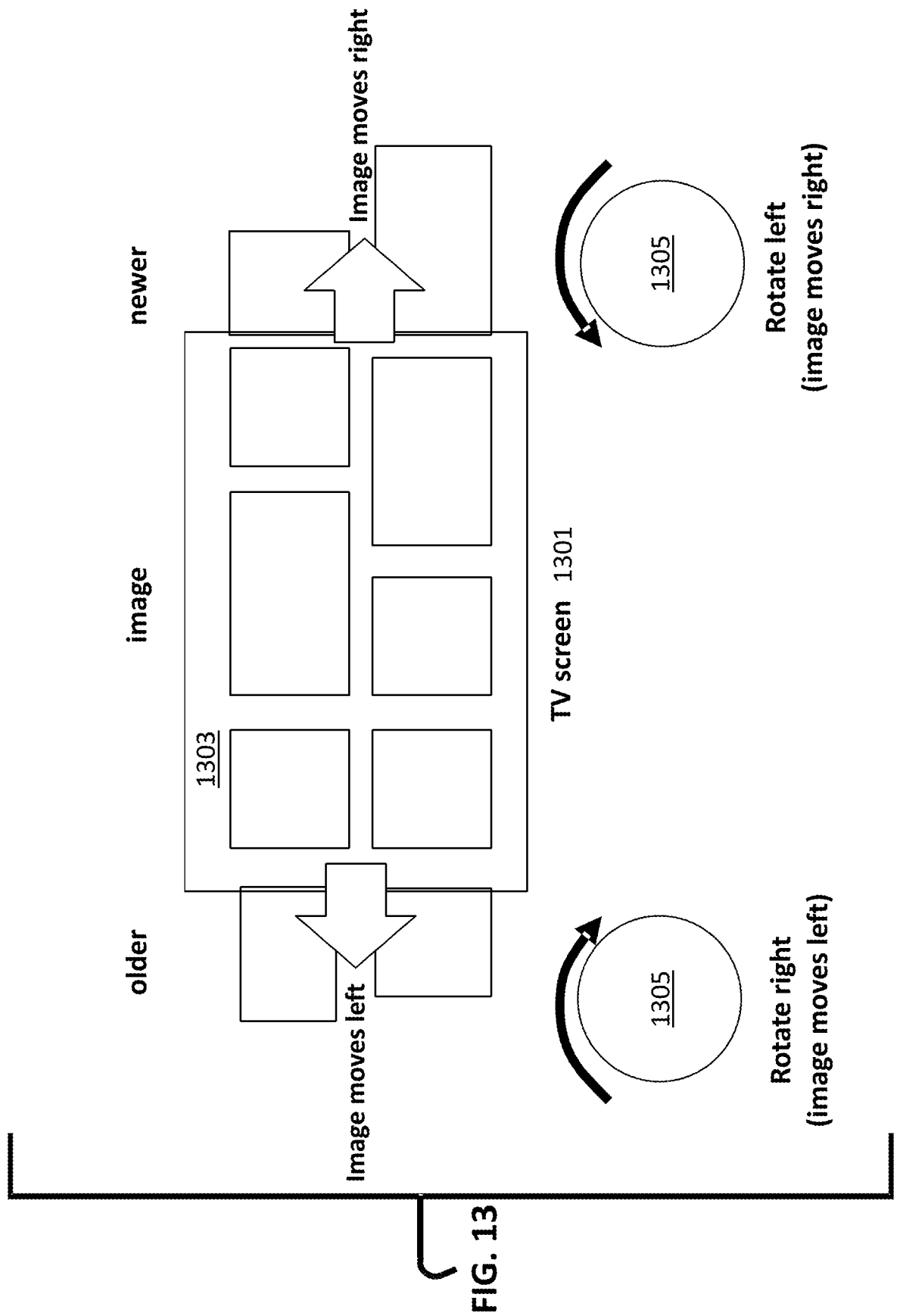
FIG. 13 shows a diagram of an embodiment of a method of using a wireless input device with a user interface.

FIG. 13 shows a diagram of an embodiment of a method of using the input device with a user interface system 1300. User interface system 1300 can include a TV screen 1301, a user interface 1303, and an input device 1305. In other embodiments, the system 1300 may not have all of the elements or features listed and/or may have other elements or features instead of or in addition to those listed.

Input device 1305 can be an embodiment of input device 105 in FIG. 1, input device 205 in FIG. 2, input device 305 in FIG. 3, input device 405 in FIG. 4, input device 605 in FIG. 6, input device 705 in FIG. 7, input device 805 in FIG. 8, input device 905 in FIG. 9, input device 1005 in FIG. 10 and input device 1205 in FIG. 12. FIG. 13 provides more information about the multiple view behavior than was given in FIG. 11.

Rotation of the input device 1305 moves the images displayed on a separate screen device (i.e., a television). The images are aligned in a linear matter, with older images to the left and newer images to the right. The motion of the scroll is right or left, while the motion of the input device 1305 is rotational. Turning the input device 1305 moves the images on the screen, with the speed corresponding to the speed of rotation of the input device 1305.

The FIG. 13 shows how moving the top shell of the input device corresponds to the movement of the pictures in the user interface 1303. As the input device 1305 is rotated right (clockwise), the images move left. As the input device 1305 is rotated left (counterclockwise) the images move right. In other embodiments, the organization of the pictures may vary (newer to older) or the rotation may correspond differently.

Figure 14:
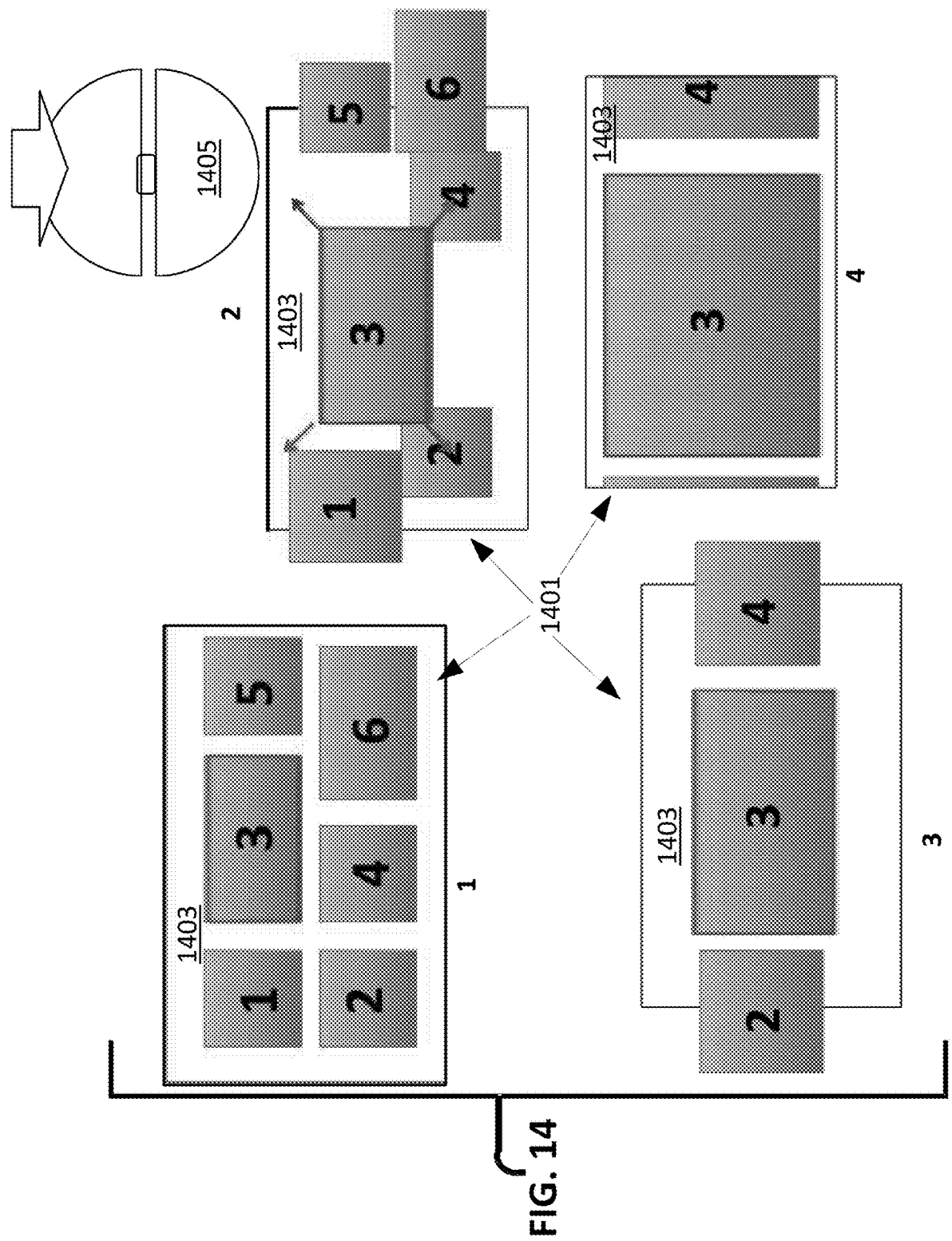
FIG. 14 shows a diagram of an embodiment of a method of using a wireless input device with a user interface.

FIG. 14 shows a diagram of an embodiment of a method of using the input device 1405 with a user interface. User interface system 1400 may include a TV screen 1401, a user interface 1403, and an input device 1405. In other embodiments the system 1400 may not have all of the elements or features listed and/or may have other elements or features instead of or in addition to those listed.

Input device 1405 can be an embodiment of input device 105 in FIG. 1, input device 205 in FIG. 2, input device 305 in FIG. 3, input device 405 in FIG. 4, input device 605 in FIG. 6, input device 705 in FIG. 7, input device 805 in FIG. 8, input device 905 in FIG. 9, input device 1005 in FIG. 10, input device 1205 in FIG. 12, and input device 1305 in FIG. 13. Screen 1401 and user interface 1403 may be embodiments of screen 101 and user interface 103 in FIG. 1 or screen 1301 and user interface 1303 in FIG. 13. FIG. 14 provides more information about the transition between the multiple (M) view and the regular (R) view (see (a) in FIG. 11).

Tapping on the device triggers a transition from (1) to (4) within 500 ms. Tapping again reverses the motion from (4) to (1). The individual images (labeled 1 to 6) all are animated and continuously change their position and scale to smoothly (e.g., seamlessly) "morph" into the final state of (4). The effect of the continuous seamless movement is a connected experience for the user that prevents a jarring sudden transition.

Figure 15:
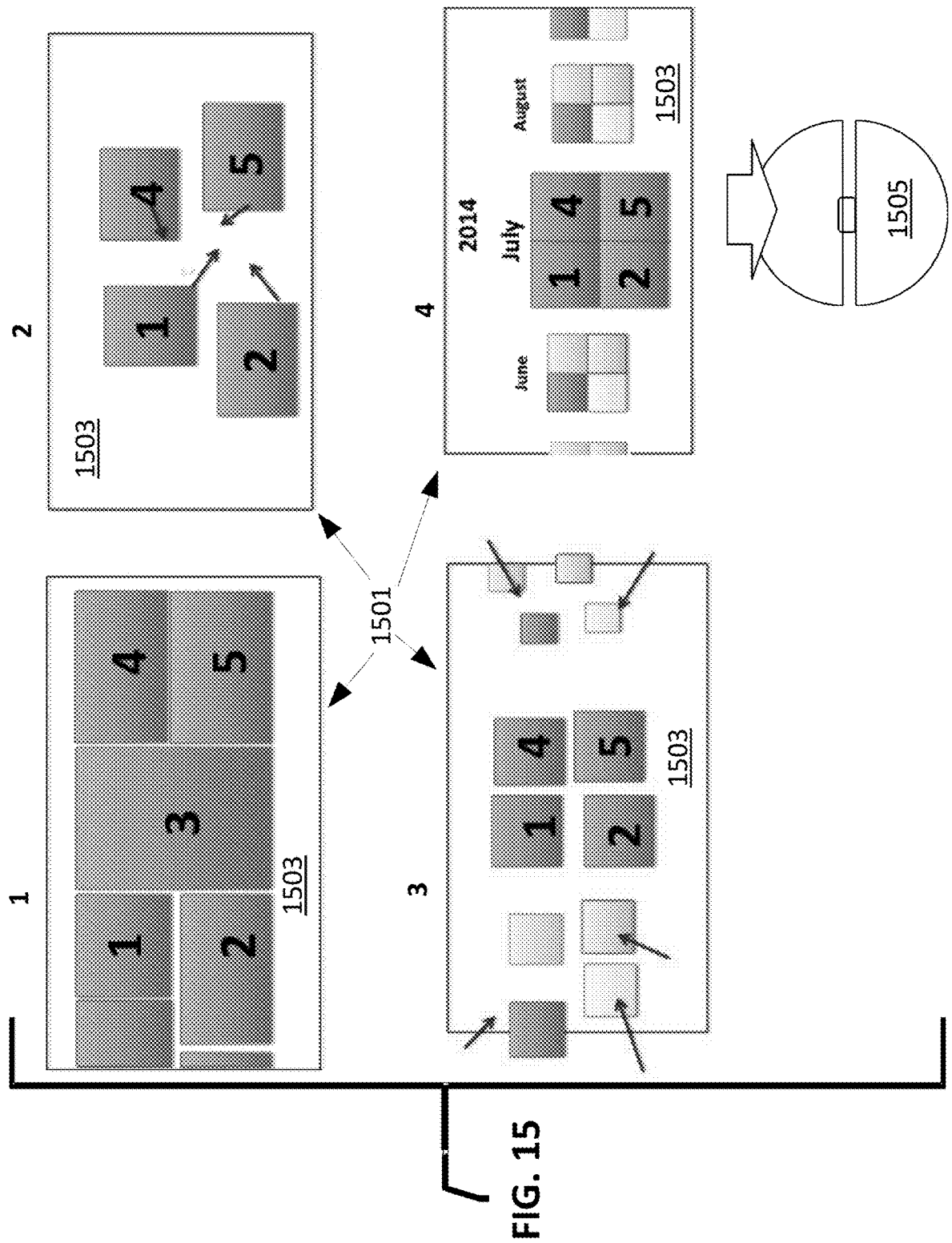
FIG. 15 shows a diagram of an embodiment of a method of using a wireless input device with a user interface.

FIG. 15 shows a diagram of an embodiment of a method of using the input device 1505 with a user interface. User interface system 1500 can include a screen 1501, a user interface 1503, and an input device 1505. In other embodiments the system 1500 may not have all of the elements or features listed and/or may have other elements or features instead of or in addition to those listed.

Input device 1505 can be an embodiment of input device 105 in FIG. 1, input device 205 in FIG. 2, input device 305 in FIG. 3, input device 405 in FIG. 4, input device 605 in FIG. 6, input device 705 in FIG. 7, input device 805 in FIG. 8, input device 905 in FIG. 9, input device 1005 in FIG. 10, input device 1205 in FIG. 12, input device 1305 in FIG. 13, and input device 1405 in FIG. 14. Screen 1501 and user interface 1503 can be embodiments of screen 101 and user interface 103 in FIG. 1 or screen 1301 and user interface 1303 in FIG. 13 or screen 1401 and user interface 1403 in FIG. 14. FIG. 15 provides more information about the transition between the multiple (M) view and the calendar (C) view (see (b) in FIG. 11).

The top right of FIG. 15 of the input device 1505 shows the long pressure movement of the input device 1505 and how the movements translate to activity in the user interface 1503. FIG. 15 shows how long pressing the top shell of the input device 1505, or pressing down and turning the top shell of the input device 1505 at the same time triggers a transition of the user interface 1503 from (1) to (4). In some embodiments, the long pressing and turning must be for 500 ms. In other words, letting go of the press after at least 500 ms will reverse the motion from (4) to (1). A selected number of images representing a particular month will scale and change position at the same time to form a collage image (in this case, a square tile with four images, although this could be different layouts).

Figure 16:
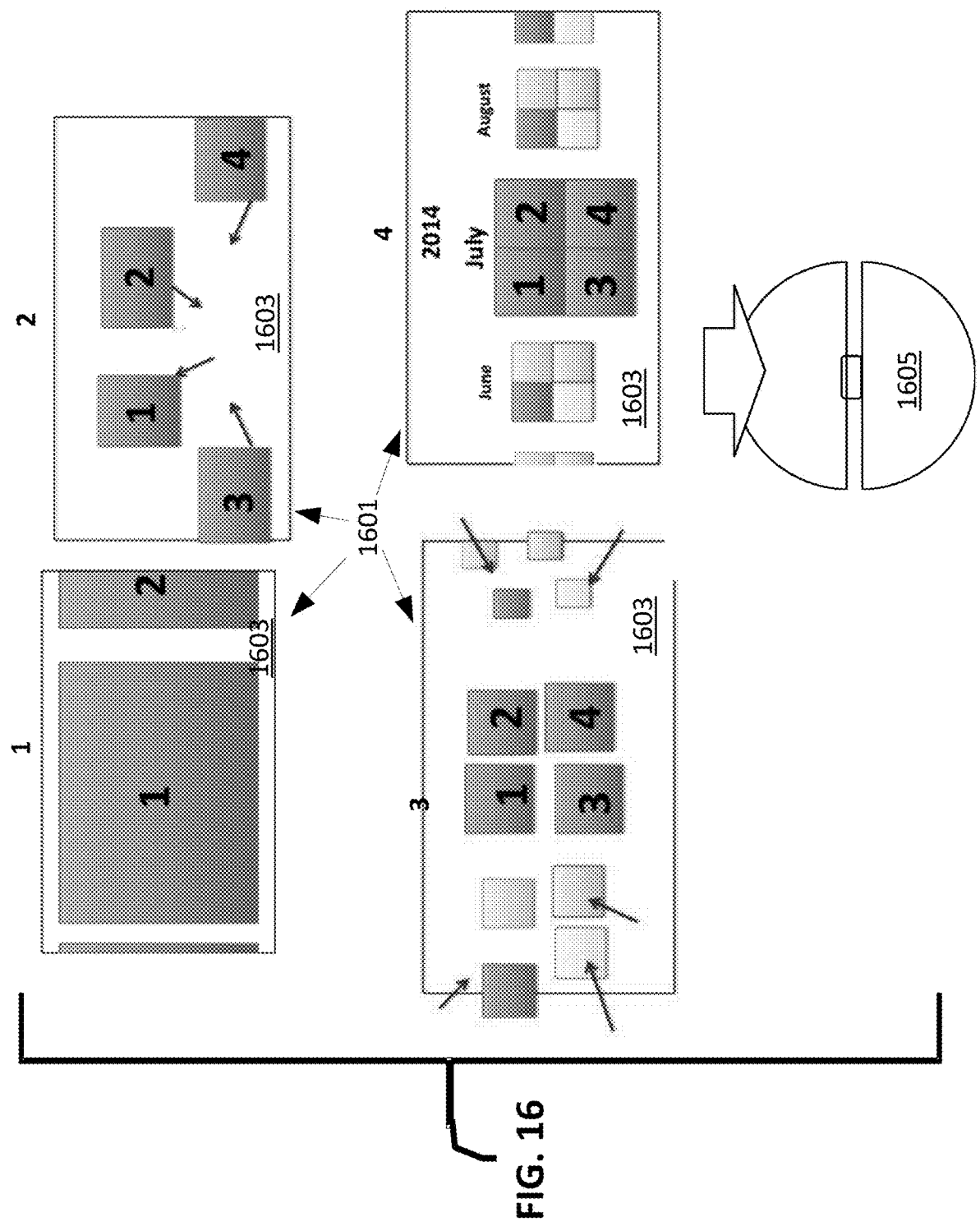
FIG. 16 shows a diagram of an embodiment of a method of using a wireless input device with a user interface.

FIG. 16 shows a diagram of an embodiment of a method of using a input device in a user interface system 1600. User interface system 1600 can include a screen 1601, a user interface 1603, and an input device 1605. In other embodiments the system 1600 may not have all of the elements or features listed and/or may have other elements or features instead of or in addition to those listed.

Input device 1605 may be an embodiment of input device 105 in FIG. 1, input device 205 in FIG. 2, input device 305 in FIG. 3, input device 405 in FIG. 4, input device 605 in FIG. 6, input device 705 in FIG. 7, input device 805 in FIG. 8, input device 905 in FIG. 9, input device 1005 in FIG. 10, input device 1205 in FIG. 12, input device 1305 in FIG. 13, input device 1405 in FIG. 14 and input device 1505 in FIG. 15. Screen 1601 and user interface 1603 can be embodiments of screen 101 and user interface 103 in FIG. 1 or screen 1301 and user interface 1303 in FIG. 13 or screen 1401 and user interface 1403 in FIG. 14 or screen 1501 and user interface 1503 in FIG. 15. FIG. 16 provides more information about the transition between the regular (R) view and the calendar (C) view (see (c) in FIG. 11) in the user interface 1603.

The top right FIG. 16 of the input device 1605 shows the long pressure movement of the top shell of the input device 1605 and how the movement results in changes to the user interface 1603. FIG. 16 shows how long pressing the top shell of the input device 1605, or pressing down and turning the top shell of the input device 1605 at the same time, triggers a transition from (1) to (4). If the action of turning and pressing is held for at least 500 ms, the transition will occur. Letting go of the press will reverse the motion from (4) to (1). A selected number of images representing a particular month will scale and change position at the same time to form a collage image. Images both on screen and off screen will animate to form the calendar view.

FIG. 17 shows a comparison of the actions of the input device 1705 on the user interface when compared to other input methods. Input device 1705 can be an embodiment of input device 105 in FIG. 1, input device 205 in FIG. 2, input device 305 in FIG. 3, input device 405 in FIG. 4, input device 605 in FIG. 6, input device 705 in FIG. 7, input device 805 in FIG. 8, input device 905 in FIG. 9, input device 1005 in FIG. 10, input device 1205 in FIG. 12, input device 1305 in FIG. 13, input device 1405 in FIG. 14, input device 1505 in FIG. 15, and input device 1605 in FIG. 16. FIG. 17 is a table showing the input device 1705 compared to other typical devices and/or hand motions. The FIG. 17 is a table with three rows. The FIG. 17 shows that if the user knows how to use a typical remote device or even hand gestures, then the motions of the input device will be intuitive. The top row is the input device showing the rotation and button functions. The next row shows a typical "5 way remote" with the functions compared to the input device (above). The bottom row shows hand gestures and compares those to the gestures/functions of the input device.

Figure 18:
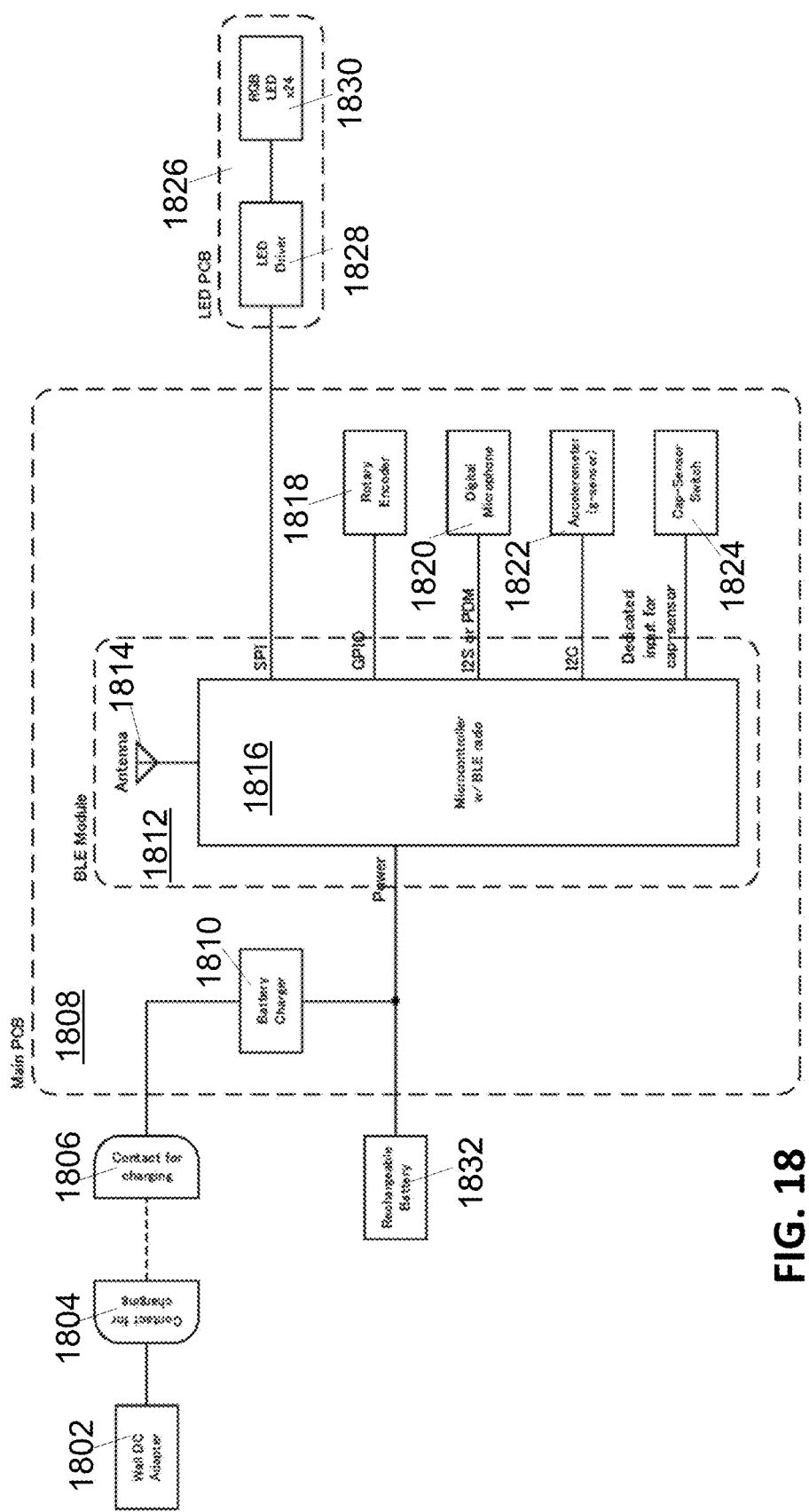
FIG. 18 shows a block diagram of an embodiment of a circuit diagram for a wireless input device.

Circuit Diagrams (FIGS. 18-19)

FIG. 18 shows a block diagram of an embodiment of a circuit diagram for a circuit 1800 of an input device 1801. Circuit 1800 may include adaptor 1802, connector 1804, connector 1806, main board 1808, battery charger 1810, module 1812, antenna 1814, microcontroller 1816, position encoder 1818, microphone 1820, motion sensor 1822, cap sensor 1824, lighting module 1826, light river 1828, light 1830, battery 1832. In other embodiments the system 1300 may not have all of the elements or features listed and/or may have other elements or features instead of or in addition to those listed.

Circuit 1800 is the electronic circuit that is within the input device. Circuit 1800 is responsive to the user interacting with the input device, by for example, turning the top shell of the input device, pushing the top shell of the input device downwards, the user making gestures with the users arms while holding the input device. In response to the user interacting with the input device, signals are generated by circuit 1800 and sent to a computer (e.g., a portable computer, such as a stick computer) that is plugged into a viewing device and causes the viewing device to display pictures and navigate through a set of pictures. The Circuit 1800 may also receive signals from the computer, and in response change modes, for example.

Input device 1801 may be an embodiment of any of input devices 105, 205, 305, 405, 605, 705, 805, 905, 1005, 1105, 1205, 1305, 1405, 1505, 1605, and/or 1705.

Adaptor 1802 is a power adaptor that converts energy (e.g., electrical energy) available from a particular source (such as a wall socket) to the electrical energy needed by input device 1801. For example, adaptor 1802 may convert AC electricity available via a wall socket into DC electricity that is used by the input device 1801. The electricity supplied by adaptor 1801 may be used for charging a battery within input device 1800 and/or running input device 1801.

Connector 1804 is an electrical connector that electrically connects adaptor 1801 to input device 1801 to supply electricity to input device 1801. Adaptor 1802 and connector 1804 may be located in a place that is external to input device 1801.

Connector 1806 is an electrical connector located on input device 1801. Connector 1806 connects to connector 1804 to form an electrical connection, via which electricity is transferred from the wall (or other source) into input device 1801.

Main board 1808 includes the components of the circuit 1800 that determine how input device 1801 behaves.

Battery charger 1810 provides electrical power to a battery that charges the battery. Battery charger 110 is electrically connected to connector 1806, and receives electrical power from an electrical source, such as the wall, via adaptor 1802, connector 1804 and connector 1806, which is used for charging the battery.

Module 1812 senses the motion of the various components of input device 1801 (such as the spinning of the shell, the tapping on the shell, and the moving of the input device 1801), communicates with the computer, controls the lights on input device 1801, and determines the response to the various motions of the components of the input device 1801. Module 1812 may be Bluetooth Enabled (BLE).

Antenna 1814 is within module 1812 and enables module 1814 to communicate with the computer. Antenna 1814 receives signals from the computer and transmits the signals received to a microcontroller on module 1812. Antenna 1814 also sends signals from the microcontroller to the computer.

Microcontroller 1816 is part of module 1812 and is attached to antenna 1814, communicates with the computer via antenna 1814. Microcontroller 1816 may include a processor system including one or more processor communicatively coupled to a memory, which may store machine instructions for carrying out the tasks performed by microcontroller 1816 and/or which may store result of computations, incoming signals, and outgoing signals. Some or all of the machine instructions may be hardwired into microcontroller 1816. Microcontroller 1816 also receives signals from various sensors and determines based on the signals from the sensor what signals to send to the computer. Microcontroller 1816 also determines when to turn on and off the lights, and which lights to turn on and off, depending the current mode, signals from the sensors, and optionally input from the computer regarding the state of the system. Microcontroller 1816 may be Bluetooth enabled and may communicate with the computer (and/or other devices) via Bluetooth, ultrasound, other sonic signals and/or infrared signals. Microcontroller may include software are hardware for recognizes voice commands.

Position encoder 1818 may determine the rotational position of the top shell with respect to the bottom shell, and sends signals indicating the position of the shell to microcontroller 1816. Position encoder 1818 may be a ring encoder and may part of the module 1812. Position encode 1818 may be an embodiment of ring encode 425 (FIG. 4) or 525 (FIG. 5).

Microphone 1820 receives sound and converts sound to electrical signals that are sent to microcontroller 1816. Microphone 1820 may be used for receiving Bluetooth signals, ultrasound signals, infrasound signals, and/or voice commands, which are interpreted by microcontroller 1816. Microphone 1820 may be part of module 1812.

Motion sensor 1822 may be an accelerometer. Motion sensor 1822 may sense the positions and motion of the input device 1801, so as to detect arm gestures of the user, such shaking input device 1801, turning input device 1801 upside down, moving input device 1801 is a large arc. In an embodiment there is one accelerometer. In another embodiment, there are two or three accelerometers—one for detecting motion along each of two or three perpendicular axis, respectively. Alternatively motion sensor 1822 may include a gyro and magnet and is free to move in one or more direction (e.g., slide back and forth along within a tunnel surrounded by the coil or toroid made of the coil), which generate as current as the magnet moves with the coil.

Cap sensor 1824 detects whether the top shell of input device 1801 is depressed with respect to bottom shell of input device 1801, and may detect the degree to which the top shell of input device 1801 is depressed with respect to bottom shell of input device 1801. For example, cap sensor 1824 may include multiple switches or different heights that are each activated once the top shell is pushed down beyond a certain point. Cap sensor 1824 may be an embodiment of button 488 or 688, for example. Optionally, cap sensor may include a second switch on the shell, such as a capacitive switch or a push button switch in addition to the switch connected to the top shell (that is in addition to the switch that is activated by pushing down on the top shell. The second switch may turn on the microphone, and cause the input device to accept voice command (and/or change the mode of input device 1801 in another manner). Cap sensor 1824 may include any of switches 488, 688, 795, and/or 796, for example.

Lighting module 1826 receive signals from module 1812, by receiving signals from microcontroller 1816, which cause one or more lights to turn on and/or off. Light driver 1828 convert signals from microcontroller 1816 into power signals that turn on and/or keep on one or more lights (depending on the signal received from microcontroller 1816). Light driver 1828, in response to a signal form microcontroller 1816 may cease sending power to one or more lights. In an embodiment, light driver 1828 is a driver for a Light Emitting Diode (LED).

Light 1830 includes one or more lights are turned on, kept on and/or turned off my light driver 1828. Light 1830 may include lights of different colors, where different colors may indicate different states of the system and/or input device 1801. Light 1830 may be one or more LEDs. In other embodiments, light 1830 may include other types of lights, such as incandescent light bulbs and/or fluorescent light bulbs.

Battery 1832 powers the ultrasound device 1801. For example, battery 1832 may provide electricity to module 1812, microcontroller 1816, position encoder 1818 (if needed), microphone 1820, motion sensor 1822, cap sensor 1824 (if needed), lighting module 1826, light driver 1828, and/or light 1830. Battery 1832 is charged by battery charger 1810.

FIG. 19A shows a block diagram of an embodiment of a computer for the input device to communicate with a GUI on a screen 1900. The computer may include transceiver 1904, memory system 1906, processor system 1908, connector 1912, and receiver device 1914. In other embodiments, computer 1900 may include additional components and/or may not include all of the components listed above.

Computer 1900 is an example of a computer that may be used for the computer 102 of FIG. 1. The computer 1900 may be a High-Definition Multimedia Interface- (HDMI) based stick computer that is physically removably attached to, by being plugged into, a screen, and wirelessly connected to the interne via Wi-Fi.

Input system 1904 may include a transceiver 1904. The transceiver may be combination of a transmitter and a receiver, which may or may not share a common circuitry or a single housing. Memory system 1906 may include, for example, any one of, some of, any combination of, or all of a long term storage system, such as a hard drive; a short term storage system, such as random access memory; a removable storage system, such as a floppy drive or a removable drive; and/or flash memory. Memory system 1906 may include one or more machine-readable mediums that may store a variety of different types of information. The term machine-readable medium is used to refer to any nonvolatile physical medium capable carrying information that is readable by a machine. One example of a machine-readable medium is a computer-readable medium.

Processor system 1908 may include any one of, some of, any combination of, or all of multiple parallel processors, a single processor, a system of processors having one or more central processors and/or one or more specialized processors dedicated to specific tasks. Also, processor system 1908 may include one or more Digital Signal Processors (DSPs) in addition to or in place of one or more Central Processing Units (CPUs) and/or may have one or more digital signal processing programs that run on one or more CPU.

Connector 1912 communicatively links Transceiver system 1904, memory system 1906, processor system 1908, and/or Receiver system 1914 to each other. Connector system 1912 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Receiver system 1914 may include devices that function as an input device (a receiver).

Figure 19B:
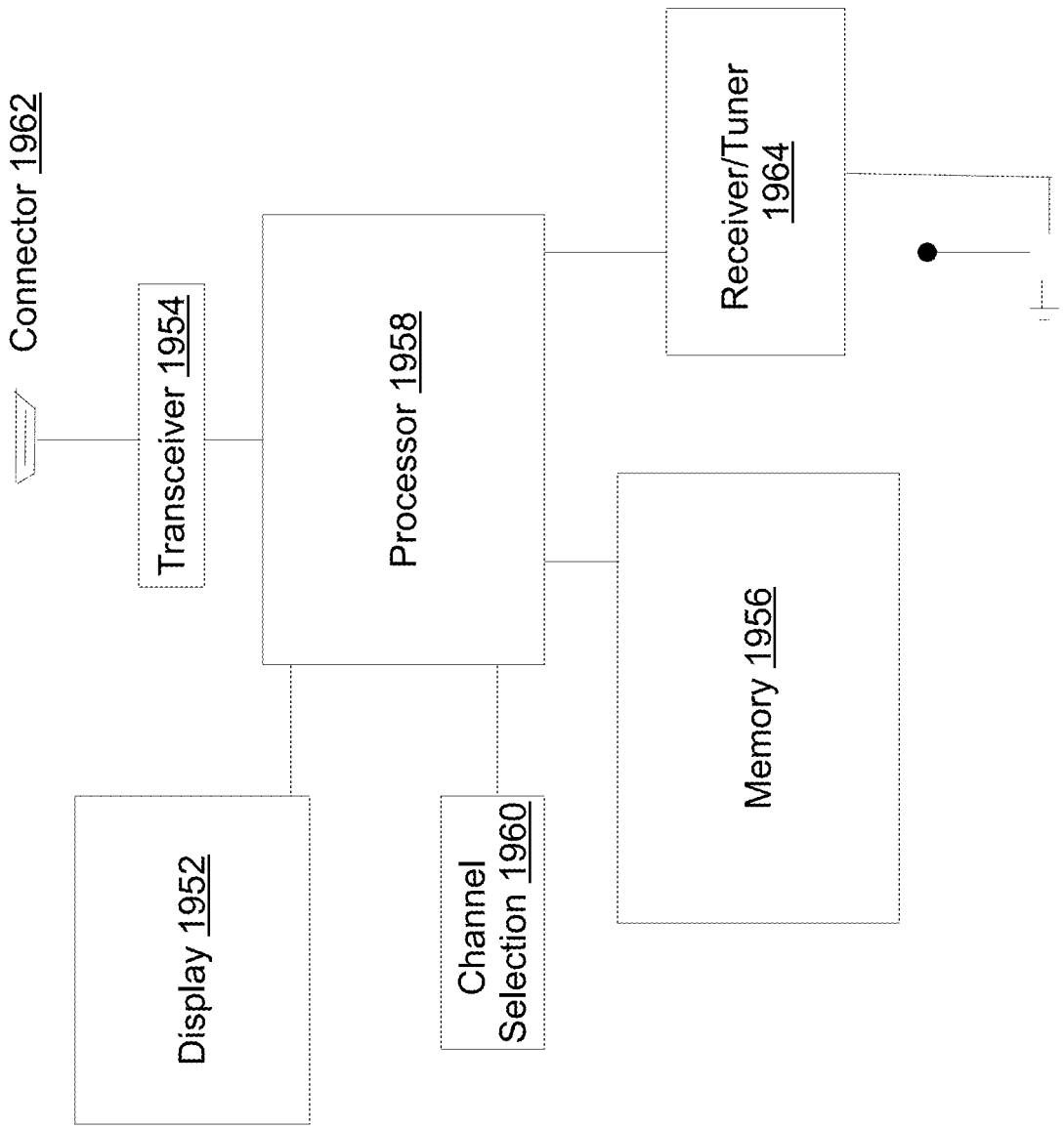
FIG. 19B shows a block diagram of an embodiment of a display device for displaying the GUI and images.

FIG. 19B shows a block diagram of a computer 1950 used in the system of FIG. 1. The computer may include output system (display) 1952, transceiver 1954, memory system 1956, processor system 1958, channel selection 1960, connector 1962, and receiver/tuner device 1964. In other embodiments, computer 1950 may include additional components and/or may not include all of the components listed above.

Computer 1950 is an example of a computer that may be used for the computer 102 of FIG. 1. The computer 1950 may be a High-Definition Multimedia Interface- (HDMI) based stick computer that is physically attached to a screen and wirelessly connected to the internet via Wi-Fi.

Display 1952 or Output system 1952 may include any one of, some of, any combination of, or all of a display monitor system, a handheld display system, a printer system, a speaker system, a connection or interface system to a sound system, an interface system to peripheral devices and/or a connection and/or interface system to a computer system, intranet, and/or internet, for example.

Input system 1954 may include a transceiver 1954. The transceiver may be both a transmitter and a receiver which are combined and share common circuitry or a single housing.

Memory system 1956 may include, for example, any one of, some of, any combination of, or all of a long term storage system, such as a hard drive; a short term storage system, such as random access memory; a removable storage system, such as a floppy drive or a removable drive; and/or flash memory. Memory system 1956 may include one or more machine-readable mediums that may store a variety of different types of information. The term machine-readable medium is used to refer to any medium capable carrying information that is readable by a machine. One example of a machine-readable medium is a computer-readable medium.

Processor system 1958 may include any one of, some of, any combination of, or all of multiple parallel processors, a single processor, a system of processors having one or more central processors and/or one or more specialized processors dedicated to specific tasks.

Connector 1962 communicatively links output system 1952, transceiver system 1954, memory system 1956, processor system 1958, channel selection 1960 and/or receiver/tuner system 1964 to each other. Connector system 1962 may include any one of, some of, any combination of, or all of electrical cables, fiber optic cables, and/or means of sending signals through air or water (e.g. wireless communications), or the like. Some examples of means of sending signals through air and/or water include systems for transmitting electromagnetic waves such as infrared and/or radio waves and/or systems for sending sound waves.

Receiver/tuner system 1964 may include devices that have the dual function as an input device (a receiver) and a tuner. The tuner filters out the frequency for a particular television station when the display that is used is a Television.

Method of Using

Figure 20:
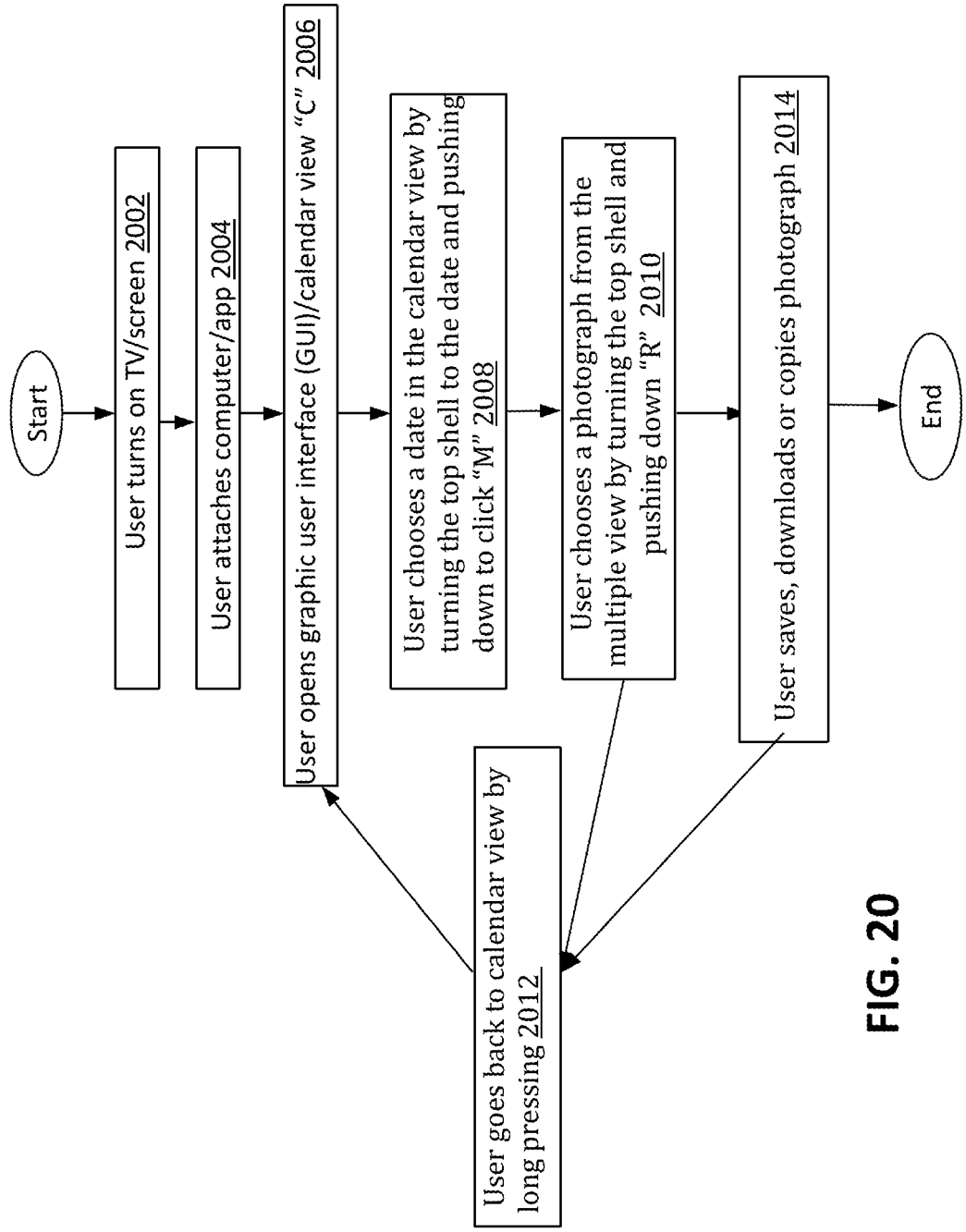
FIG. 20 shows a flowchart of an embodiment of a method of using the system of FIG. 1.

FIG. 20 shows a flowchart of an embodiment of general method 2000 in which an input device is used to scroll and choose between diagrams in a GUI.

In step 2002, the user turns on the screen. The screen may be a television screen, an HDMI screen, a computer screen, or any type of screen usable in the method of using an input device to manipulate photographs. The screen may be an embodiment of the screens 101 in FIG. 1, 1101 in FIG. 11, 1201 in FIG. 12, 1301 in FIG. 13, 1401 in FIG. 14, 1501 in FIG. 15, and 1601 in FIG. 16.

In step 2004, the user attaches the computer/app. The computer containing the application that controls the user interface and/or the methods of using the input device to manipulate the user interface may be any computer discussed herein. In some embodiments, the computer is the computer with app 102 that is discussed in FIG. 1. The computer containing the application that allows the user to manipulate the photographs with the input device can be attached to the screen in any way that results in an operable input device.

In step 2006, the user opens the user interface (e.g., a graphic user interface GUI) at the calendar view "C". The user interface may be an embodiment of the user interface 103 in FIG. 1, 1103 in FIG. 11, 1203 in FIG. 12, 1303 in FIG. 13, 1403 in FIG. 14, 1503 in FIG. 15, and 1603 in FIG. 16. The calendar view provides the user with a listing of years and months containing photographs. The photographs are listed based on the date the photographs were taken. The listing may be provided first as a listing of years with a sample of photographs from the years shown underneath. The user may first choose a year and then be given a listing of months in that year with the sample of photographs provided for each month. An example of the calendar view is given in FIG. 11. In this example, each month in the year 2014 shows a sample of four photographs from that month to help orient the user to what was going on in that month. The user may scroll through the sample months by turning the top shell of the input device clockwise or counterclockwise.

In step 2008, when the user finds the year and month they want, the user chooses the photographs in that date in the calendar view by pushing down on the top shell of the input device. This activates the button and chooses the month, thus showing more of the photographs in that month in a multiple view "M". The multiple view is shown in FIGS. 11 and 13.

These figures show that the photographs in the multiple view may be shown in the size and shape they have been saved. The user may scroll through the multiple view by turning the top shell of the input device clockwise or counterclockwise in relation to the bottom shell of the input device.

In step 2010 the user chooses a photograph from the multiple view by turning the top shell of the input device and pushing down. Turning the top shell and pushing down chooses the photograph and provides it to the user in the regular view "R". The user may scroll through the regular view R to look at other photographs in that month by turning the top shell clockwise or counter clockwise with respect to the bottom shell. Alternatively, the user may realize this is the wrong date and may go to step 2012. Alternatively, the user may choose the photograph in the regular view R and continue to step 2014 (step 2014, will be discussed below).

In step 2012, the user may go back to the calendar view by long pressing the input device. Long pressing involves pressing the top shell of the input device down and turning the top shell clockwise or counterclockwise at the same time. Long pressing triggers a transition from the regular view to the calendar view (see e.g., FIG. 16). In other embodiments, long-pressing may trigger a transition from the multiple view to the calendar view (see FIG. 15).

In step 2014, the user saves, downloads, prints or copies the photograph.

In an embodiment, each of the steps of method 2000 is a distinct step. In another embodiment, although depicted as distinct steps in FIG. 20, step 2002-2014 may not be distinct steps. In other embodiments, method 2000 may not have all of the above steps and/or may have other steps in addition to or instead of those listed above. The steps of method 2000 may be performed in another order. Subsets of the steps listed above as part of method 2000 may be used to form their own method.

Method of Making the Input Device

Figure 21:
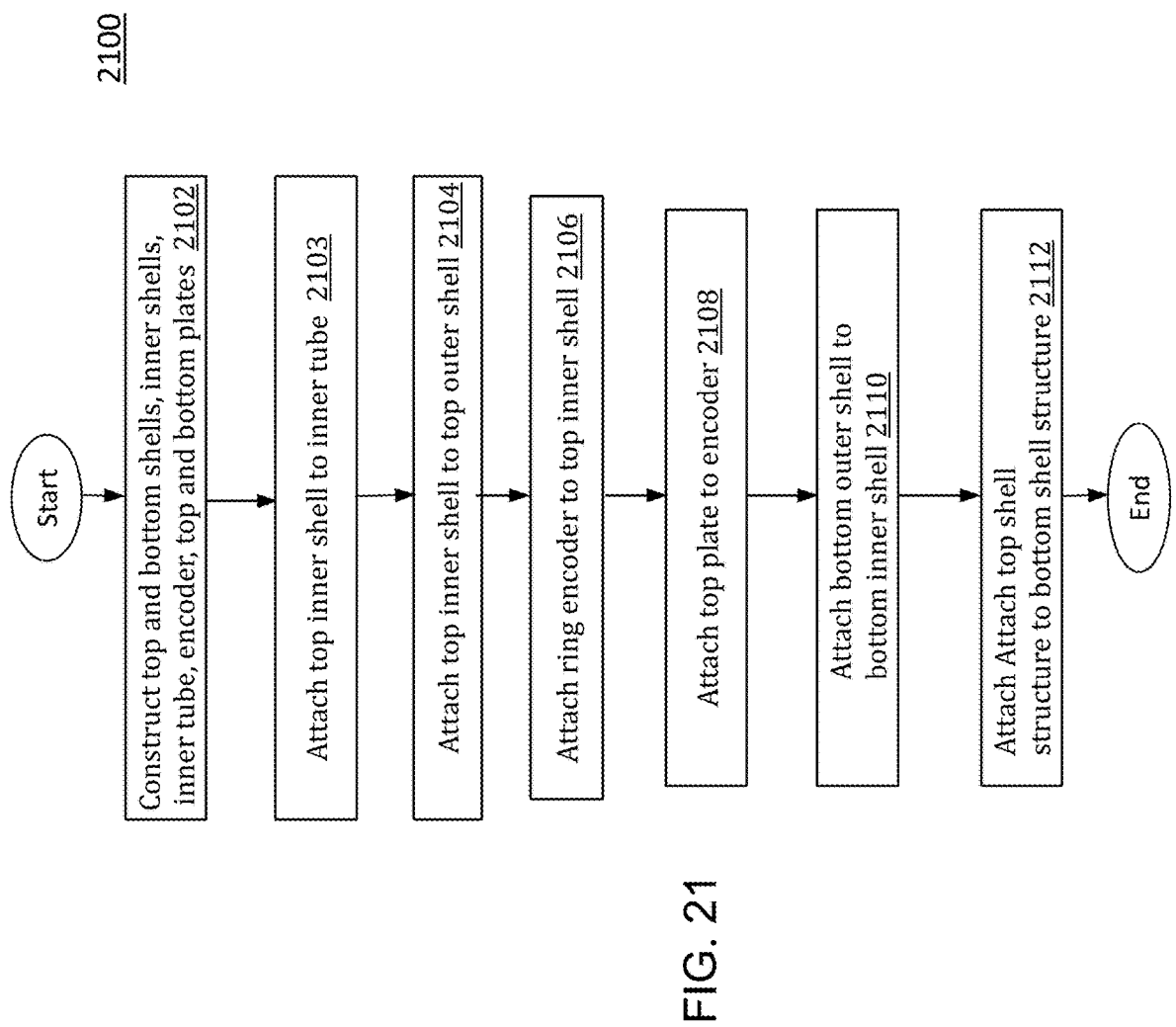
FIG. 21 shows a flowchart of an embodiment of a method of making a wireless input device.

FIG. 21 shows a flowchart of an embodiment of method 2100 in which an input device is manufactured.

In step 2102, the top shell 610, bottom shell 680, top inner shell 615, top plate 640, center post 650, bottom plate 670, bottom inner shell 675, and encoder 625, are constructed (see FIG. 6A). The top shell, bottom shell, inner shells and inner plates may be constructed as shown in FIG. 4 (as top shell 410, bottom shell 480, inner shells 415 and 475). The top shell and bottom shell may include a design such as that shown in FIGS. 2-4 and 7. The encoder may be a ring encoder. The encoder may be constructed as shown in FIG. 5.

In step 2103, the center post (see 450 in FIG. 4A) is attached to the top inner shell (see 415 in FIG. 4B). The attachment may use any method known in the art. In one embodiment, shown in FIG. 4, the center post is attached to the top inner shell using at least two screws (see 407a and 407b).

In step 2104, the top inner shell is attached to the top outer shell (the top shell). Step 2104 may be implemented by welding and/or melting the top inner shell is to the top outer shell. In another embodiment, fasteners (e.g., clips, screws, pegs, and/or staples), adhesives and/or glue or other methods may hold the top inner shell is to the top outer shell. However, in FIG. 4, the top inner shell is attached to the top outer shell via screws (see 409a and 409b). The attachment of the top outer shell to the top inner shell creates a top shell structure.

In step 2106, the encoder is attached to the top inner shell (the top shell structure). The encoder may be attached using any methods known in the art. In one embodiment, shown in FIG. 4, the encoder is attached by fitting the tabs (see 426b) on the encoder (see 425) into the top plate (see 440). The encoder is also held in place via protuberances on the top of the encoder (see 427) which interact with the opposite protuberance on the top inner shell (see top inner shell protuberance 416 on inner shell 415).

In step 2108, the top plate is attached to the encoder (and the top shell structure). The top plate may be attached using any method known in the art. In one embodiment shown in FIG. 4, the top plate (440) is attached to the top shell via two screws (see 442a and 442b).

In step 2110 the bottom outer shell (bottom shell) is attached to the bottom inner shell to create a bottom shell structure. The bottom outer shell may be attached to the bottom inner shell using any method known in the art. In one embodiment shown in FIG. 4, the bottom outer shell (480) is attached to the bottom inner shell (475) via two screws (see 487a and b). The attachment of the bottom outer shell to the bottom inner shell creates a bottom shell structure.

In step 2112 the top shell structure is attached to the bottom shell structure. The bottom shell structure is attached to the bottom shell structure using any method known in the art. In FIG. 4A an embodiment is shown in which screws (see 442a and 442b) are used. In at least one embodiment, the attachment of the two structures creates a gap (see, for example, 230 in FIG. 2, 330 in FIG. 3, and 430 in FIG. 4). The gap allows for movement of the top shell, when pushed, down toward the bottom shell, reducing the size of the gap. A light may be included in the structure that can be seen through the gap. The light may indicate that the top shell has been pushed down enough that the center post contacts the button on the bottom of the bottom inner shell.

In an embodiment, each of the steps of method 2100 is a distinct step. In another embodiment, although depicted as distinct steps in FIG. 21, step 2102-2112 may not be distinct steps. In other embodiments, method 2100 may not have all of the above steps and/or may have other steps in addition to or instead of those listed above. The steps of method 2100 may be performed in another order. Subsets of the steps listed above as part of method 2100 may be used to form their own method.

Graphical User Interface (GUI)

FIGS. 22-44 provide embodiments of applications for use with an input device (such as the device shown in FIGS. 2-7) and a wireless input device system such as that shown in FIG. 1. The graphical user interface includes a photo layout algorithm, a timeline expression, methods such as morphing between single view (Regular view R) and Tile view (Multiple view M), and image navigation assistance. FIGS. 11-16 may provide other information and more embodiments of the GUI for use with the input device.

Navigation Assistant

Figure 22:
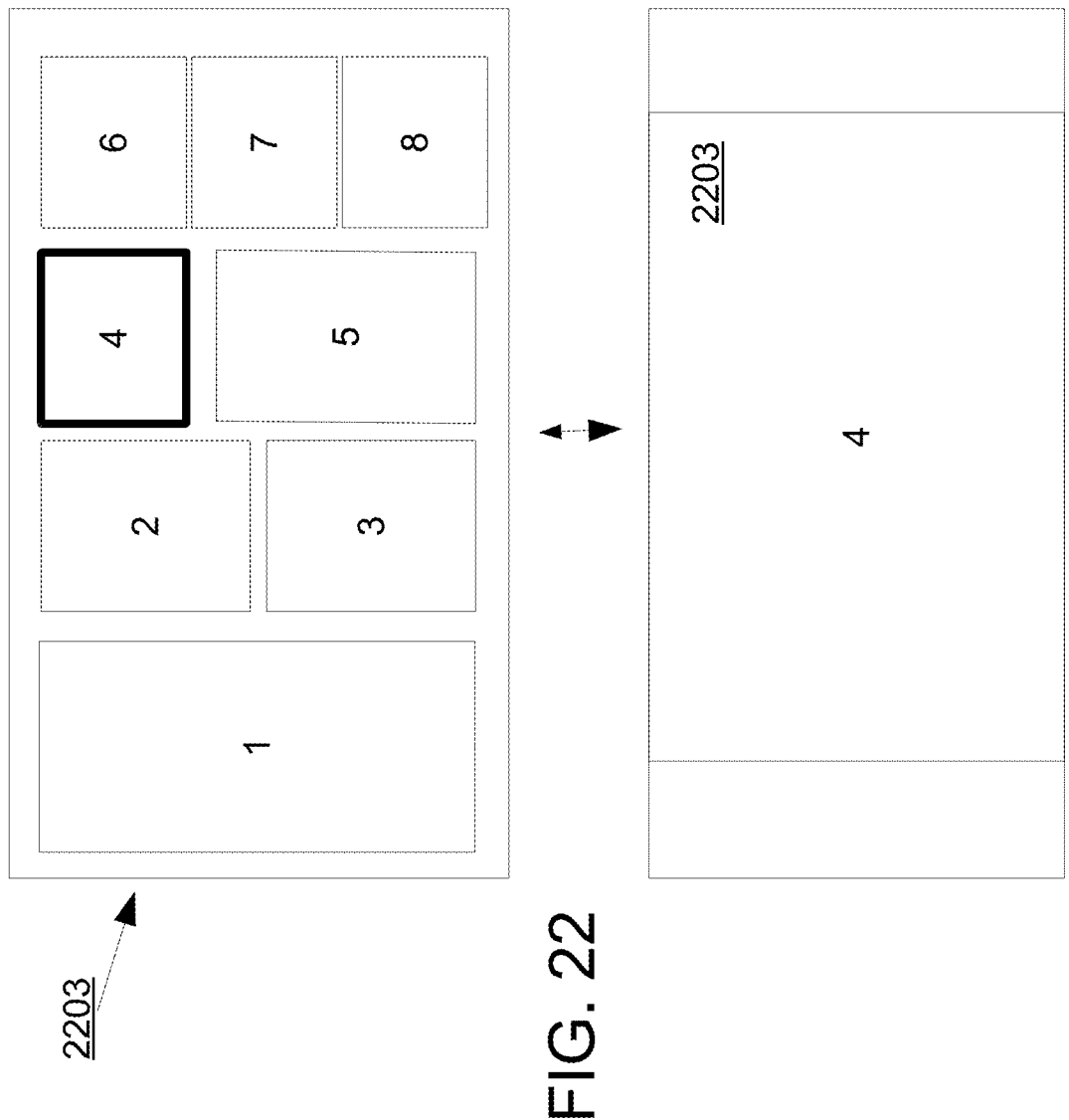
FIG. 22 shows a diagram of an example of morphing.

In FIG. 22, a method of moving between views is shown (e.g., morphing). The system allows the user to toggle between a Multiple view (a Tile view) and a Regular view (a single view) with a push of the button on the input device. Thus, in an embodiment, in FIG. 22, after the tile shown as number 4 is chosen/selected in the multiple view (having multiple tiles (each having a picture) visible in the window being viewed, then clicking the button on the input device causes the view to move smoothly into the regular view with tile 4 filling the window being viewed and the other tiles no longer visible. When the button is pushed again, the view can return to the multiple view.

Figure 23:
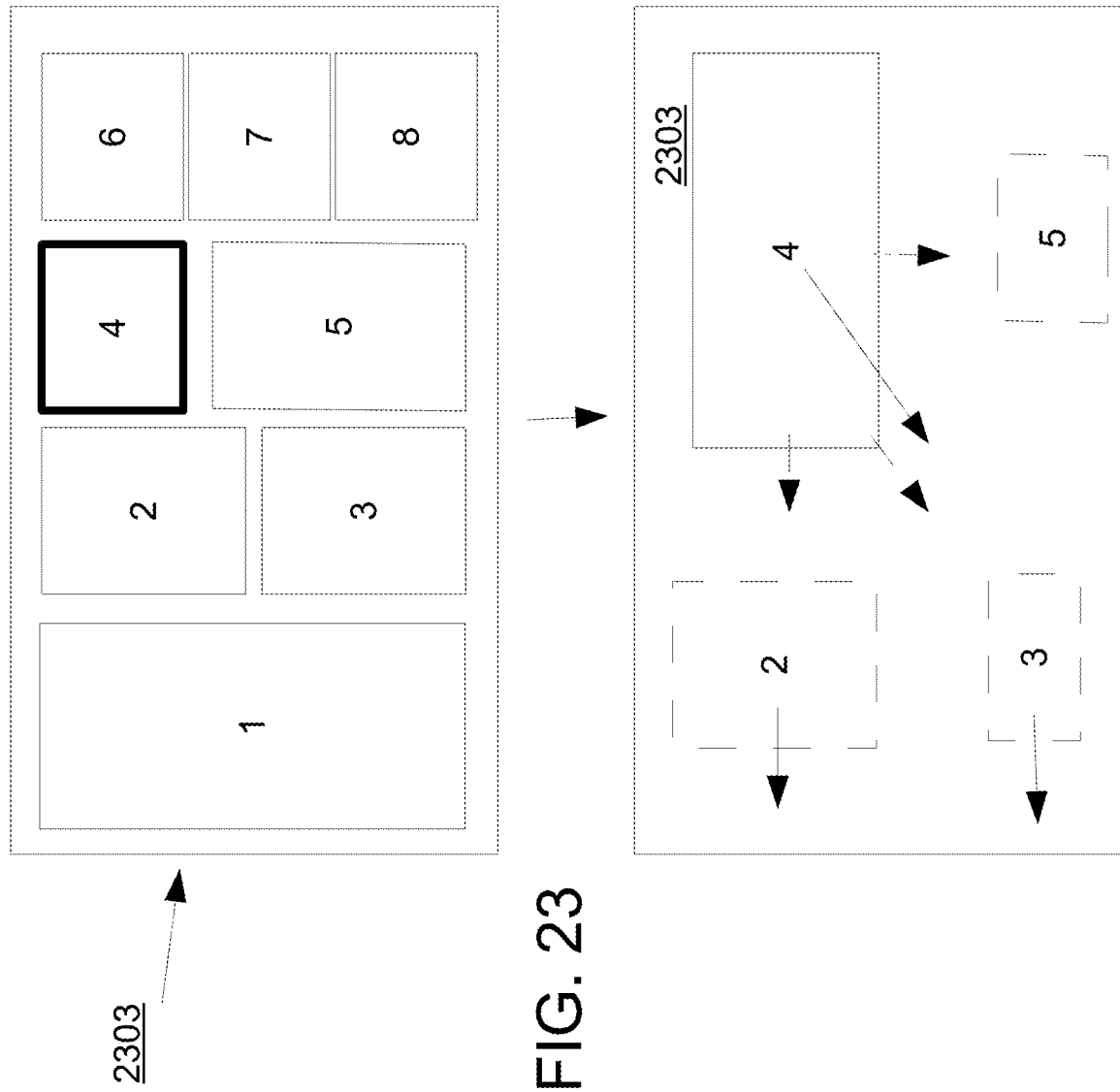
FIG. 23 shows a diagram of an example of a fading.

In FIG. 23, a method of fading between views is shown. When the user clicks the button, the image in focus (the image that is highlighted with a square) expands and fills the screen as the image moves to the center, while the other images smoothly fade and move off screen by traveling in a direction moving away from the selected tile as the selected tile expands. The reverse can also happen with the click of the button. Thus, in view (1), the tile 4 is highlighted. When the user clicks the button, the other tiles fade (see view 2), tile 4 is placed in the center of view 3, and then fills the view in view 4. The method of FIG. 23 may be used to switch between the two views of FIG. 22. The reverse process may be used for switching from the single tile view back to the multi-tile view.

Figure 24:
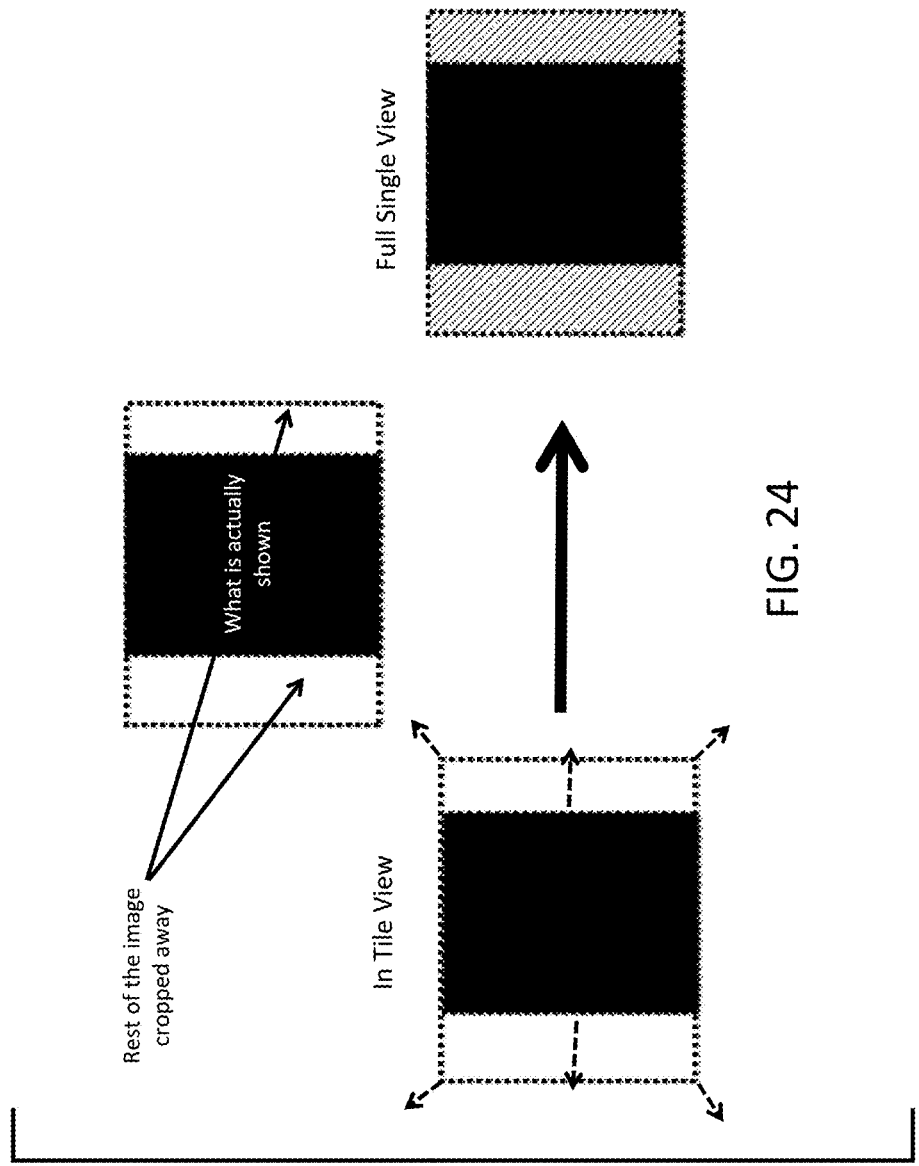
FIG. 24 shows a diagram of an example of cropping.

In FIG. 24, the use of cropping and enlarging to smoothen the animation while transitioning is shown. FIG. 24 shows how the GUI may crop images to better fit the tile in tile view. For example, the top image is of a shape that does not fit the tile in tile view (the multiple tile view). So, the rest of the image is cropped away creating an image of the shape provided in the Tile view. Then, if the user clicks on the input device, the image is shown in single view as a full image by uncropping and enlarging at the same time to fill the screen. The uncropping may occur when transitioning from multi-tile view and the top of FIG. 22 to the single tile view at the bottom of FIG. 22, whereas the picture may be cropped when transitioning from the single tile view at the bottom of FIG. 22 to the multi-tile view at the top of FIG. 22.

Figure 25:
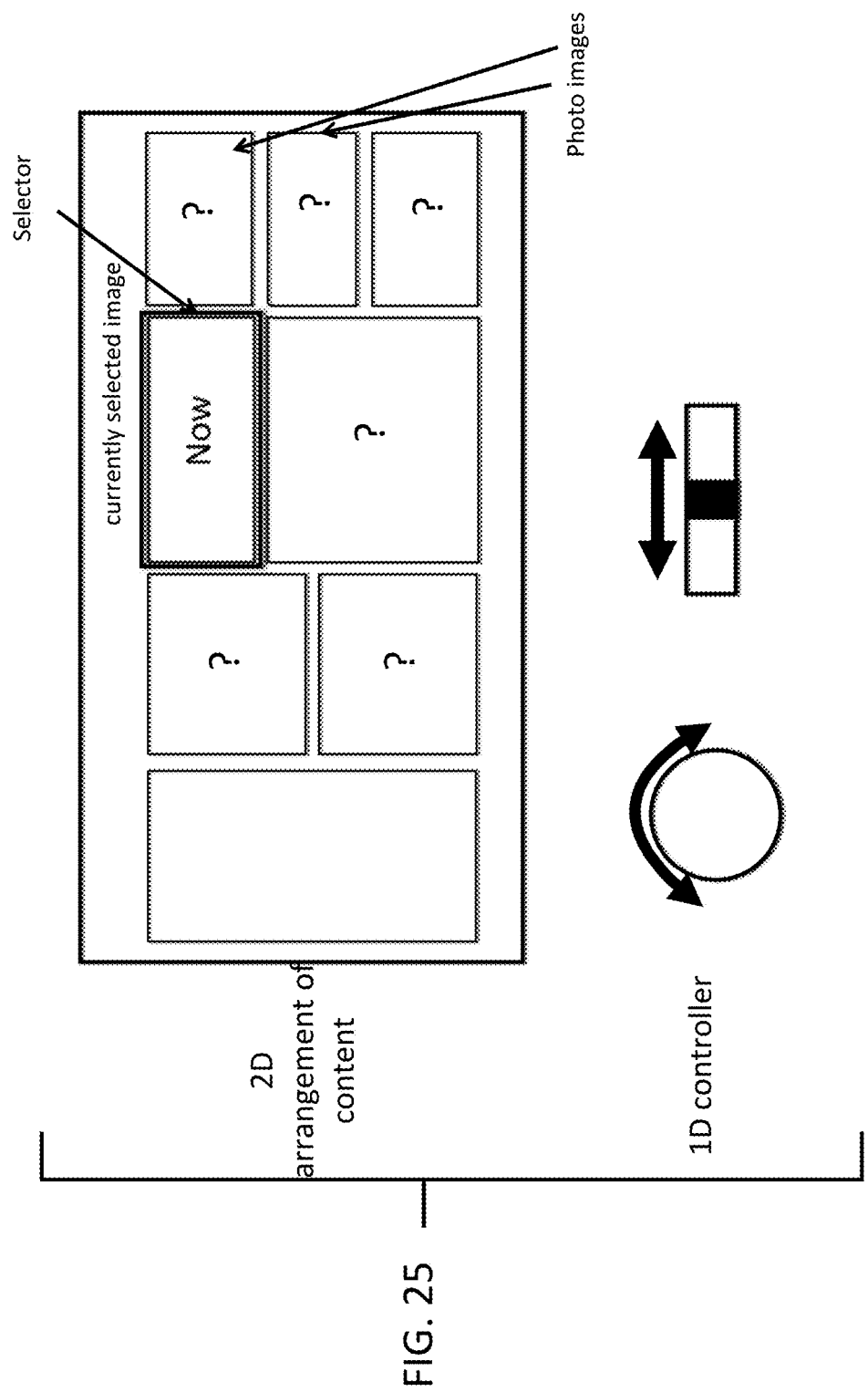
FIG. 25 shows a diagram of an embodiment of an example of navigating a user interface for use with a wireless input device showing an example of navigation assistance.
Figure 26:
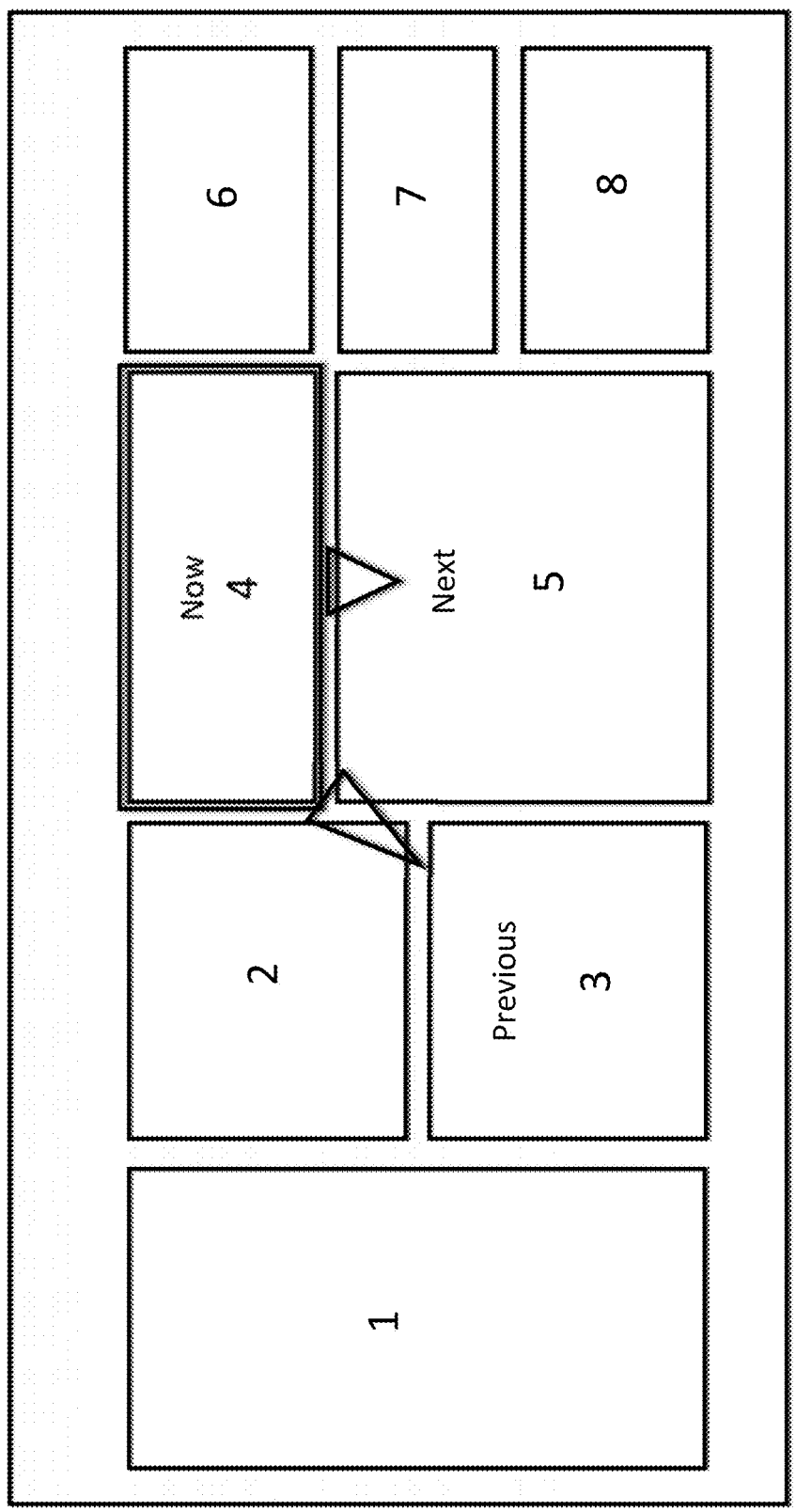
FIG. 26 shows a diagram of an embodiment of a user interface for use with a wireless input device showing a navigation assistance pattern (A).

In FIG. 25, the method of navigation assistance within the GUI is shown. The method of navigation assistance solves the problem of the user not knowing what item will be selected the next or what item was selected previously in a 2-dimensional arrangement of an object using a 1-dimensional selection method such as a wheel or lever input device. Without the method of FIG. 25, depending on the layout of the object in 2 dimensions, it may not be readily apparent to the user where the selector will move to, next, as the user scrolls by turning the top shell of the input device. In FIG. 25, the user is viewing the tile or multiple view with a number of images. The "now" image is currently selected. The user may not know where the selector will go next (see below the screen). The tiles having question marks indicate some the many different tiles that logically would appear to be possible candidates for the next tile to be selected. Since there are multiple possible tiles that may be selected next, the user may be confused, and may find the actual behavior of the system to be a surprise and/or confusing. FIGS. 26-28 provide three possible methods for assisting the user in navigation so that the behavior of the system is more predictable to the user.

In FIG. 26, one embodiment of a navigation assist pattern (A) is shown. In the FIG. 26, small arrows point to the next image and a large arrow points to the previous image to move to, if the top shell of the input device is turned in one direction. Alternatively, a large arrow points to the next image and a small arrow points to the previous image to move to, if the top shell of the input device is turned in one direction (alternatively both arrows may be the same size). In an embodiment, to change which tile is selected, the user pushes down on the top shell as the user rotates the top shell (in an alternative embodiment, the user only needs to turn the top shell without pressing the top shell down to cause a change as to which tile is currently selected). Once the movement of the selector occurs (as the user pushes down on the top of the input device), as which tile is selected changes, the arrows also shift to indicate the next "Next/Previous" content appropriately. In FIG. 26, tile 4 is selected and the arrows indicate what the next tile that is selected will be and what the previous tile was. As shown in the Tile view in FIG. 26, the numbers on the tiles are in order that the tiles will be selected as determined by the system but which might not necessarily be apparent to the operator of the system without the arrows of FIG. 25, for example, or another indication as to what order the items will be selected as the user turns the top shell of the input device (in an embodiment numbers may appear on top or and/or next to the tiles that indicate the order in which the tiles will be selected as the user turns the top shell of the input device).

Figure 27A:
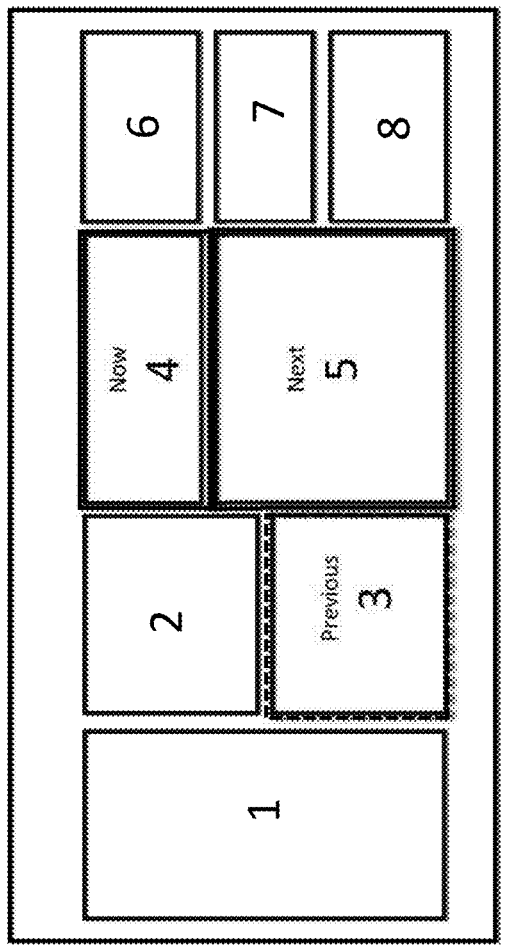
FIGS. 27A and 27B show diagram of an embodiment of a user interface for use with a wireless input device showing navigation assistance patterns (A and B).
Figure 27B:
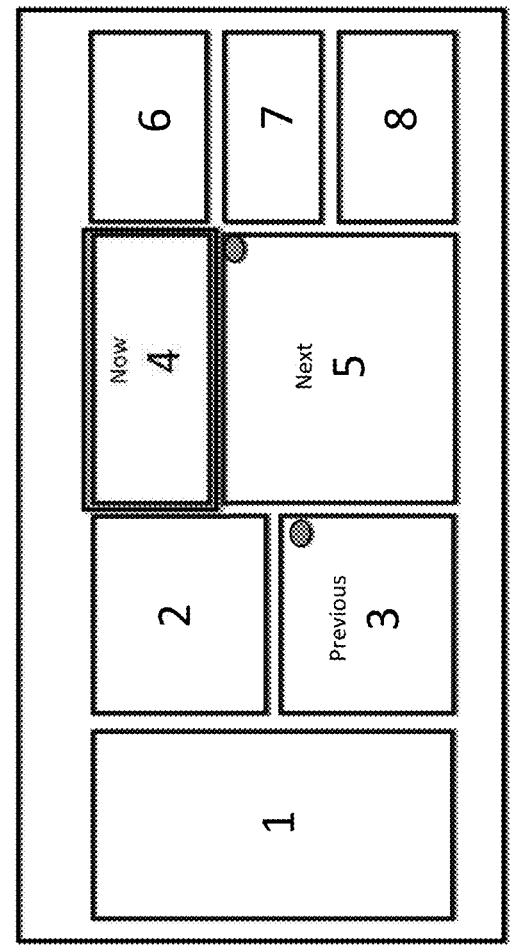
Figure 28:
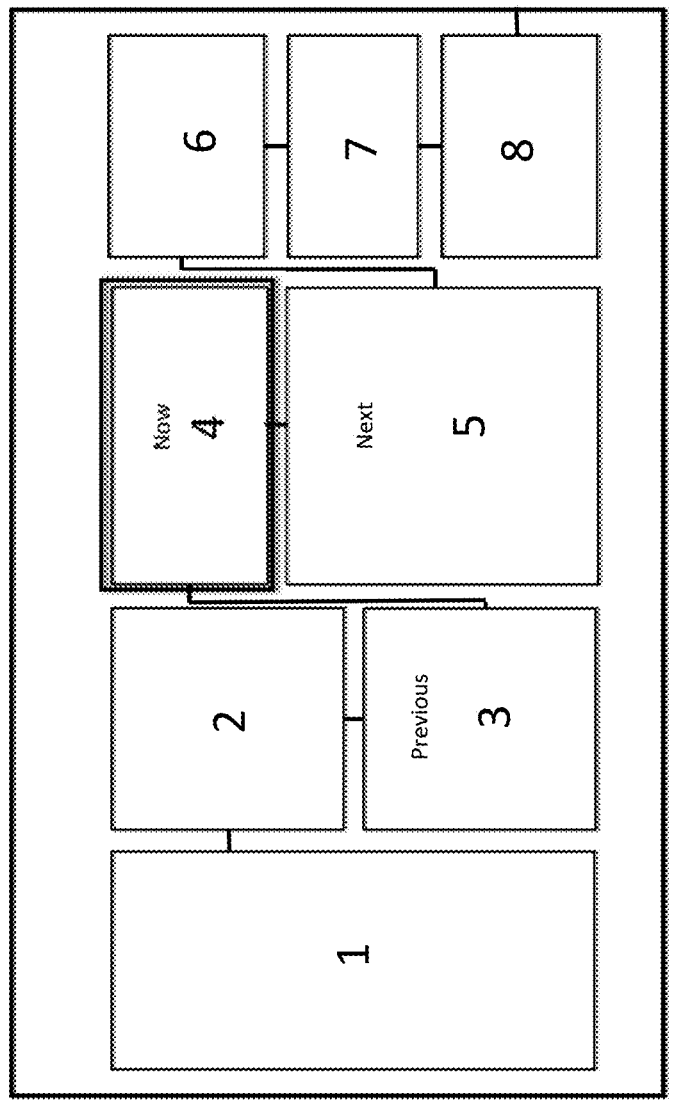
FIG. 28 shows a diagram of an embodiment of a user interface for use with a wireless input device showing a navigation assistance pattern (C).

In FIGS. 27A and 27B, show other embodiments of other navigation assist patterns (A and B). In FIG. 27A, a faint selection graphical widget around the photo (as shown in A) or a small dot indicator (as shown in B) shows where the next/previous item to be selected is. Different color/hue/brightness of the selector could be used to indicate next/previous. The indicators for the next/previous picture move as the userr moves the selector from the tile currently selected (marked "Now") to the next or previous tile. For example, in FIG. 27A, the dark graphical widget (a dark frame) is placed around tile A and another widget (e.g., a lighter colored widget) is placed around tile 3 to indicate that it was the previous tile and another widget (another colored widget or a darker or lighter widget than the dark frame or the lighter frame) is placed around tile 5 to indicate that is the next tile to be selected. In FIG. 27B, a dark widget is placed around tile 4 to show that tile 4 is selected, a different colored dot on tile 3 shows that it was the previous tile and another dot (another color) on tile 5 shows that it will be the next tile selected. The color coding of the widgets and dots may be explained to the user in the instructions or on the screen. For example, as in FIG. 27A boxes may appear surrounding the tile currently selected, the previously selected tile, and the next tile to select. The box formed by the lines that are most prominent may surround the currently selected tile, and boxes formed from lines that are somewhat less prominent may surround the next tile and the previous tile. For example, the box surrounding the current tile may have the boldest lines, the box surrounding the next tile may have lines that are not as bold as the currently selected box, but are bolder than the previously selected box, and the previously selected tile may be surrounded with a box made from lines that are the least bold and/or that are dashed. Alternatively, as shown in FIG. 27B, a box only appears around the selected time and dots appear on the previous and next tile. For example, a green dot may indicate the next tile and red dot may indicate the previous tile (in other embodiments, other colors could be used instead of red and/or green).

In FIG. 28, another embodiment of a navigation assist pattern (C) is shown. In the FIG. 28, a thin but visible "connector" shows the path the selector would take so that the operator of the device knows where the selector would go next as he/she turns or slides the controller. To avoid visual clutter, the system can show limited numbers of connectors while the selector is still on the currently selected image, and show more navigational information as the selector is in motion. Optionally the thin lines may include arrows pointing in the direction along the path that the selection moves when moving away from the previously selected tile to the next tile. In the example of FIG. 28, a widget (e.g., a box) surrounds tile 4 showing that tile 4 is the currently selected image and a line is shown connecting tile 4 to tile 5 showing that tile 5 is the next tile that will be selected. A line is also shown between tile 4 and tile 3 to show that tile 3 is the previous tile that was selected.

Photo Layout Algorithm

Figure 29:
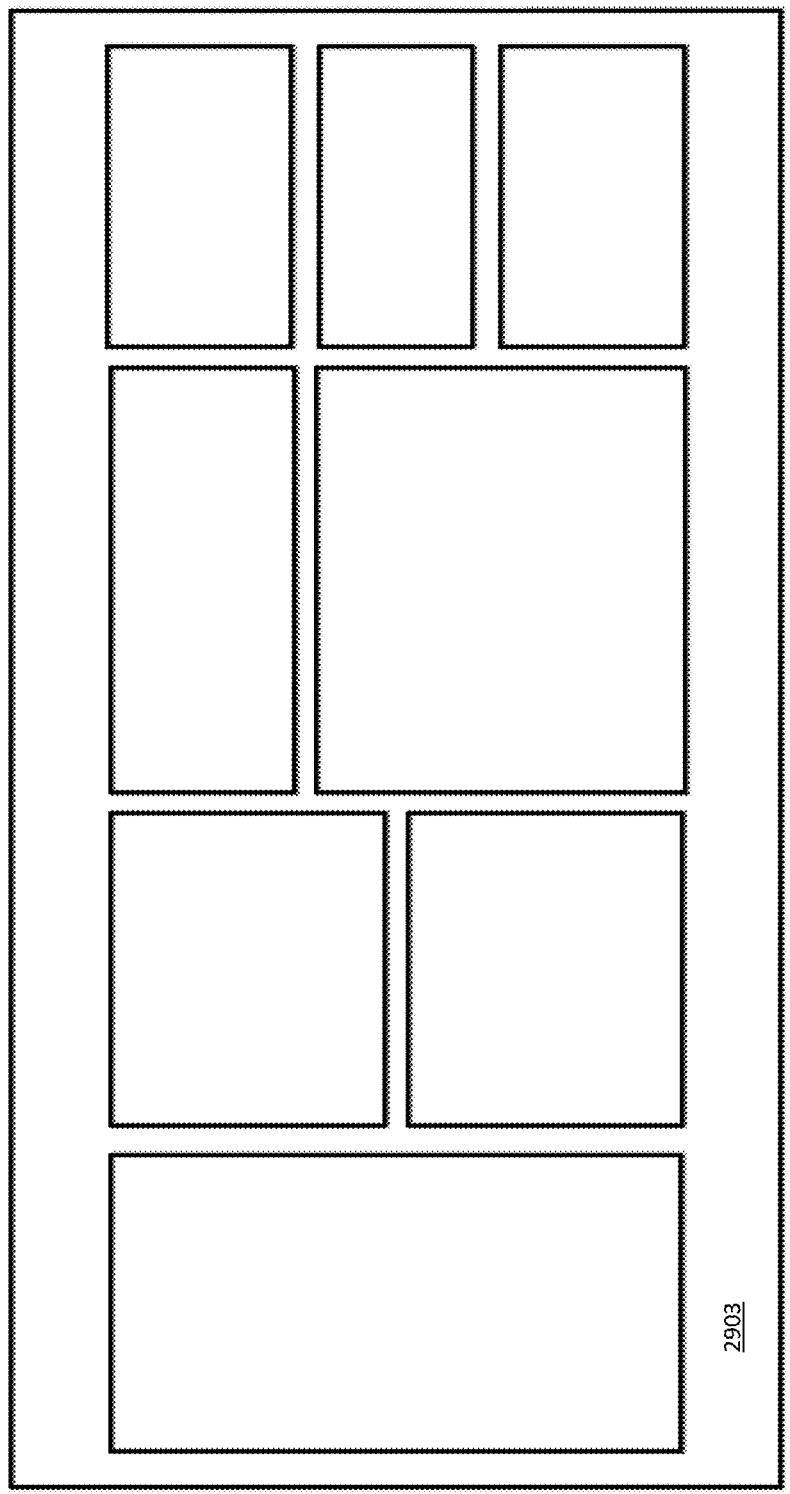
FIG. 29 shows an example of a photo layout on a screen that is provided using the algorithm.

FIG. 29 shows an example of a photo layout algorithm for the user interface. The algorithm uses a unique way of laying down the images so that the photos are arranged in a very uniform set of "tiles" in a visually pleasing way on the screen (e.g., of a TV). The uniqueness comes from the way the algorithm quickly achieves the effect that is different each time the layout is calculated. FIGS. 30-35 provide an embodiment of the steps that the algorithm implements to set up the multiple views or other views and fills the view with pictures (photographs). The algorithm may incorporate elements of weighted randomness into the tiling algorithm which results in both visual variety and pleasantness as well as emphasizing certain images that have been indicated (e.g., by the user) and/or determined (e.g., automatically) to be more important. The importance of the image may be assigned by the user and/or maybe determined based on how frequently the user accesses the image and/or other factors. In other words, weights are assigned to each image in accordance to the importance of the image to the user, and then a random selection is made for the size to assign to each image, where the weights increase the size of the image. For example, each weight may be a multiplicative factor, and after a randomly-selected size is chosen, the randomly chosen size is multiplied by the weight assigned to that image, so that after multiplication by the weight, images with higher weights will tend to be assigned larger sizes.

Figure 30:
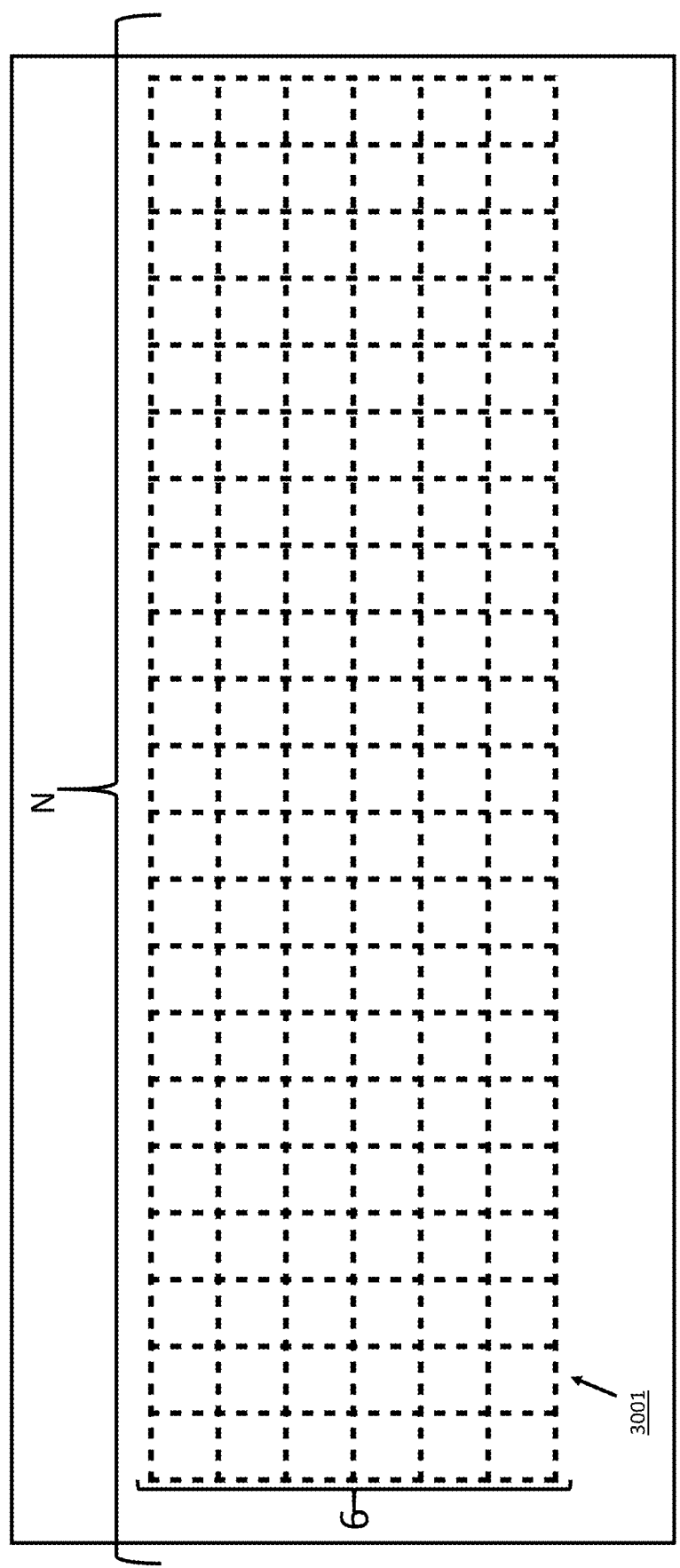
FIG. 30 shows an embodiment of a grid that is provided on the screen as a first step to producing the photo layout.

FIG. 30 shows what may be a first step of the algorithm in which a grid is placed in or on the display. In the example of FIG. 30, the screen may be a TV display. The area 3100, which is filled with the grid is the region where the images (e.g., the pictures) are displayed. In the example of FIG. 30, the grid divides the region where the image will be displayed into a "6×N" grid of tiles that expand horizontally. The number of tiles in the horizontal direction, "N," depends on the size and type of screen. Each image that will be placed on the grid may be sized to span a discrete number of the tiles formed by the grid.

Figure 31:
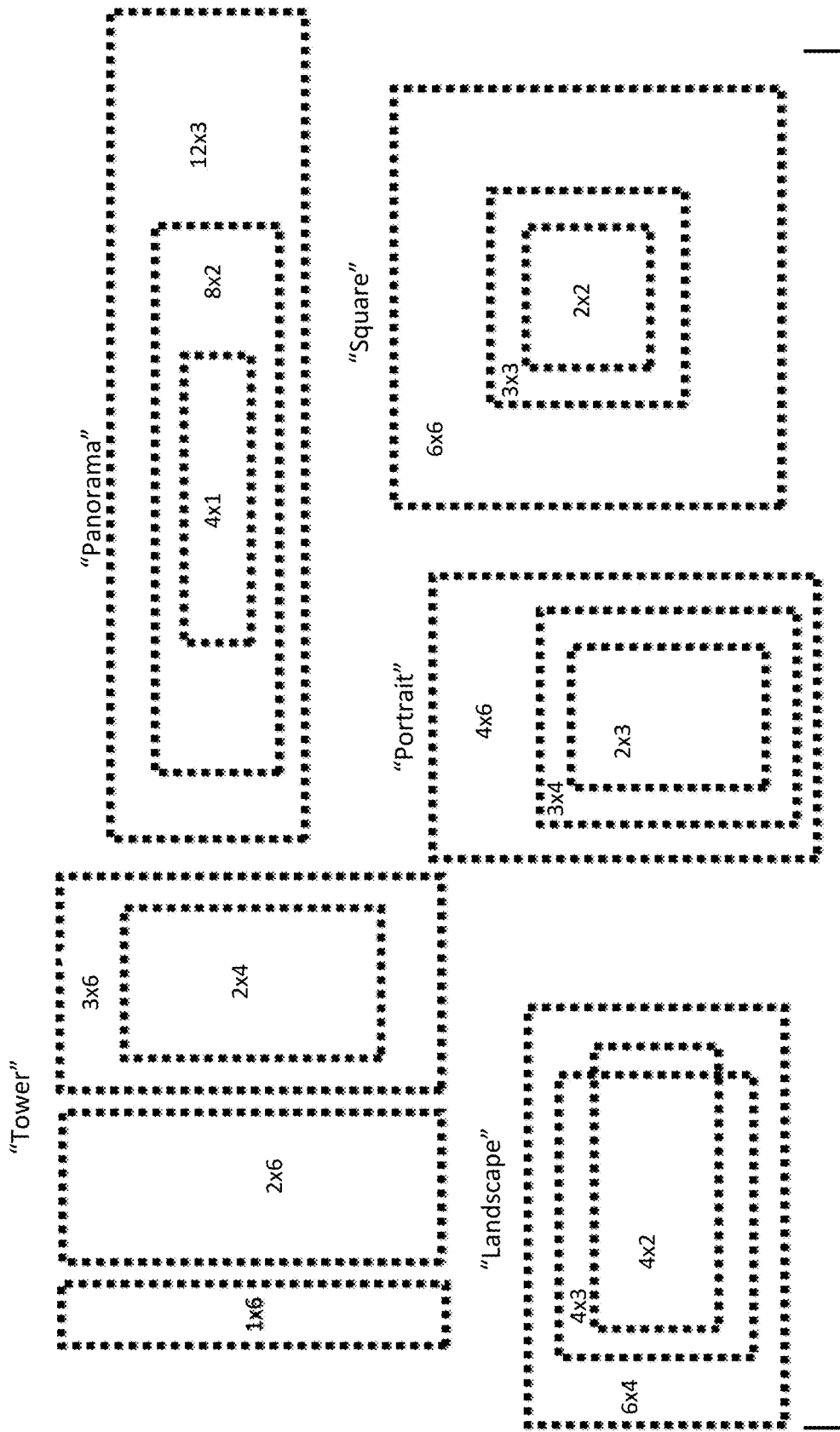
FIG. 31 shows an embodiment of different block templates that are created by the algorithm.

FIG. 31 shows different "block templates" that may be used to build a view. The image/pictures may be sized according to the blocks of FIG. 31, which have pre-defined sizes. The blocks act as the building blocks of the layout. Each unit shown below the layout corresponds to the tile unit in the 6×N grid. The templates may be categorized into a finite number of categories. For example, the categories may be categorized as "Tower," "Panorama," "Landscape," "Portrait," and "Square." Within each category there may be several templates. The pre-determined sizes are shown below each layout. The aspect ratios n×m, n and m are a number of tiles from the grid of FIG. 30. As in the example of FIG. 31, the "Tower" category may include layouts including 1×6, 2×6, 3×6, and 2×4 sizes, the "Panorama" category may include layouts including 4×1, 8×2, and 12×3 sizes, the "Landscape" category may include layouts including 4×2, 4×3, and 6×4 sizes, the "Portrait" category may include layouts including 2×3, 3×4, and 4×6 sizes, and the "Square" category may include layouts including 2×2, 3×3, and 6×6 sizes. In other embodiments, other categories may be used and/or each category may include different sizes than shown in FIG. 31.

Figure 32:
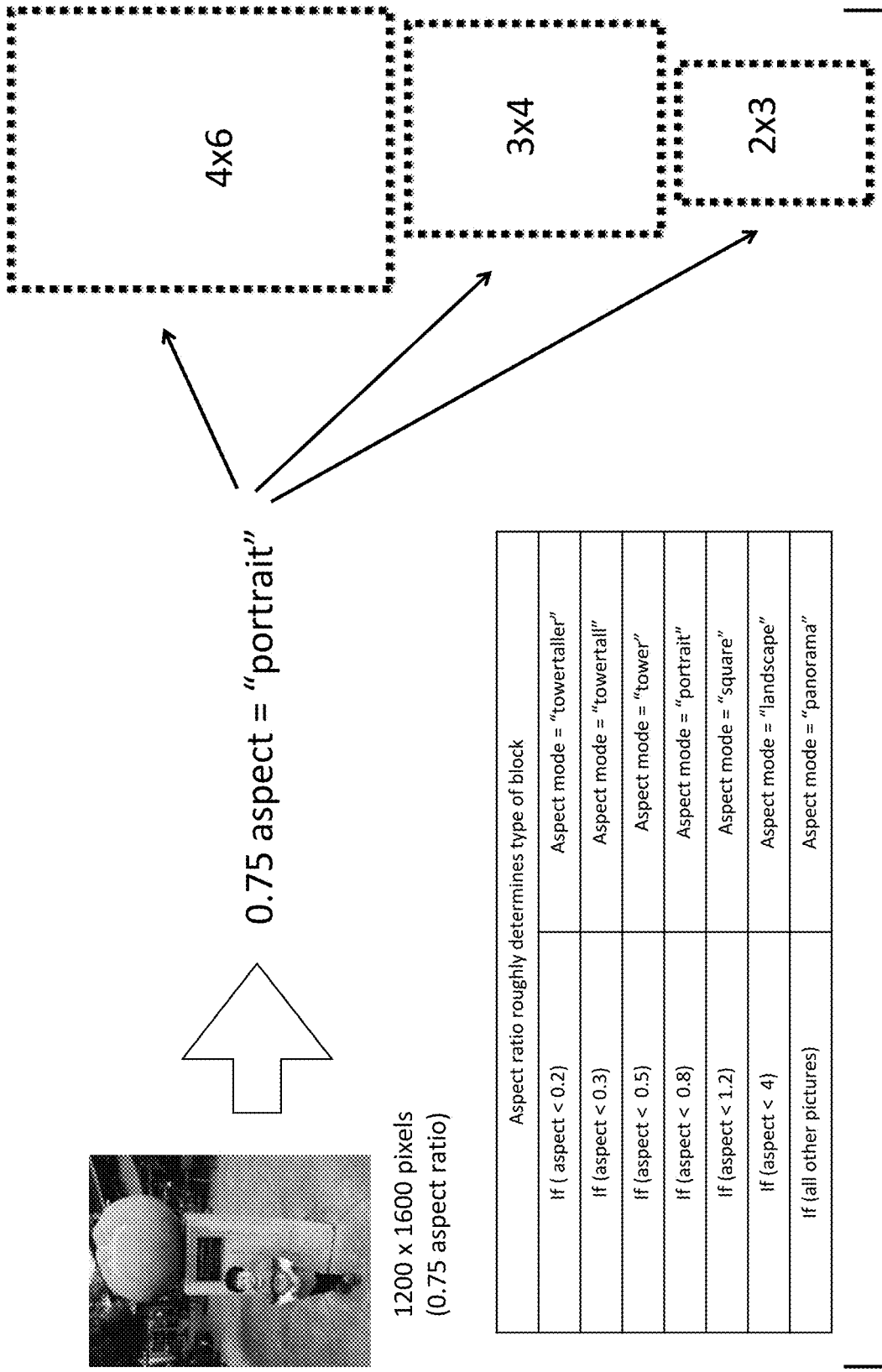
FIG. 32 shows an embodiment of how the type of block is determined by the algorithm.

In step 3, in FIG. 32, the source photos are converted into a corresponding block that is an approximate proxy to the photo. Thus, the source photo has a size of 1200×1600 pixels (a 0.75 aspect ratio). The arrow indicates that the source photo may be turned into a block type by analyzing that the 0.75 aspect ratio as a portrait, and that one of the portrait templates should be chosen for the picture. The aspect ratio roughly determines the type of block and/or layout that is chosen. Specifically, in an embodiment, aspect ratio determines a collection of templates from which the system may randomly select to place the picture into. In the table shown in FIG. 32, a list of templates that have aspect ratios that are less than 0.2, between 0.2 and 0.3, between 0.3 and 0.5, between 0.5 and 0.8, between 0.8 and 1.2, between 1.2 and 4 and greater than 4 and the type of aspect ratio mode is labeled as towertaller, towertall, tower, portrait, square, landscape, and panorama. However, pre-determined probability weight and random selection result in a particular block size. The algorithm is set up to randomly choose a block size with a particular aspect ratio range. The block sizes in the "portrait" layout are shown from large at the top to small at the bottom. However, each source photo can also have a parameter of importance of that photo which affects the probability weight. (i.e. photos with lots of likes will be assigned a big block size).

In other words, based on the aspect ratio of the picture, a collection of templates is chosen. For example, if the aspect ratio of the photo is X, a determination is made whether the aspect ratio X is less than 0.2. If the aspect ratio X is less than 0.2, then one of the sizes that have been categorized as tower taller are selected. If the aspect ratio X greater than 0.2 but less than 0.3, then one of the sizes that have been categorized as tower tall are selected. If the aspect ratio X is greater than 0.3, but less than 0.5 then only one of the sizes that have been categorized as tower are selected. If the aspect ratio X is greater than 0.5, but less than 0.8 then only one of the sizes that have been categorized as portrait are selected. If the aspect ratio X is greater than 0.8, but less than 1.2 then only one of the sizes that have been categorized as square are selected. If the aspect ratio X is greater than 1.2, but less than 4 then only one of the sizes that have been categorized as landscape are selected. If the aspect ratio X is greater than 4, then only one of the sizes that have been categorized as panorama are selected. In the example of FIG. 32, X is 0.75, which is between 0.5 and 0.8, and accordingly, one of the portrait templates is randomly selected. As one can see by inspecting FIG. 31, the portrait templates include the sizes 2×3, 3×4, and 4×6. Which of the three sizes may initially be chosen a by a random number generator. For example, the three different sizes may be assigned three numbers 1, 2, and 3, and a random selection between the three numbers may be made. Then the number selected may be increased by one or two, depending on the weight assigned to the picture. As another embodiment, each area of the template is used as the size of the template (2×3 template has a size of 6, and 3×4 template has a size of 12, and a 4×6 template has a size of 24). A number is randomly selected between the largest and smallest size. Then the randomly selected size is multiplied by a weight. Then, the picture sized that is closest to the result is selected. In another embodiment, any template that has an aspect ratio between $X+d_1$ and $X-d_2$ may be selected from for the portrait.

Figure 33:
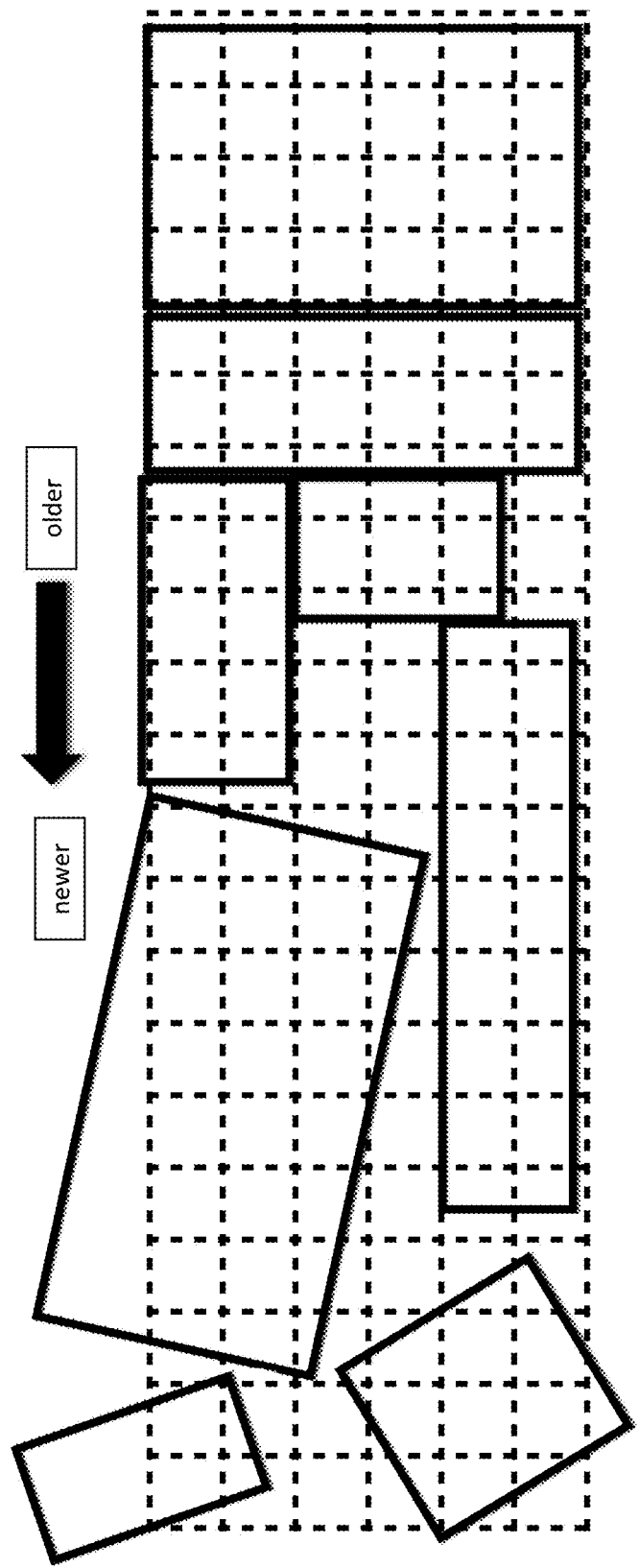
FIG. 33 shows an embodiment of how the blocks are placed on the grid.

As shown in FIG. 33, in step 4, the blocks are roughly placed in the grid in a way that tries to fill the space as much as possible so the order of the placement of individual blocks will be determined by which piece is able to fill the gap. The algorithm is skilled at filling the gaps with the least amount of unused space.

In an embodiment, there may be a threshold area, a threshold width, and/or threshold length, which if the space exceeds that threshold, the space is considered to be a gap, and the algorithm resizes the pictures to fill the gap. Optionally, it may be desirable to keep a border of a certain width between adjacent pictures and/or between the pictures and the edges of the strip, and if a space has a height or a width that is larger than the width of a border is considered to be a gap.

The blocks are placed in the order from right to left (see arrow) from older to newer. Each block is placed in chronological order (based on the dates of the content of the blocks, which may be pictures) in a strip that has the height of the viewing area. The strip extends in two opposite directions (e.g., left and right). Moving across the strip in a first of the two opposite directions (e.g., left) brings the users to blocks that are associated with content having earlier time (e.g., pictures that were taken earlier in time). Moving across the strip in a second of the two directions (e.g., right) takes the user to block associated with a later time (e.g., pictures that were taken later in time). The strip may be populated placing the earliest blocks (e.g., pictures) into the strip at the first position, starting from the earliest position into which the block fits. Alternatively, the strip may be populated placing the latest blocks into the strip at the first position, starting from the latest position into which the block fits. Although in the above example, moving in the left direction brings the users to blocks that were taken earlier in time and moving right brings the users to blocks that were taken later in time, in another embodiment, moving in the left direction brings the users to blocks that were taken later in time and moving right brings the users to blocks that were taken earlier in time. In another embodiment, the strip may be the width of the viewing area, and moving upwards along the strip may take the user to earlier blocks and moving downwards may take the user to later blocks, or alternatively, moving upwards along the strip may take the user to earlier blocks and moving downwards may take the user to earlier blocks.

Figure 34:
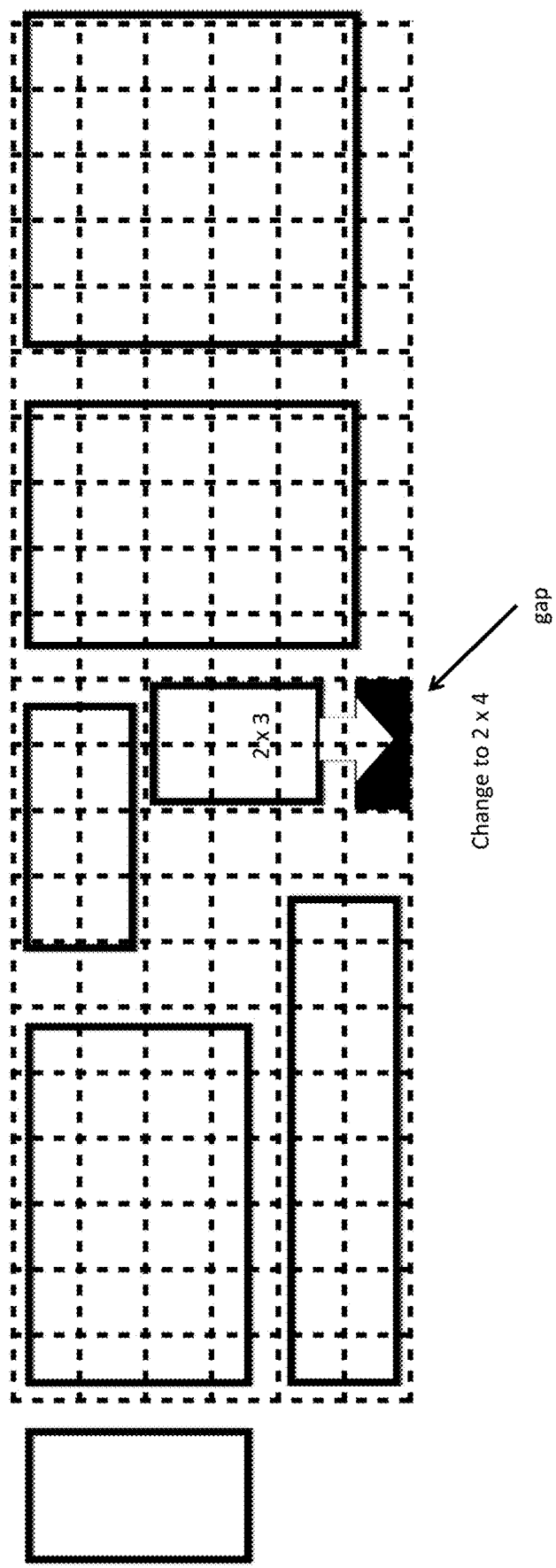
FIG. 34 shows an embodiment of how blocks are expanded to better fill the spaces on a grid.

In step 5 in FIG. 34, the blocks are "expanded" to better fill the spaces. After the initial placing of the blocks is complete, the system searches for gaps in the pattern of images, and expands one or more of the gap. In the example of FIG. 34, a 2×3 photo is expanded to a 2×4 photo to fill a gap. The entire arrangement of blocks may be scanned multiple times for gaps and after each scan, one or more blocks surrounding the gap are expanded until all of the gaps are filled. The resulting size of each block may or may not be the size of the pre-determined building blocks. But, often the resulting size will be the same as one of the pre-determined blocks. Steps 3-5 of the process may be repeated multiple times, sweeping across the whole grid, to make sure there are no more expandable blocks. In an alternative embodiment, after each block is added to the grid, a determination is made as to whether a gap was created. If a gap was created the blocks surrounding the gap are expanded until the gap is filled. Optionally, other changes in shape may be performed into to fill a gap, other than just expanding the block. For example, a block may be made smaller in order to make room for another block to be made bigger.

Figure 35:
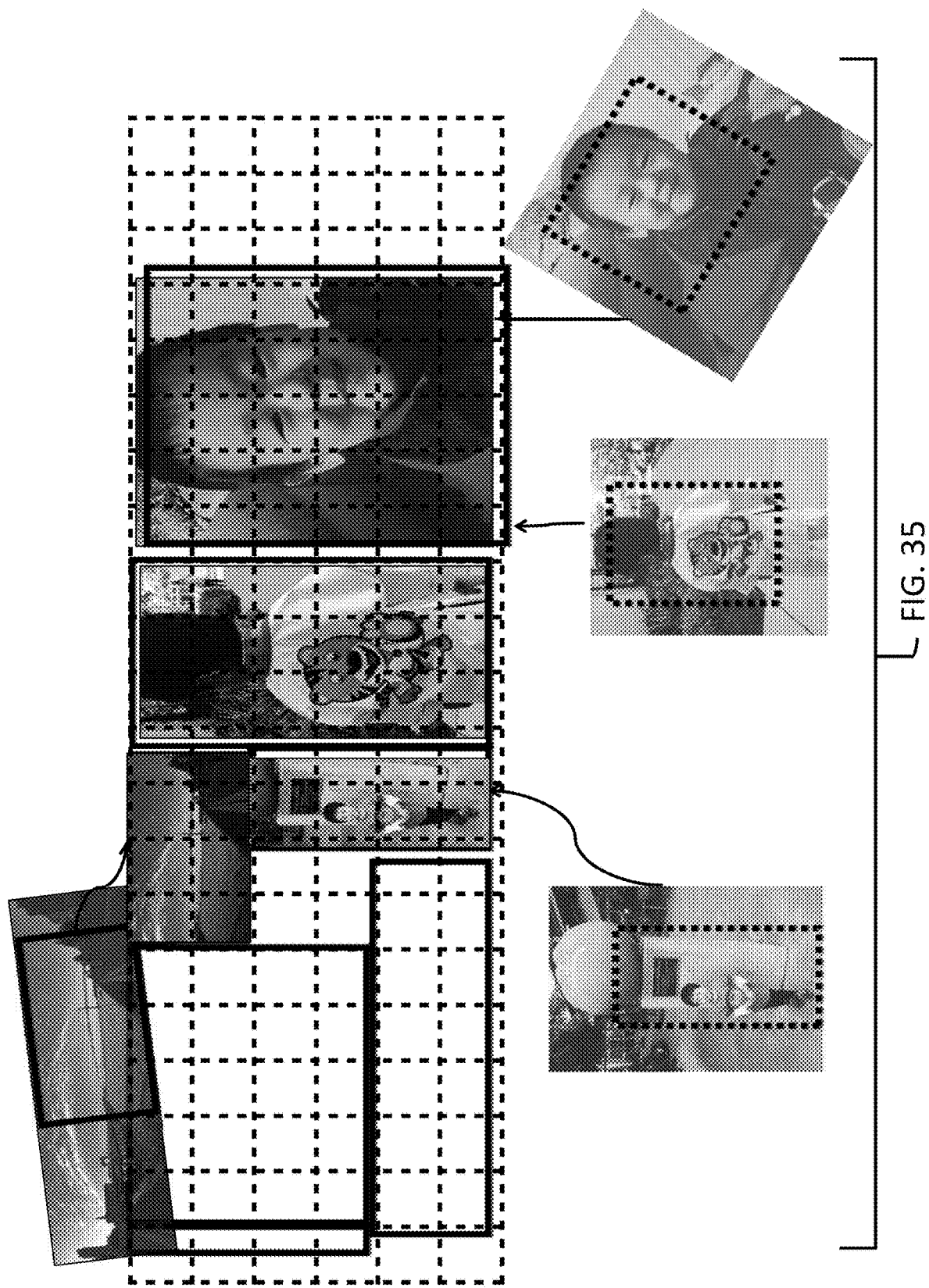
FIG. 35 shows an embodiment of how the blocks are filled with the source photos.

In step 6, in FIG. 35, the blocks are filled with the source photos. The source photos may not always have the exact aspect ratio as the corresponding blocks since the blocks are just pre-set approximations. Therefore, the photos sometimes need to be enlarged/cropped to fill the given block. Also, if there are any indicated "area of interest" such as a human face through face detection, that area may be enlarged to emphasize that area of interest, regardless of the aspect ratio fit. Note that the cropped out area of the photo is still retained in the system. The region of a photo that is removed as a result of cropping to fit a block, is displayed when the photo is shown in an expanded, large size. The example in FIG. 35 shows the photos morphing into the blocks and identifying the area of interest—which is a child's face. In the example of FIG. 35, three photos are shown prior to being cropped and inserted into the grid, and also shows rectangles indicating which part of the photo is cropped and which part of the photo remains and is displayed when the picture is inserted in grid. The portion outside of the rectangle is cropped out, and the part within the rectangle is kept. The part that is kept is determined by determining which part of the photo is of interest. For example, certain types of images are automatically associated as the part of interest, such as faces and people.

Figure 36:
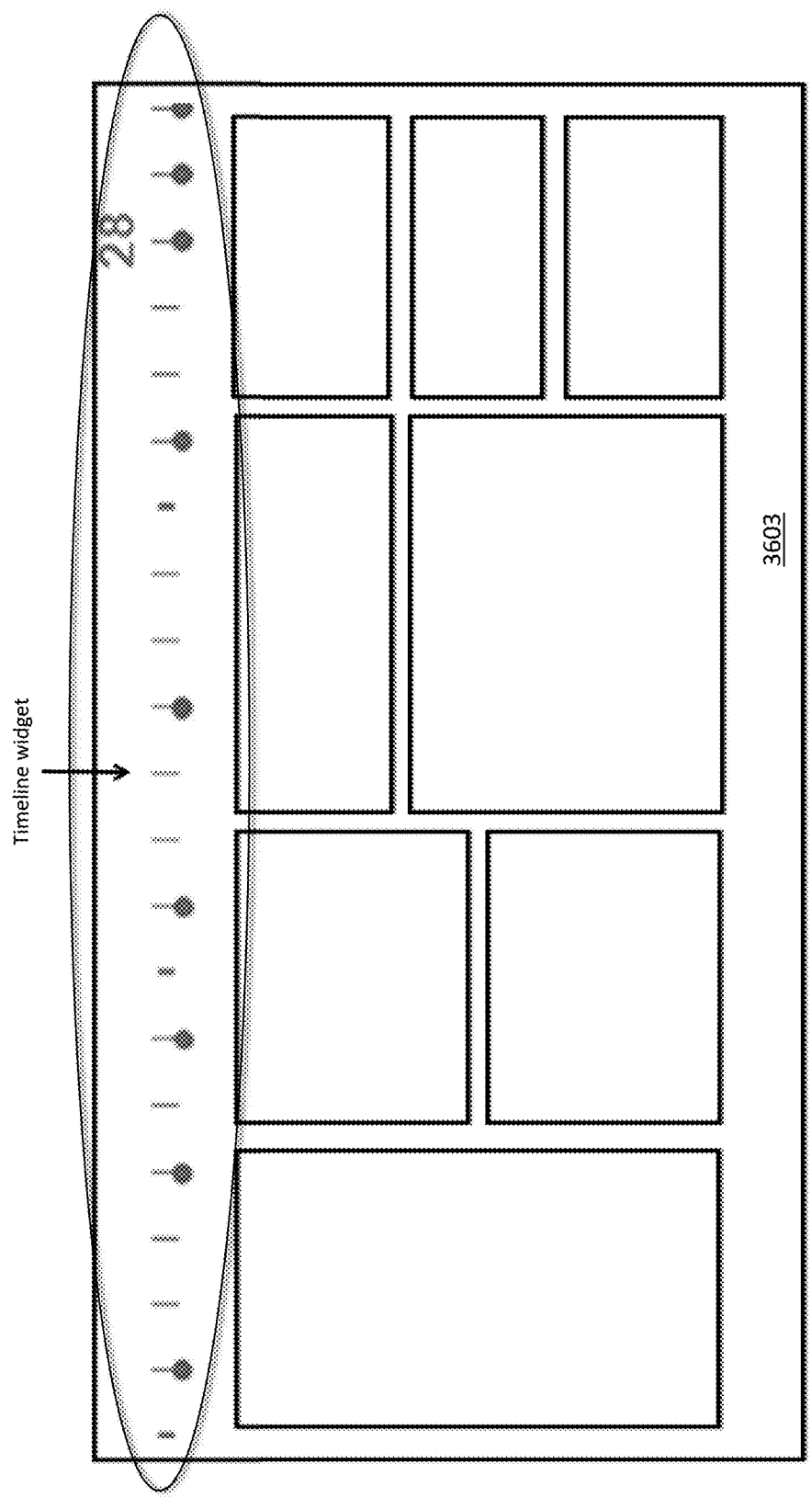
FIG. 36 shows an embodiment of a timeline element that can be included in the user interface.

FIG. 36 shows another aspect of the algorithm in which the timeline widget user interface element helps the user know the current position with respect to time. The timeline is useful when scrolling through photos. Also, the day the photographs were taken as well as how many photos were taken on that day may be indicated with dots of various sizes (which may be glowing). In FIG. 36, the area that is circled and indicated as the "timeline widget" has 8 glowing dots.

Figure 37:
FIG. 37 shows an embodiment of a timeline in combination with a photo layout filled with source photos.

FIG. 37 provides an example of the timeline widget. In an embodiment, a glowing dot that is pointed, which is associated with a date, indicates that there are photos having that date. In an embodiment, the intensity and size of the glow, differs according to the number of images for that day. In FIG. 37, the day that is indicated with a number "April 7" is the day of the currently selected photo. The day of currently selected photo should always be in the center. The date of the selected photo may be enlarged in some embodiments so as to stand out. The day of the month may be shown only at some intervals (i.e.: every 7 days) to avoid clutter. The interval can be every 7 days, every 6 days, every 5 days, every 4 days, every 3 days, every 2 days, every 8 days, every 9 days, every 10 days, every 11 days, every 12 days, every 13 days, every 14 days, every 21 days, every month, etc. The time intervals can be determined by the photographs that are put into the GUI. For example, if one user has only about 1 group of photographs every 2 or 3 months, the time interval might be much larger than if a user has photographs from every day of the months all year. Alternatively, the date may be displayed after a fixed number of photos, such as after every six photos.

Figure 38:
FIG. 38 shows an embodiment of the details of a timeline.

FIG. 38 shows more details of an embodiment of the timeline. Thus, the day that is chosen (April 7) is shown as larger than the other dates indicated (see the April 21, 14, and 31 dates on the timeline). The dates may be gradually enlarged, peaking in size at the center of the timeline (see how the April 7 date is larger).

Figure 39:
FIG. 39 shows an embodiment of a timeline in combination with a photo layout filled with source photos.

FIG. 39 shows that images 1-4 were uploaded on the same day. So, even when the user moves the selector with them, the timeline does not move. Image 5 in FIG. 39 is three days earlier (as indicated by the timeline dot, which may be blue for example), so that when the selector is moved to image 5, the timeline also moves, bringing the next blue dot into the center. Image 6 may have been taken on the same day as image 5 or an earlier date. In an embodiment, the motion of the images may be correlated with the timeline movement, without the motion of the images being synchronized with the distance that the timeline moves, so that time line reflects the date of the currently selected image. For example, images 1-4 were taken "today (the $7^{th}$)," while image 5 was taken three days earlier (the $4^{th}$). Since the selector is on one of FIGS. 1-4, the date that is displayed is the center of the timeline is the date of FIGS. 1-4 (April $7^{th}$). Moving the selector amongst FIGS. 1-4 does not change the location of the timeline. Were the selector moved so as to be located on FIG. 5, then the time line would shift so that April $4^{th}$ (the date of FIG. 5) is in the center of the portion of the viewing area in which the timeline is displayed.

Figure 40:
FIG. 40 shows an embodiment of navigating using the timeline.

FIG. 40 shows an embodiment in which the date labels for recent photos are labeled using labels indicating relative times, such as today, yesterday, last weekend, last week to assist the user to quickly find the place the user is trying to navigate to. FIG. 40 also shows the direction in which the photos are moved to see earlier or later photos. Currently, the legend "today" appears above April 7, because in the example, the date is April $7^{th}$. As an example, were there a photo from yesterday and were the user to shift the selector to a photo from yesterday, the legend "today" would be replaced is "yesterday" in addition to the timeline shifting so that April $6^{th}$ would then be displayed in the center of the timeline. As another example, were the selector placed on photo 5, and were April $4^{th}$ a Saturday, the legend "today" would be replaced with the legend "last weekend."

Figure 41:
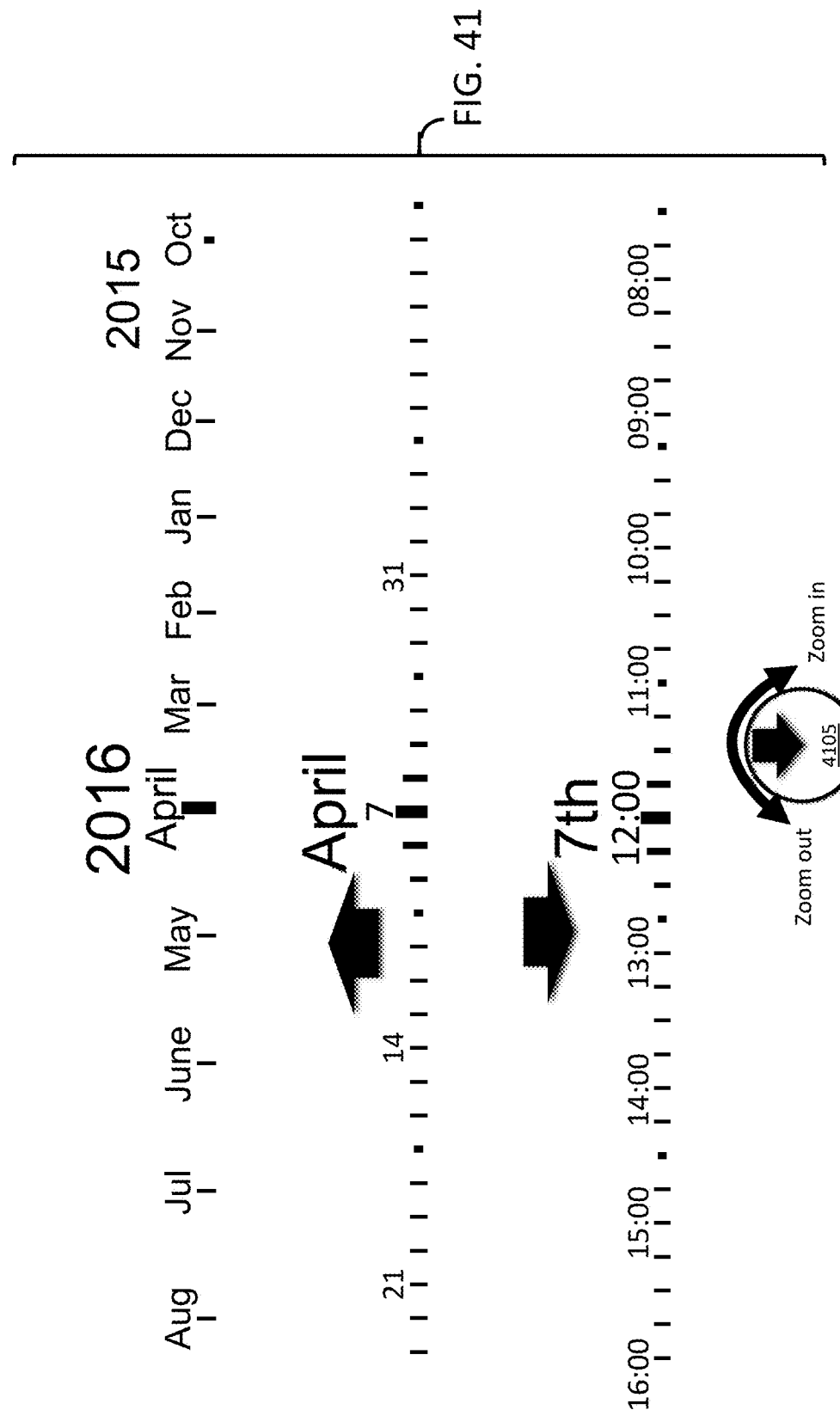
FIG. 41 shows an embodiment of a zooming control as part of the timeline.

FIG. 41 shows an embodiment for controlling the degree to which the view is enlarged (zoomed in) or made small (zoomed out)—a zooming control. The zooming control changes the scale of the timeline and/or the size of the image. For example, the user may change the timeline so that difference between ticks and/or dots of the timeline may be changed from days (as illustrated by the center timeline) to months (as illustrated in the top timeline) to hours (as illustrated by the bottom timeline). Zooming out (e.g., from days to months) may be controlled by the input device by rotating counterclockwise while pressing the top shell down. Zooming in (from days to hours) may be controlled by the input device by rotating clockwise while pressing the top shell down.

Figure 42:
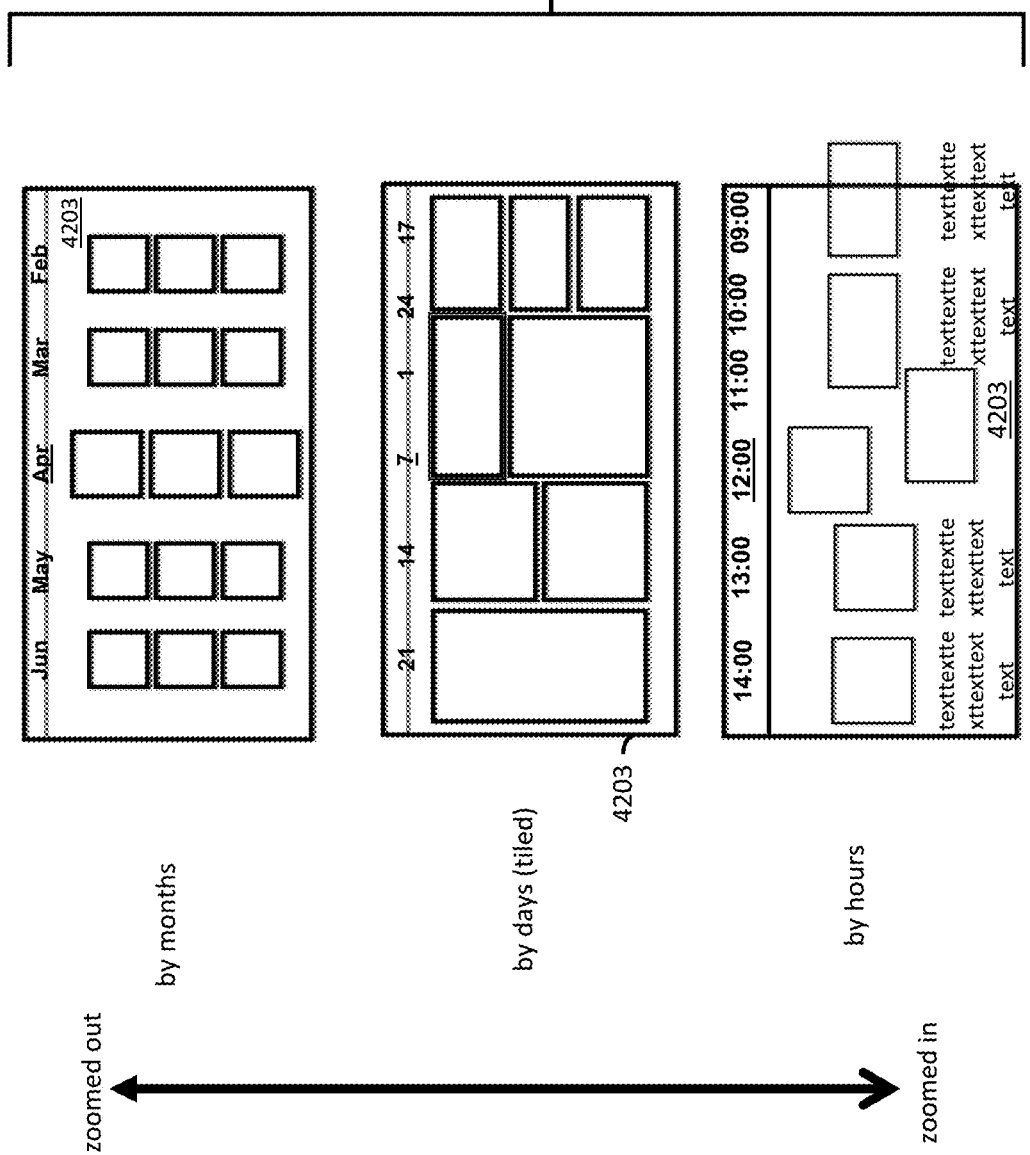
FIG. 42 shows an embodiment of the content change with zooming in or out.

FIG. 42 shows how the content changes when zooming in or zooming out. For example, when zooming out (by months), sets of images form a long tile to represent a month, with several smaller tiles within the tile representing the month, where the smaller tiles are photos (or other images). The tiles may be in chronological order. In the middle image, the photos are shown by days and all of the images are compactly tiled. In the bottom image, the view is zoomed in (so that images are displayed according to the hour in which the photo was taken) and some images are shown in more explicit chronological order, by hours, showing where text may be included that indicates the details about the photo. In some embodiments, the transition between views is smooth and seamless (e.g., with morphing), in which the photos smoothly expand or contract from the size appropriate for one zoom-size and another zoom-size, similar to the embodiments of FIGS. 22-28. However, in contrast to the embodiments of FIGS. 22-28, instead of morphing from a multi-photo view to a single photo view, there may be a smooth transition from a first multi-photo view having more photos of a smaller size to another multi-photo view having fewer photos, but of a larger size or from a first multi-photo view having fewer photos of a larger size to another multi-photo view having more photos, but of a smaller size.

Figure 43:
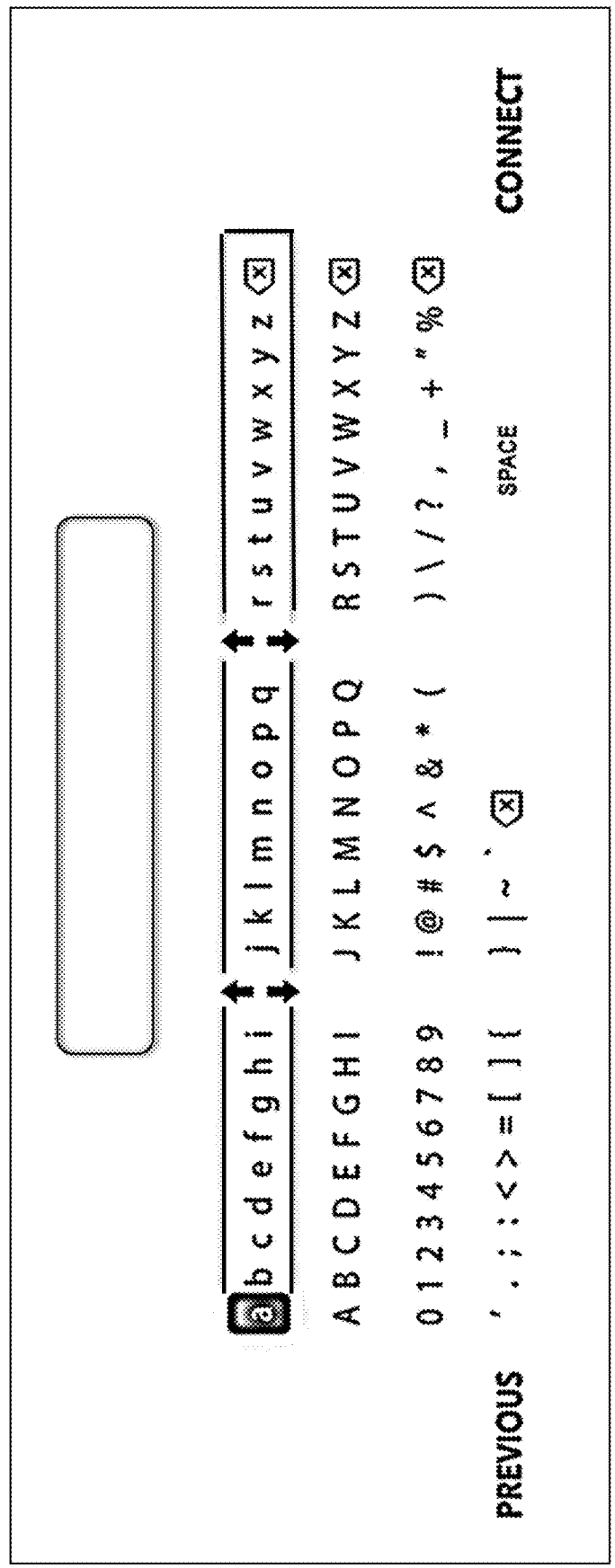
FIG. 43 shows an embodiment of channel switching and/or a keyboard aspect of the algorithm using an input device.
Figure 44:
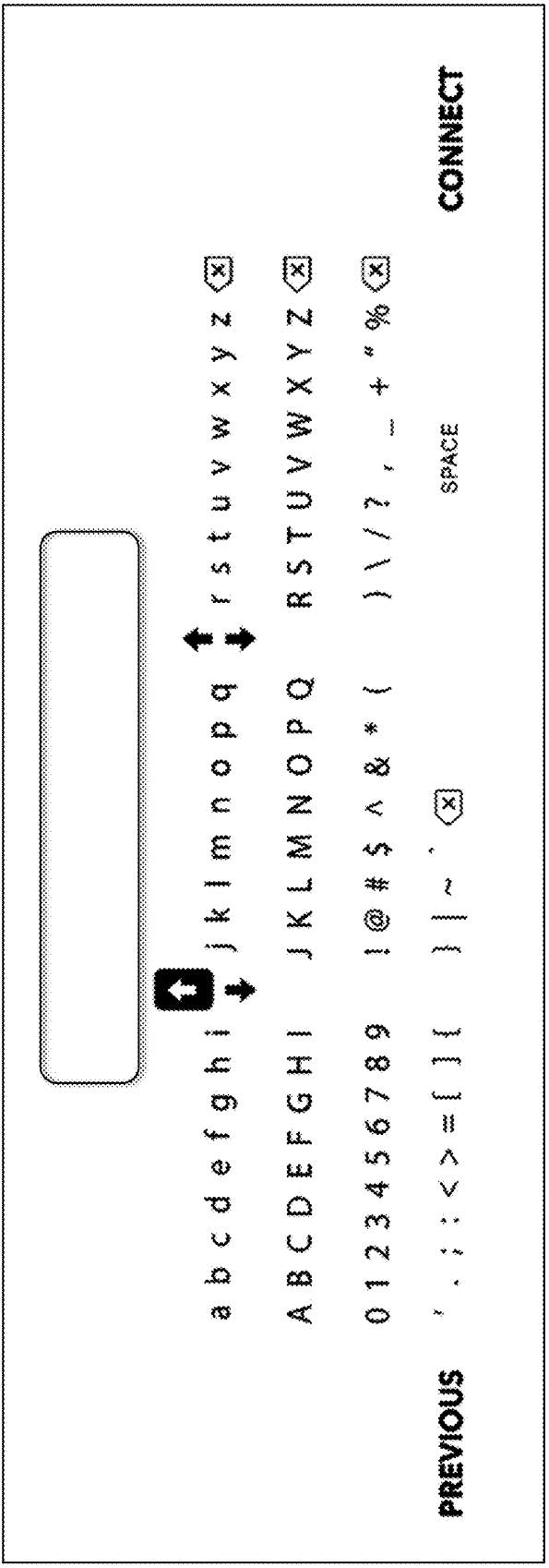
FIG. 44 shows an embodiment of channel switching and/or a keyboard aspect of the algorithm using an input device.
Figure 45:
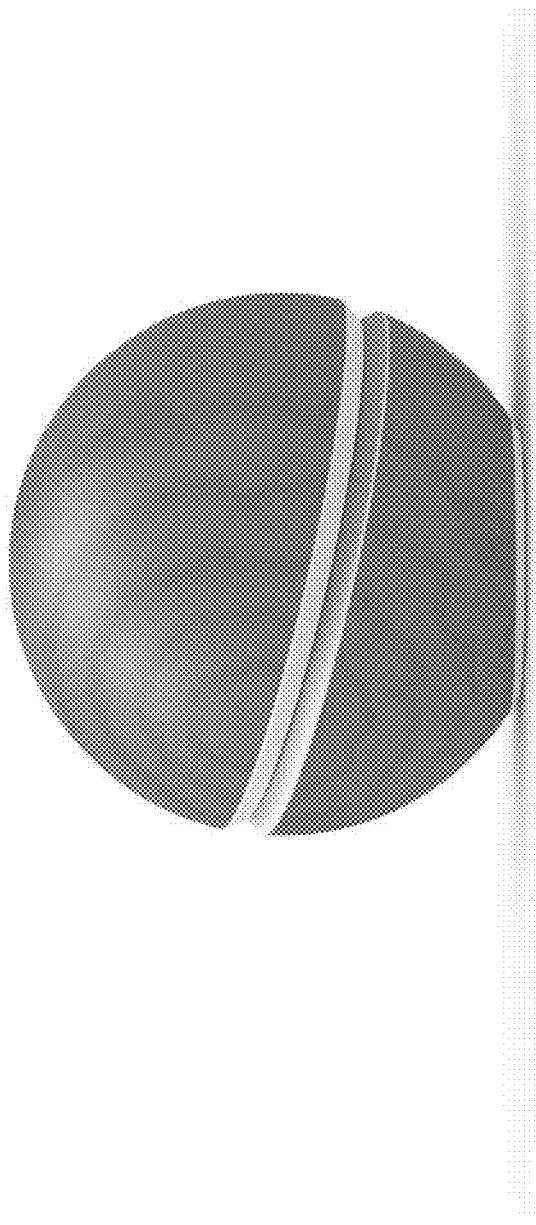
FIGS. 45-61 show alternative embodiments of the input device.
Figure 46:
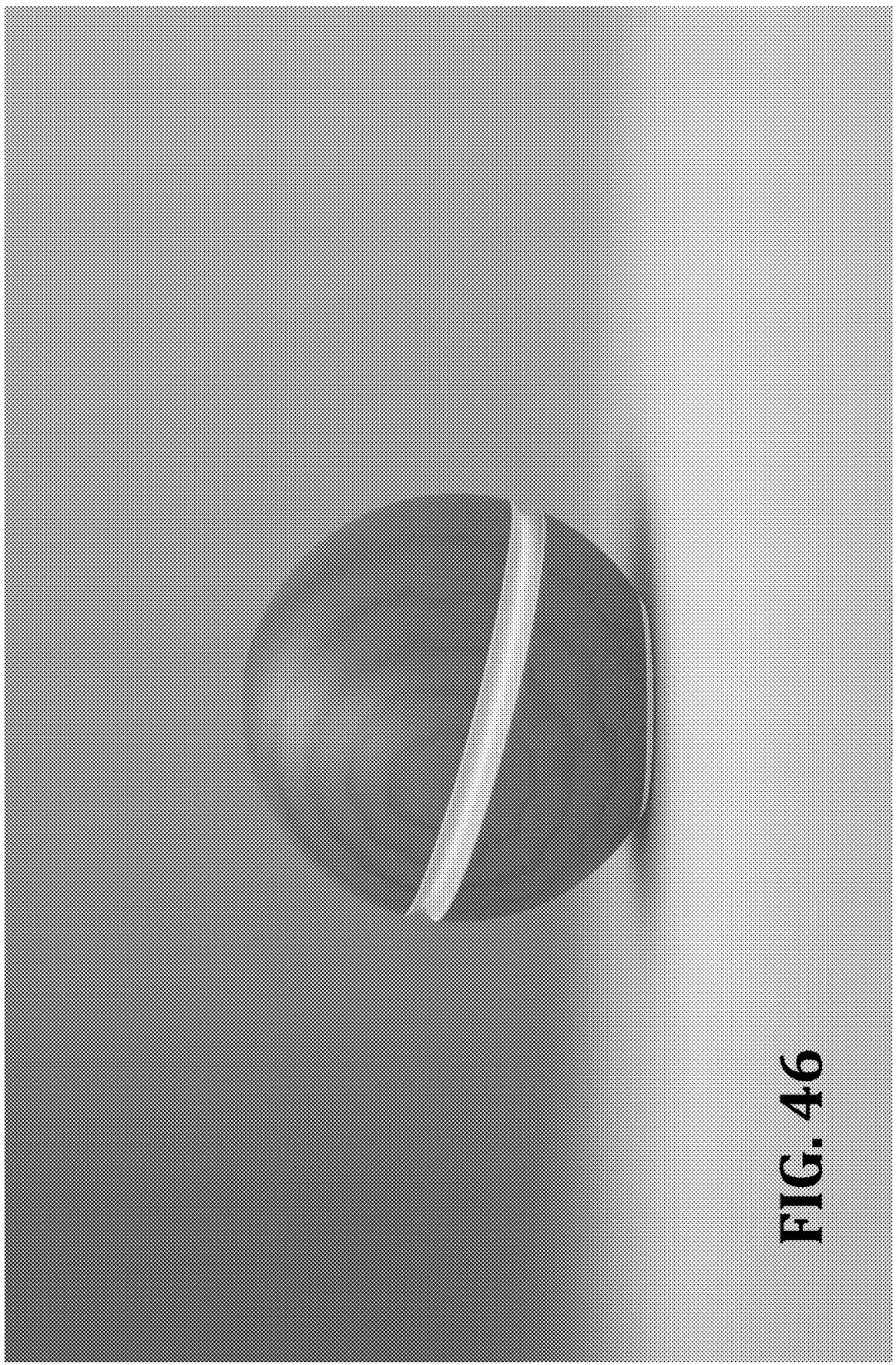
Figure 47:
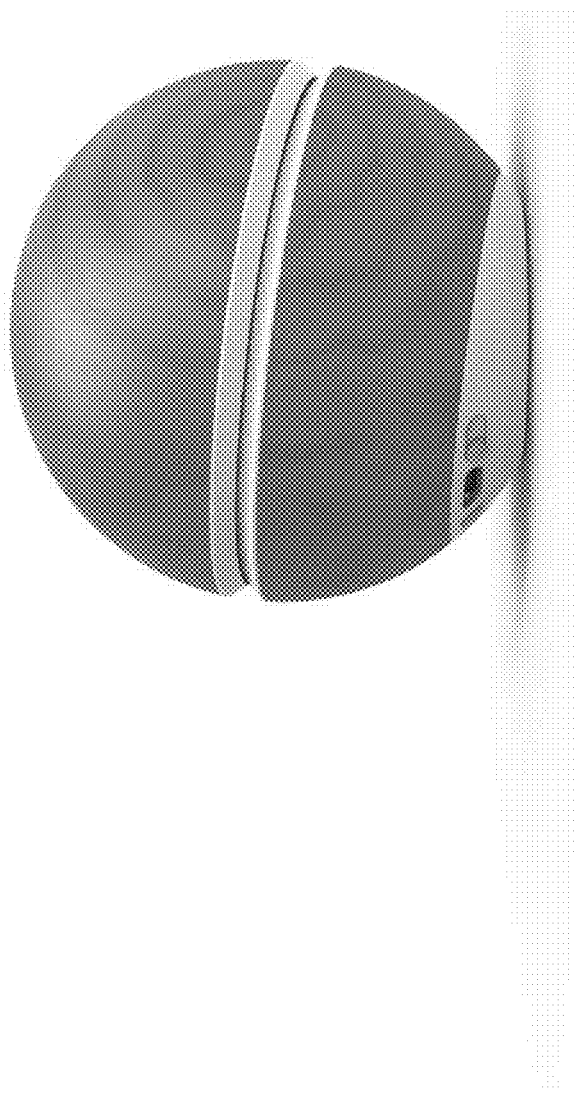
Figure 48:
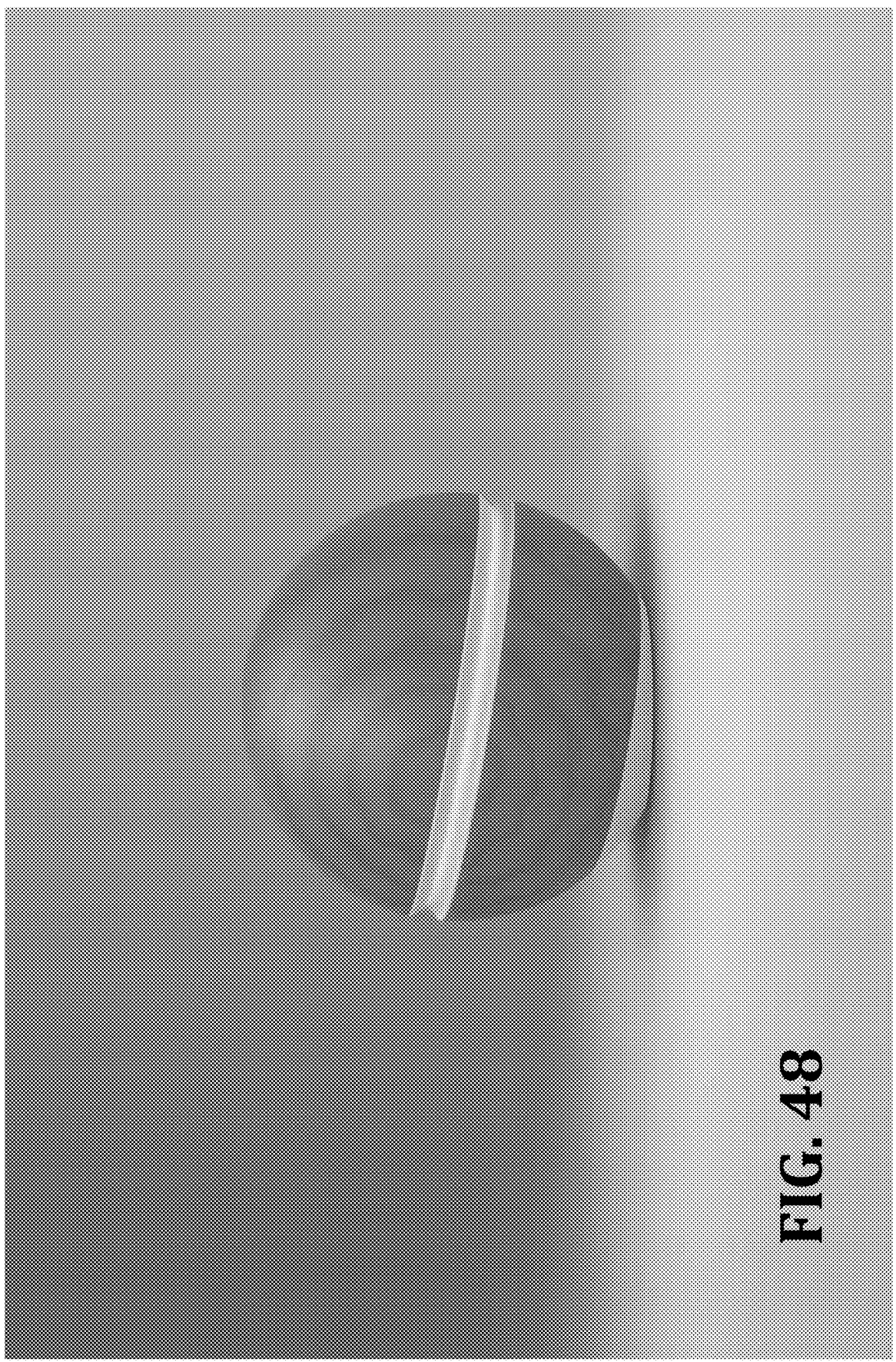
Figure 49:
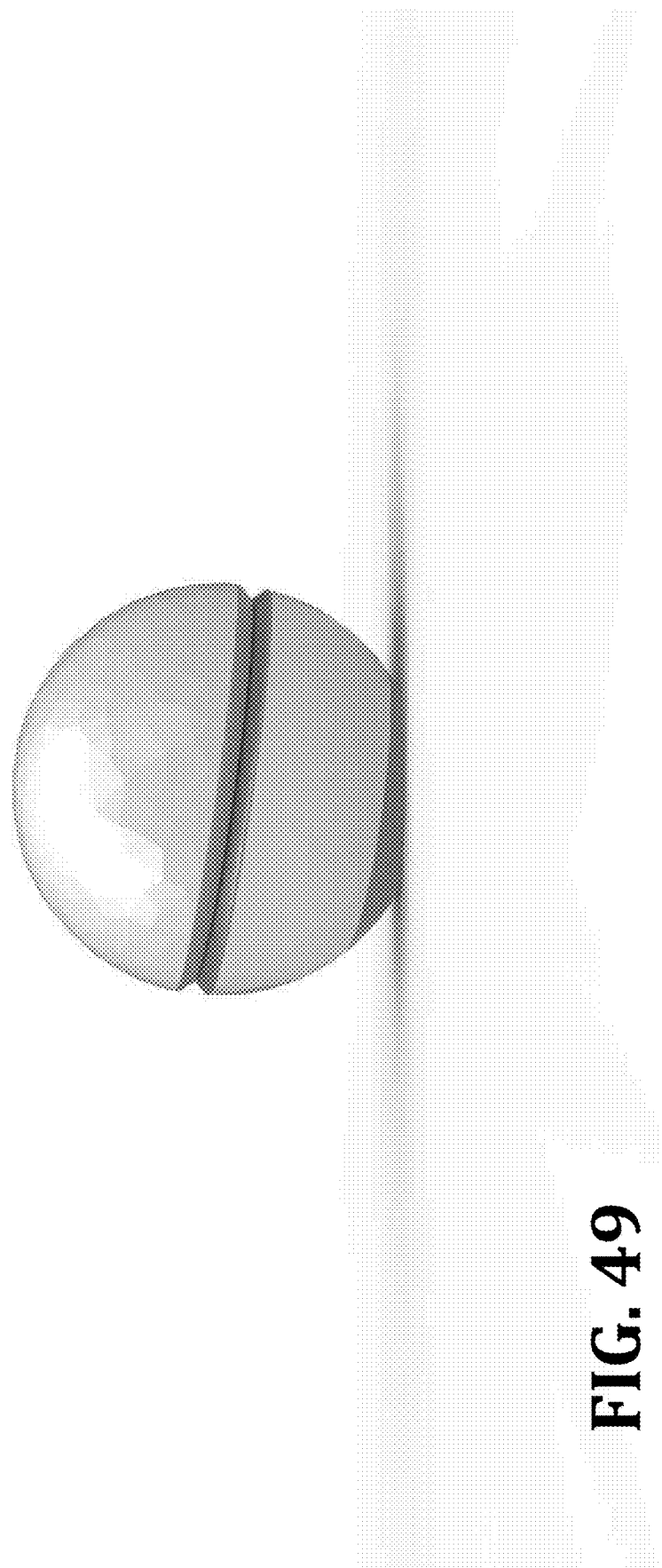
Figure 50:
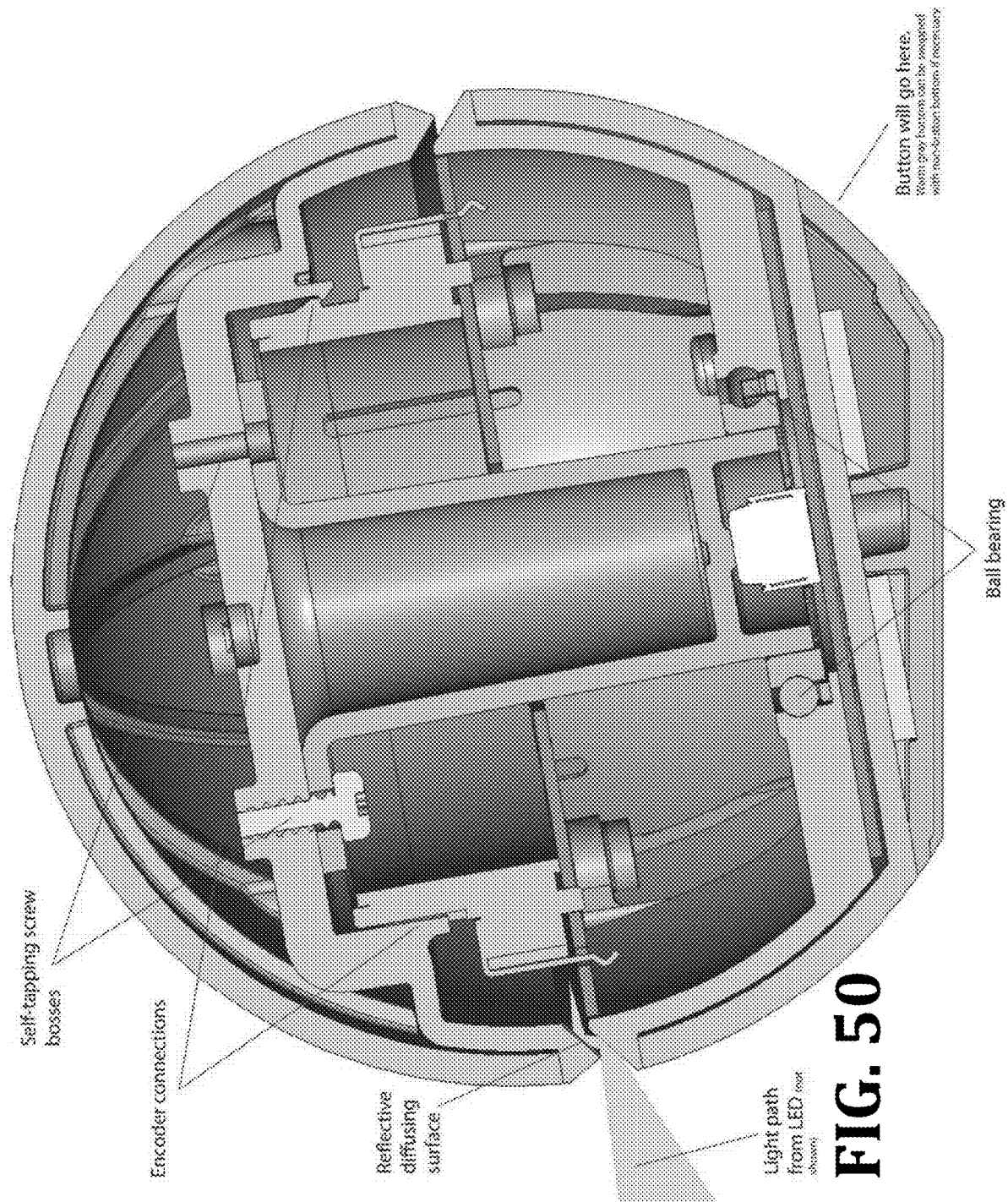
Figure 51:
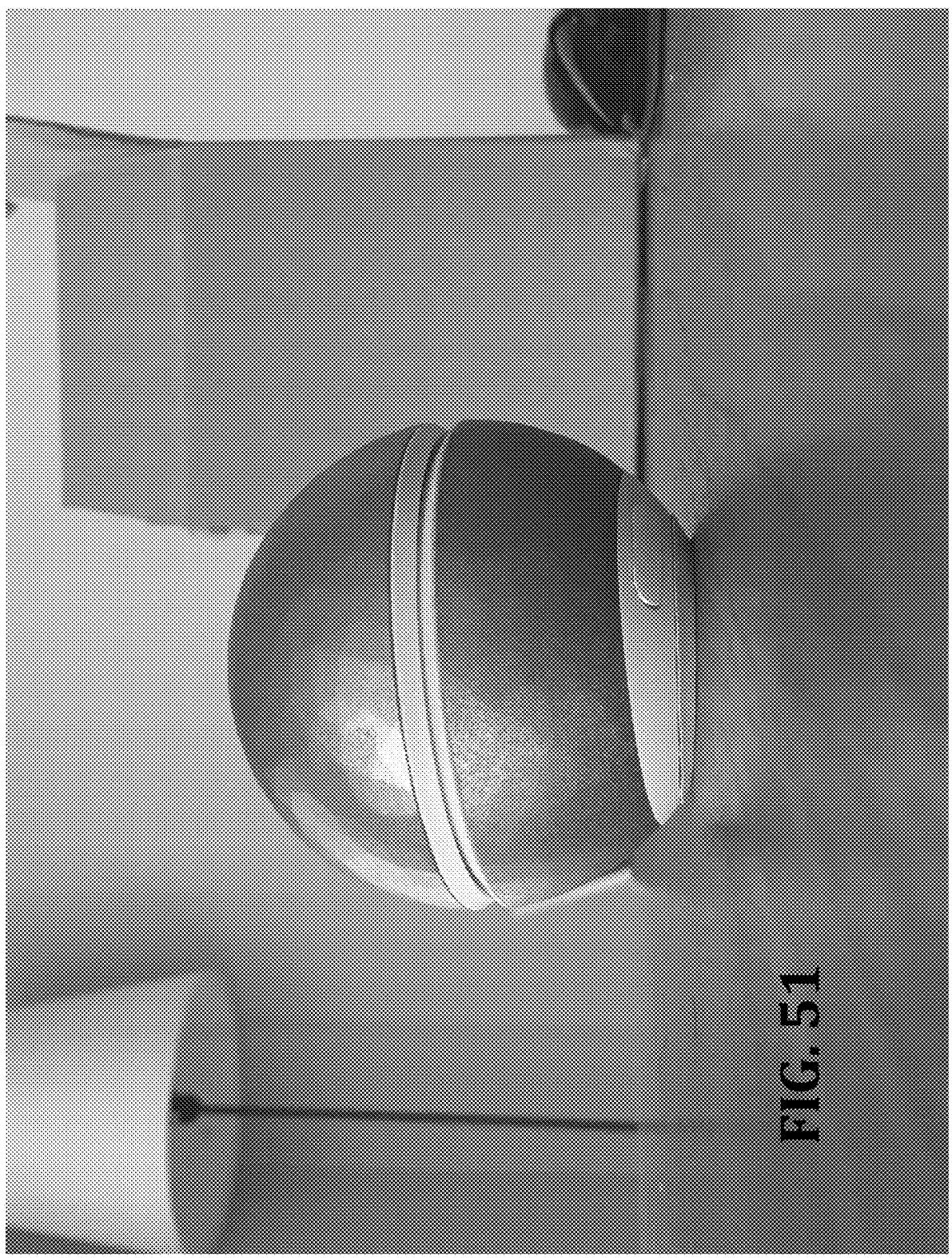
Figure 52:
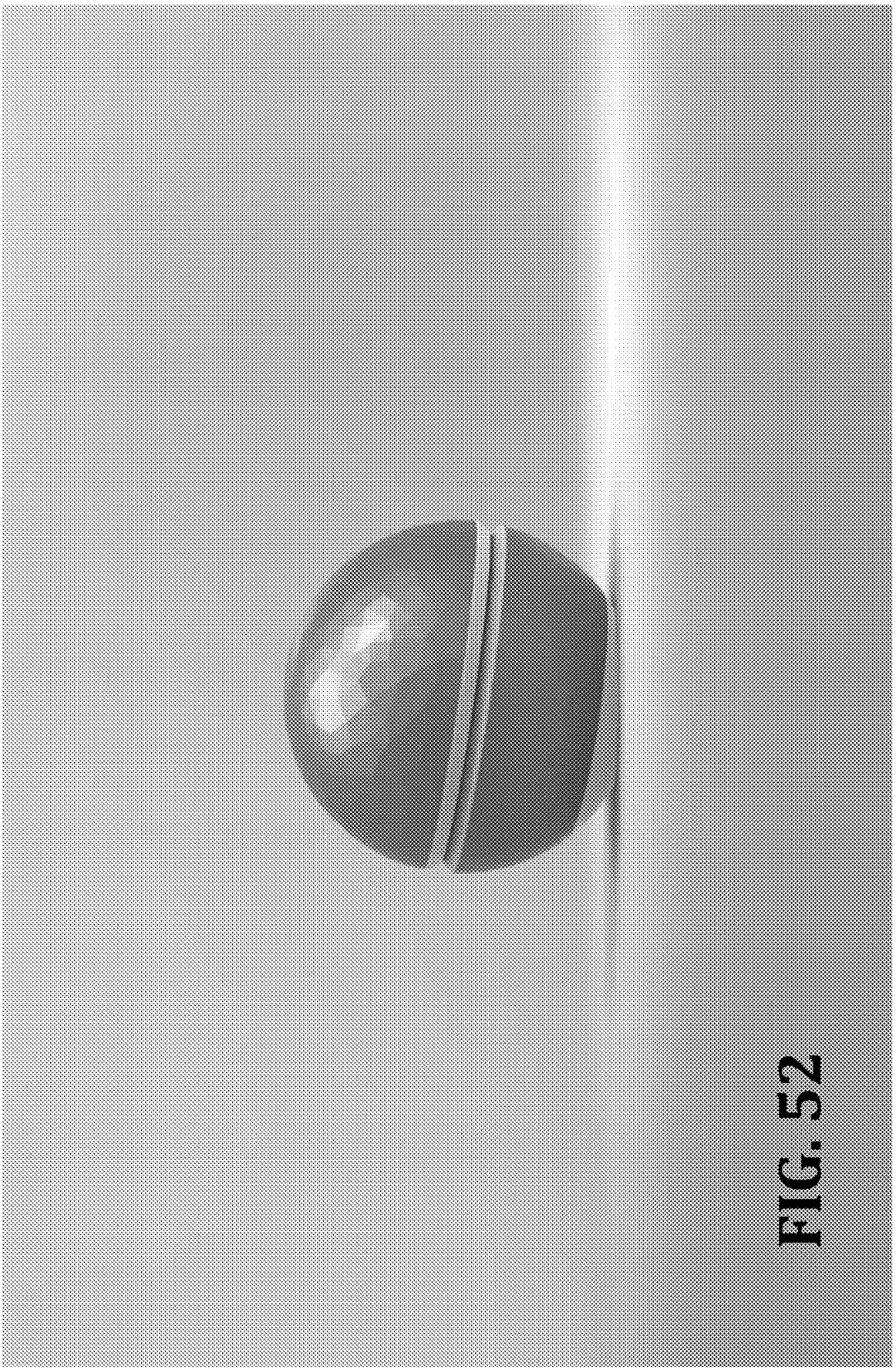
Figure 53:
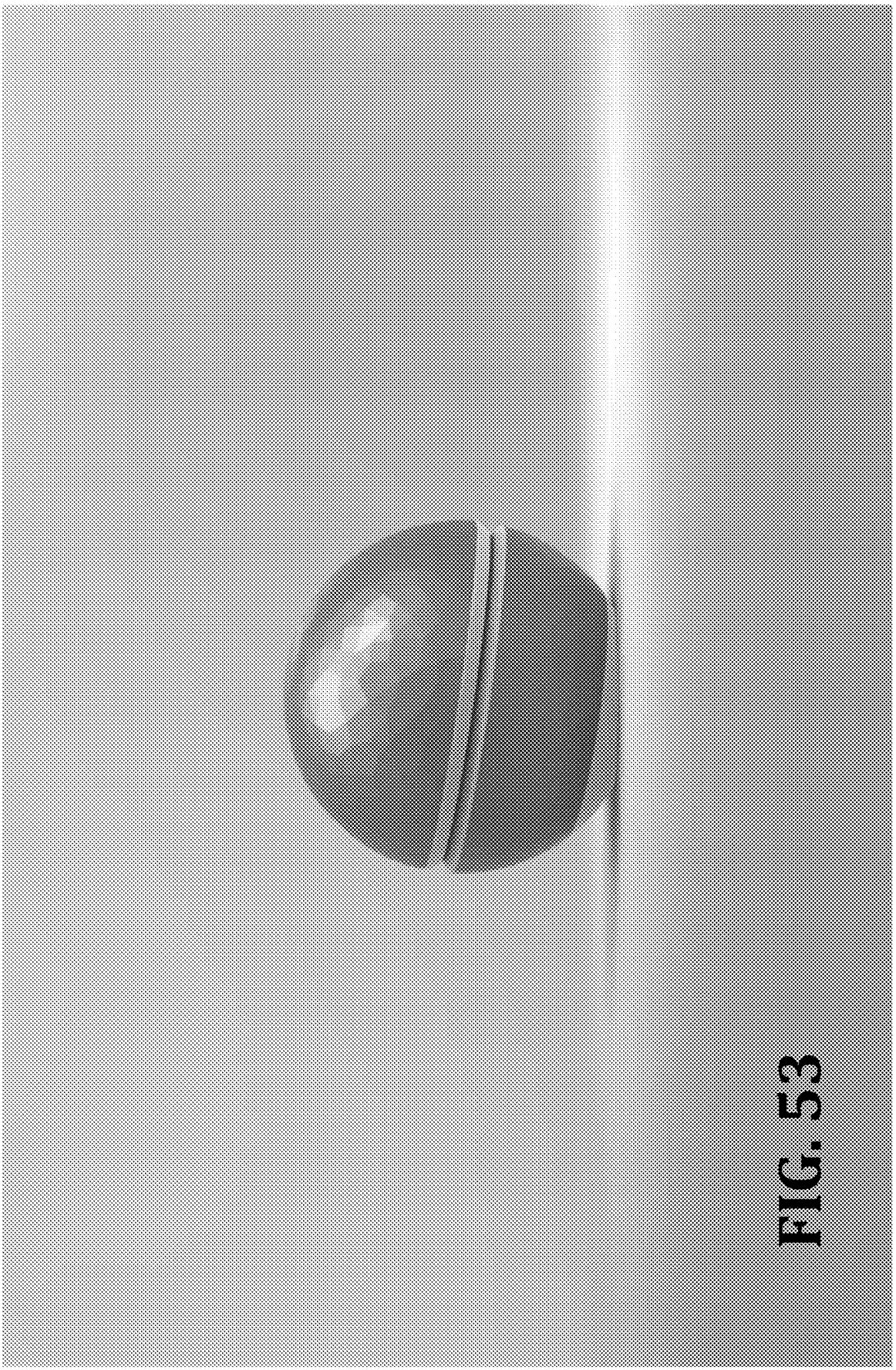
Figure 54:
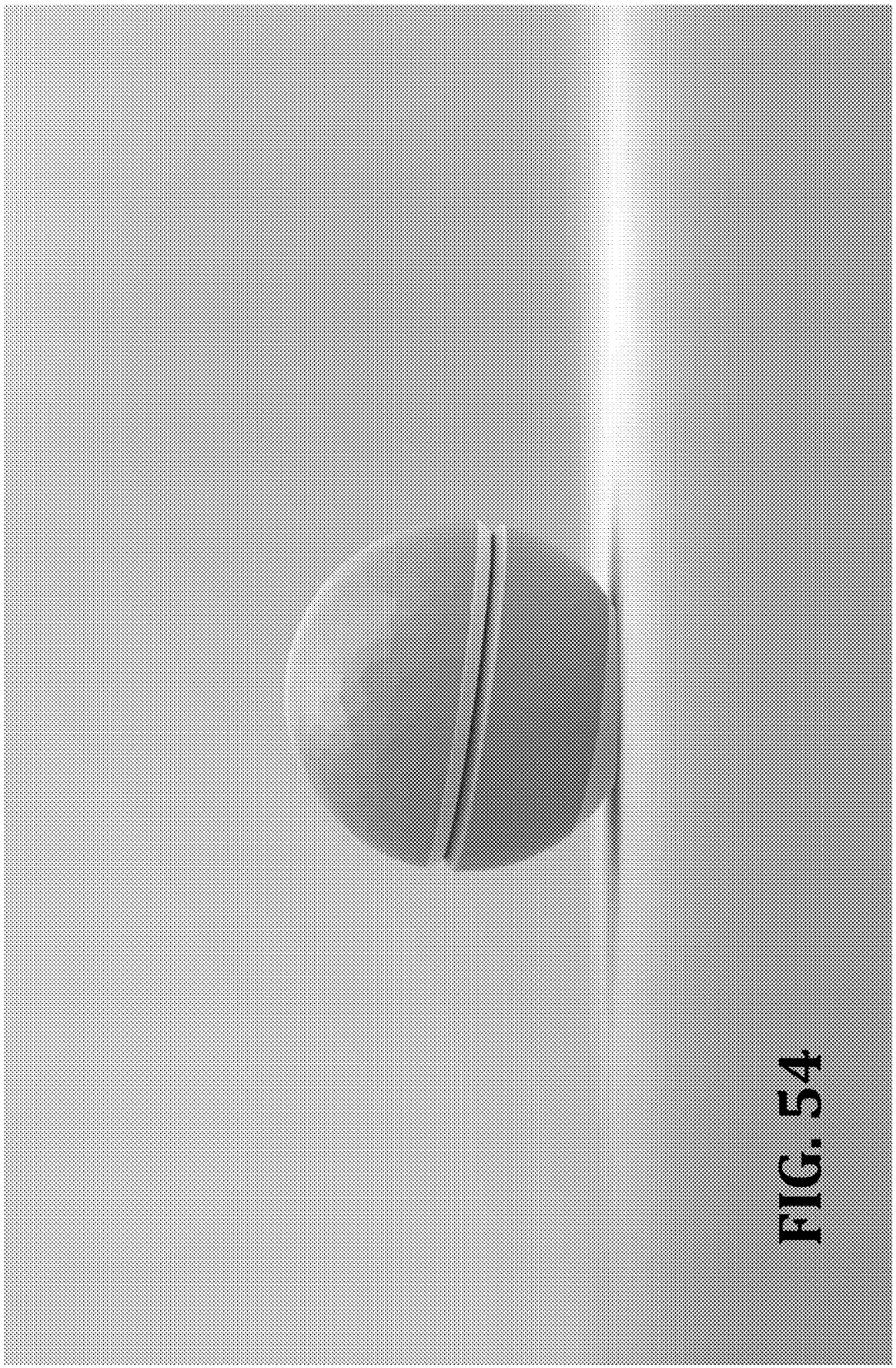
Figure 55:
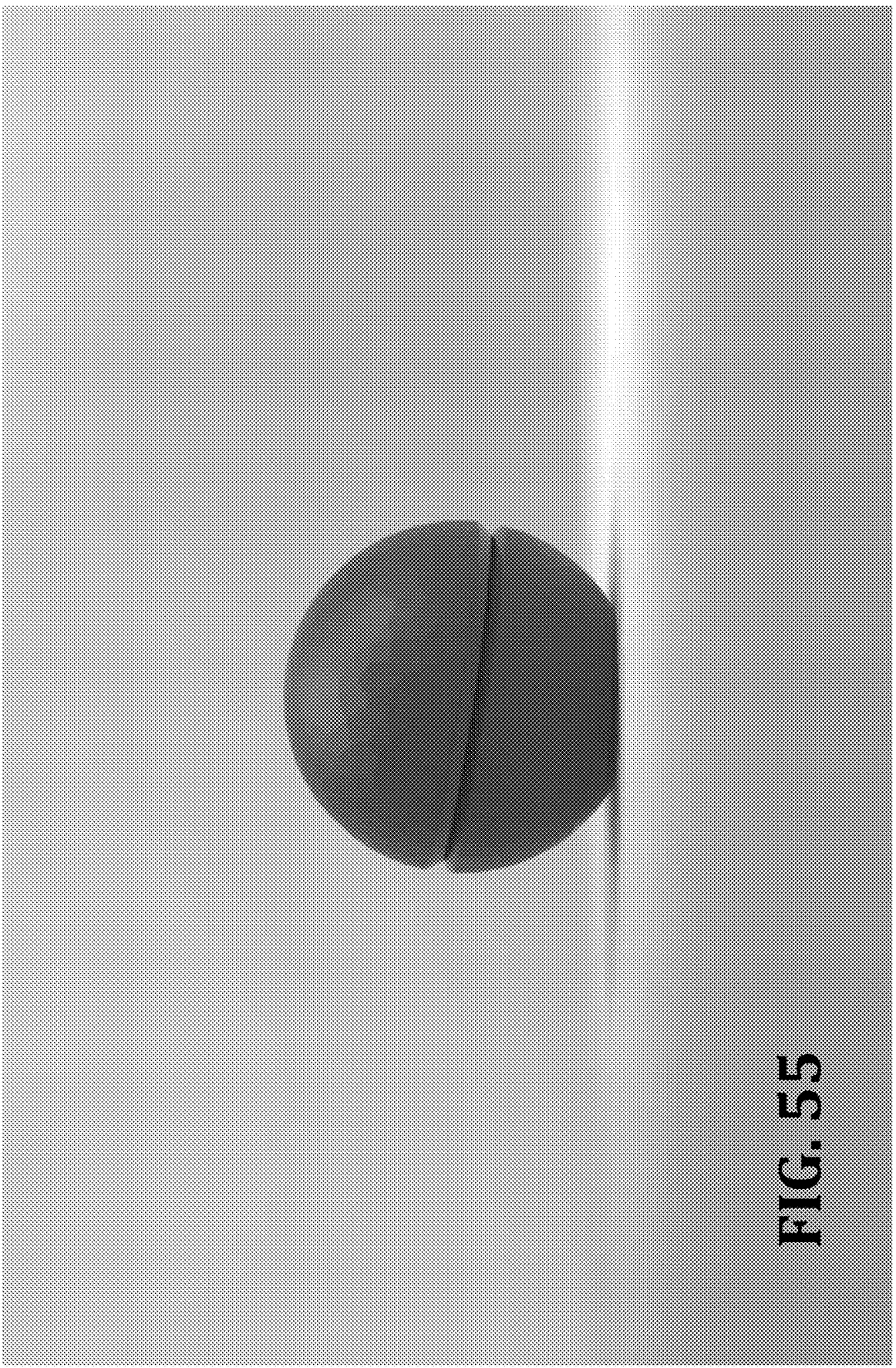
Figure 56:
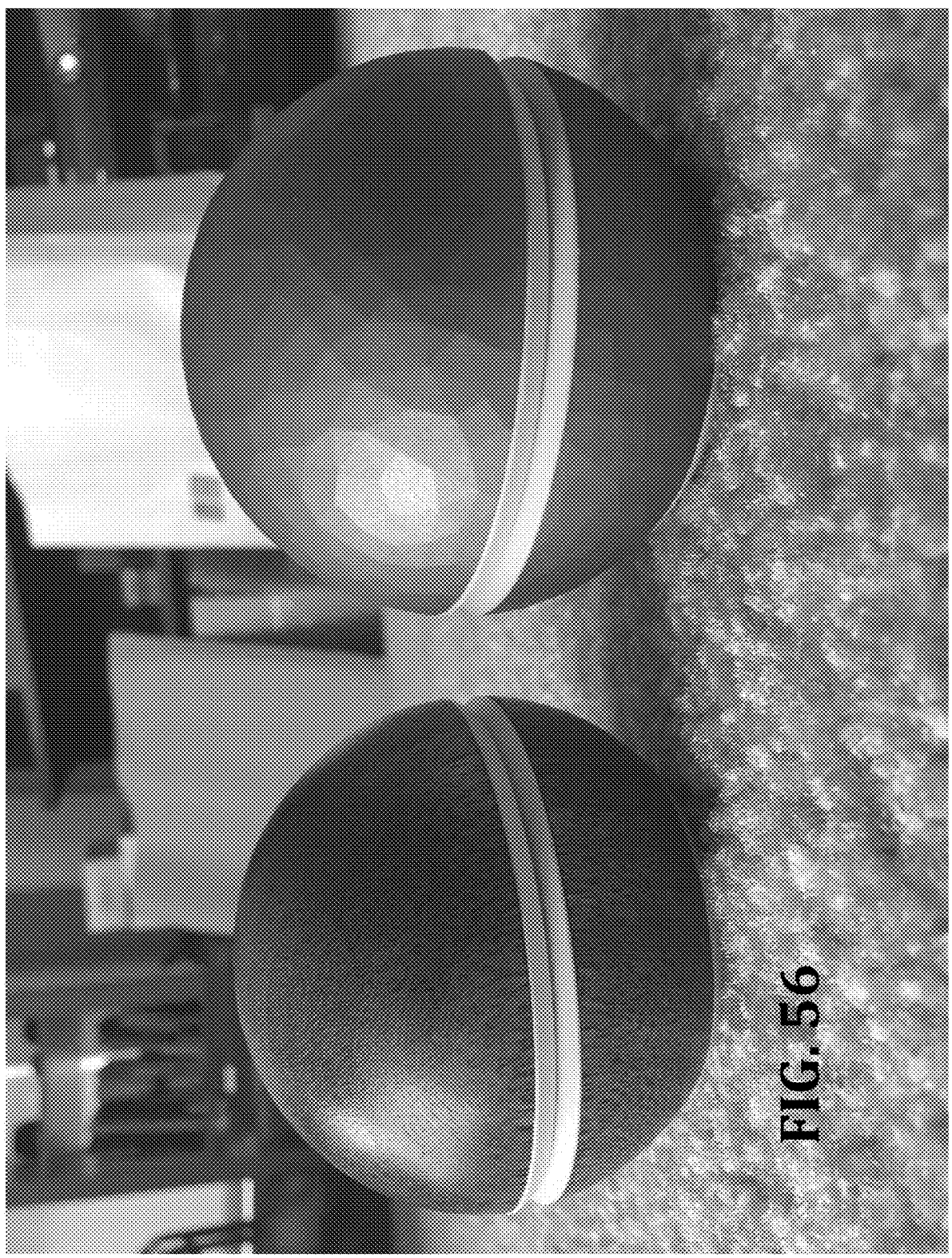
Figure 57:
Figure 58:
Figure 59:
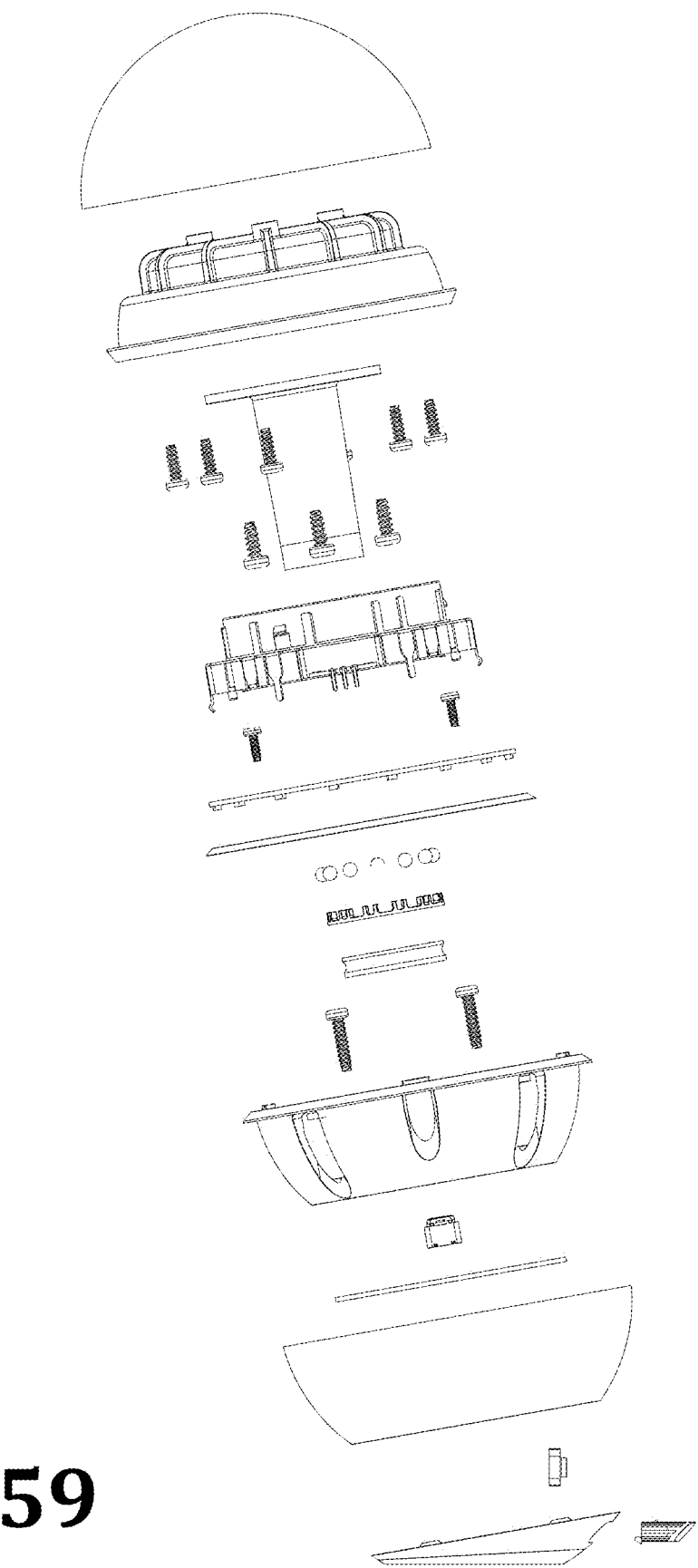
Figure 60:
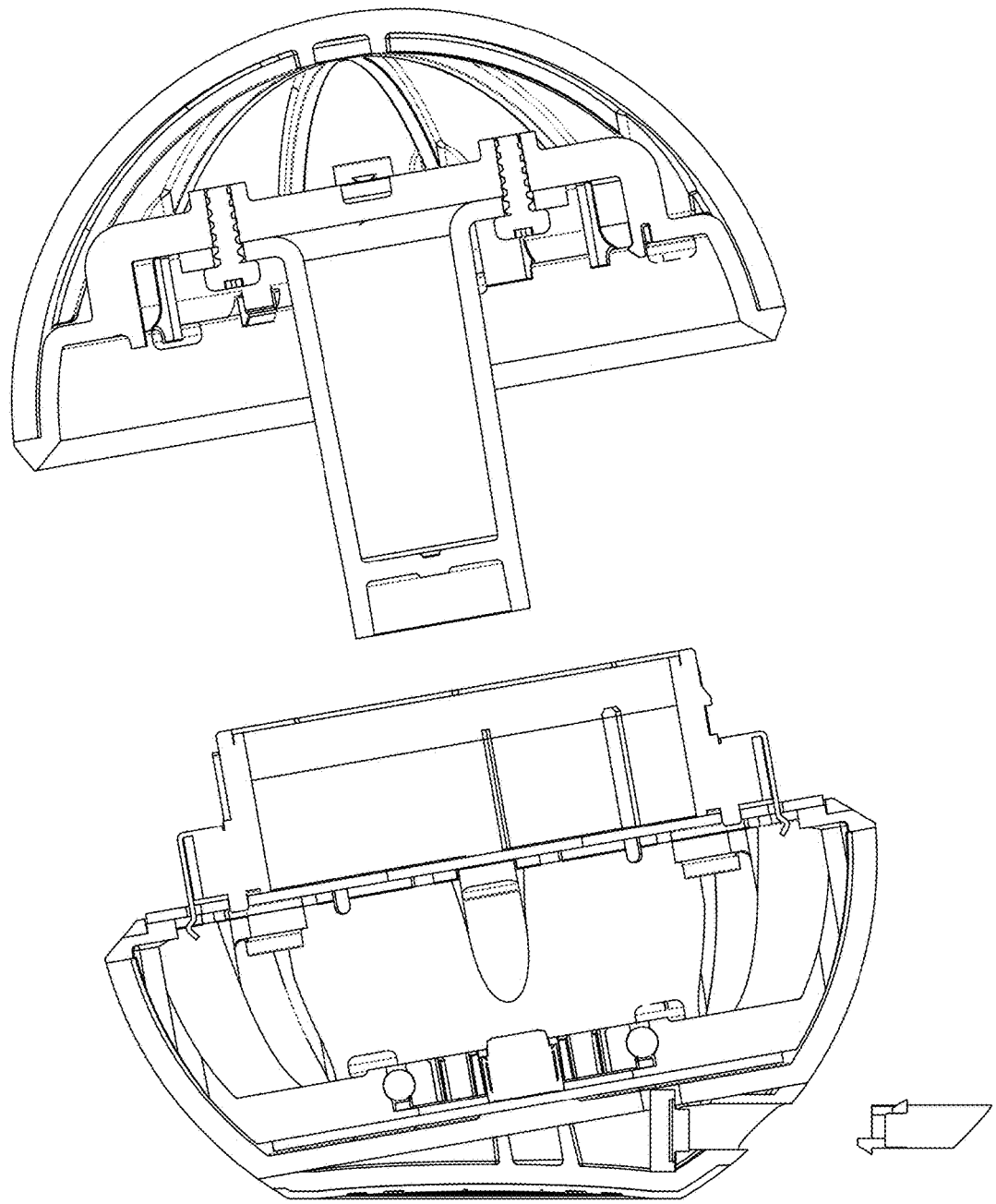
Figure 61:
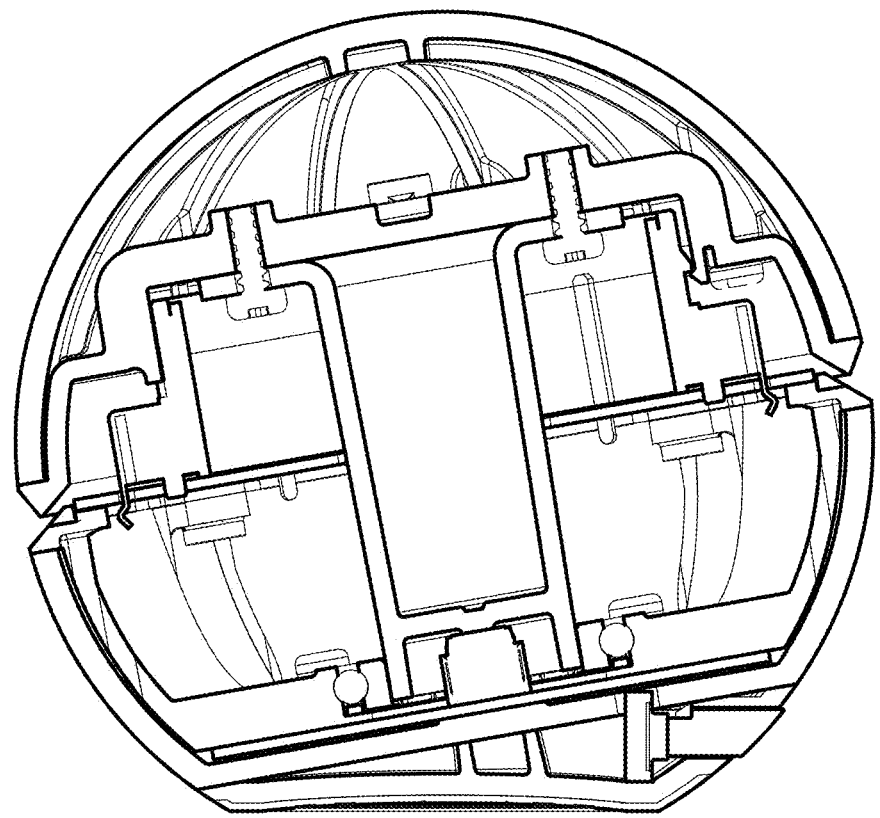

Channel switching is shown in FIGS. 43-44. The user may need to switch from one channel of content (e.g., the user's immediate family) to another channel (e.g., having distant relatives, or between other groups of types of photos). In this specification, switching between channels may be referred to as channel switching, and the user interface works efficiently with the input device to perform a switch between different groups of photos.

The virtual keyboard is shown in FIGS. 43 and 44 as Variation A and Variation B respectively. The virtual keyboard layout and system shown in FIGS. 43 and 44 are designed to work with the input device. Variations A and B accommodate the special needs of the input device, which can only move left or right by rotating counterclockwise or clockwise. Variations A and B make the letter input as stress-free as possible. The primary purpose of the virtual keyboard is for rare, one-time text input needs such as Wi-Fi password entry.

In FIG. 43, Variation A of the virtual keyboard is shown. FIG. 43 is a virtual keyboard layout and system designed to work with the input device. In FIG. 43, the keyboard is optimized for a 1-dimensional input device. A chart is provided when the user chooses the keyboard. The chart provides instructions for how to input letters, numbers, and other characters. The user inputs the password for the Wi-Fi by following the instructions. Selecting the up or down arrows shown in the keyboard moves the selected row either up or down. Arrows only appear for the row selected. Wrap-around is provided for both directions (left/right and up/down). In other words, if one keeps pressing the up arrow, the rows continue to move upward until eventually the first row sent up and off the display appears as the bottom row. Similarly, if one keeps pressing the down arrow, the rows continue to move downwards until eventually the first row sent down and off the display appears as the top row. Likewise, if one keeps pressing the left arrow, the columns continue to move left, and eventually the first row sent off the left side of the display appears as the column that is furthest to the right. Also, if one keeps pressing the right arrow, the columns continue to right and eventually the first row sent right and off the display appears as the column further to the left. The same direction arrows appear in a different row so that the user can keep pressing the input device to move to another row without changing position. Thus, rotation moves the highlight left or right, then the user pushes down on the top shell, activating the button to select the letter, number, or character that is highlighted, whereas selecting one of the arrows causes the rows of the virtual keyboard to move up and down. In the embodiment of FIG. 43, the arrows that move the rows up and the arrows that move the rows down are separated from one another by several characters.

FIG. 44 shows an alternative variation, Variation B, in which the up and down arrows are next to one another. Both the up arrows and down arrows may be selectable elements just like the characters, but selecting the arrow moves the curser/highlighter to another row and/or moves the rows up and down.

Alternatives and Extensions

The input device and system have been discussed using the example of a photograph application, however, the system can be used with any type of application, including but not limited to, gaming, art, internet searching, etc.

Further, each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A system comprising:

an input device including at least a body, the body having at least a rotatable top shell and a bottom shell, a combination of the top shell and bottom shell form a majority of a housing of the input device, the input device being a standalone device;

the rotatable top shell being depressably mounted above the bottom shell, so that there is a gap between the top shell and the bottom shell, when the top shell is not depressed, wherein the top shell is rotatably attached to the bottom shell, the gap being visible as a gap from an exterior of the input device when the input device is fully assembled and ready for operation;

one or more sensors that sense a rotational positioning of the top shell with respect to the bottom shell and produce a signal indicating the rotational positioning in response to sensing the rotational positioning; and one or more sensors that detects the depression of the top shell toward the bottom shell and produce a signal indicating the depression in response to detecting the depression; and a communication interface for sending communications to at least one external device that is external to the input device, the input device also being external to the external device, the communication interface sending the communications in response to receiving the signal indicating the rotational position and the communication interface sending the communications in response to receiving the signal indicating the depression; and a computer, which is a stick computer that is a handheld portable computer, the computer including at least a processor system including at least one processor;

a connector for plugging the computer into a display device;

a memory system storing program code on a nonvolatile machine readable medium, which when invoked-by the processor system of the computer, causes the computer to, in response to receiving, at the computer, a first signal indicative of a rotation of a component of an input device, produce a second signal, by the processor system of the computer, that is sent to the display device, the display device having a screen, and the second signal causes, via a graphical user interface that is associated with the computer, the display device to produce images of pictures moving on the screen of the display device, the images being content supplied by a user, each picture being retrieved from a local non-volatile memory system that stores the pictures, and the display device being a standalone device that is separate from the computer, the display device has a processor and runs the graphical user interface associated with the computer;

in response to receiving a third signal indicative of a depression of a component of the input device, the system producing, by the computer, a fourth signal that is sent to the display device and causes the display device produce a visual indication of a selection of an image;

receiving, at the computer, a signal indicative of the input device being turned upside-down position and back to a previous position, and in response to receiving the signal indicative of the input device being turned upside down, interpreting the signal indicative of the input device, by the computer, producing a signal that is sent to a display device and causing the display device to turn off.

2. A system comprising:

a computer, which is a stick computer that is a handheld portable computer, the computer including at least a processor system including at least one processor;

a connector for plugging the computer into a display device;

a memory system storing program code on a nonvolatile machine readable medium, which when invoked-by the processor system of the computer, causes the computer to, in response to receiving, at the computer, a first signal indicative of a rotation of a component of an input device, produce a second signal, by the processor system of the computer, that is sent to the display device, the display device having a screen, and the second signal causes, via a graphical user interface that is associated with the computer, the display device to produce images of pictures moving on the screen of the display device, the images being content supplied by a user, each picture being retrieved from a local non-volatile memory system that stores the pictures, and the display device being a standalone device that is separate from the computer, the display device has a processor and runs the graphical user interface associated with the computer;

in response to receiving a third signal indicative of a depression of a component of the input device, the system producing, by the computer, a fourth signal that is sent to the display device and causes the display device produce a visual indication of a selection of an image;

receiving, at the computer, a signal indicative of the input device being turned upside-down position and back to a previous position, and in response to receiving the signal indicative of the input device being turned upside down, interpreting the signal indicative of the input device, by the computer, producing a signal that is sent to a display device and causing the display device to turn off.

3. The system of claim 2 further comprising the input device, the input device including at least:

a body that forms an outer surface of the input device, the body having at least, a rotatable top shell that is an exterior surface that is part of a top portion of the outer surface; and a bottom shell that is an exterior surface that is part of a bottom portion the outer surface; the rotatable top shell being depressably mounted above the bottom shell, so that there is a gap between the top shell and the bottom shell, when the top shell is not depressed, the gap being a visible to gap in the outer surface, that is visible from outside of the input device; wherein the top shell is rotatably attached to the bottom shell; and one or more sensors that sense a rotational positioning of the top shell with respect to the bottom shell and produce a signal indicating the rotational positioning in response to sensing the rotational positioning, and one or more sensors that detect the depression of the top shell toward the bottom shell, and produce a signal indicating the depression in response to detecting the depression; and a communication interface for sending communications to the computer in response to the signal indicating the rotational positioning and for sending the communications in response to receiving the signal indicating the depression.

4. The system of claim 3, the computer further including a wireless communications interface for communicating wirelessly with the computer.

5. The system of claim 2, further as a result of the memory storing the program code which when invoked by the system causes the system to being configured to
cause the images of the pictures to move across the screen of the display device in a first translational direction in response to a signal from the input device indicating a rotation of a component of the input device in a first rotational direction; and
causing, by the system, the images of the pictures to move across the screen of the display device in a second translational direction in response to a signal from the input device indicating a rotation of the component of the input device in a second rotational direction.

6. The system of claim 5, the method further comprising, in response to signals indicating the component being held depressed toward another component for more than a predetermined amount of time, changing, by the system, a layout of the pictures on the screen from a first layout to a second layout.

7. The system of claim 6, the predetermined amount of time being equal to or greater than 500 ms.

8. The system of claim 5, the method further comprising, in response to signals indicating the depression of the component toward another component, changing, by the system, a layout of the pictures on the screen from a first layout to a second layout, where the first layout is a two dimensional layout and the second layout is a two dimensional layout that is different than the two dimensional layout of the first layout.

9. The system of claim 8, the method further comprising:
one of the first layout and the second layout displaying only one full picture at a time; and
a second one of the first layout and the second layout displaying multiple pictures simultaneously.

10. The system of claim 8, wherein one of the first layout and the second layout displays multiple groups of pictures simultaneously, where each group of pictures is organized into a rectangular block.

11. The system of claim 8, wherein one of the first layout and the second layout includes images of pictures organized in a tile pattern in which each tile is a picture and the tiles have a variety of sizes and shapes.

12. The system of claim 8, wherein the changing of the layout of the pictures on the screen from the first layout to the second layout includes;
at least continuously translating, by the system, the pictures from the locations for the pictures in the first layout to the locations of the pictures in the second layout, wherein the pictures visibly move along a series of positions between the locations of the first layout to the locations of the second layout while continuously translating, by the system, the pictures from the locations for the pictures in the first layout to the locations of the pictures in the second layout; and
continuously resizing, by the system, the pictures from the sizes for the pictures in the first layout to the sizes of the pictures in the second layout, wherein the pictures visibly assume a series of sizes between the sizes of the first layout to the sizes of the second layout while continuously resizing, by the system, the pictures from the sizes for the pictures in the first layout to the sizes of the pictures in the second layout.

13. The system of claim 12, wherein the second layout includes multiple pictures and the continuously resizing of the pictures includes for each picture randomly choosing, by the system, a size from a group of possible sizes.

14. The system of claim 13, wherein the resizing of the pictures further includes:
at least determining, by the system, an aspect ratio for the picture;
automatically choosing, by the system, a category of templates from a group of categories of templates, based on the aspect ratio of the picture, each category of templates including multiple templates of different sizes; and
automatically randomly choosing, by the system, a template within the category that was chosen, therein randomly choosing a size for the picture from a group of possible sizes, wherein each of the templates is a template for an individual picture.

15. The system of claim 13, wherein the resizing of the picture further includes:
randomly determining, by the system, an initial size for each picture; determining, by the system, a weight associated with the size of each picture;
for each picture, further adjusting, by the system, the size from the initial size based on the weight.

16. The system of claim 12, wherein the second layout includes multiple pictures and the changing of the layout of the pictures on the screen from the first layout to the second layout further includes at least:
determining, by the system, a location for each picture in the second layout;
determining, by the system, whether there is a gap in the second layout that has no picture, where the gap is greater than a predetermined threshold size; and
further resizing, by the system, one or more pictures that are adjacent to the gap to reduce the size of the gap.

17. The system of claim 2, further comprising a memory storing one or more computer instructions which when invoked by the system causes the system to implement the following method
causing, by the system, multiple pictures to be visible on the screen simultaneously;
causing, by the system, images of the pictures to move across the screen of the display device in a first translational direction in response to a signal from the input device indicating a rotation of a part of the input device in a first rotational direction, and
causing, by the system, the images of the pictures to move across the screen of the display device in a second translational direction in response to a signal from the input device indicating a rotation of the part of the input device in a second rotational direction;
causing, by the system, a current picture indication to appear in association with a first of the pictures indicating that the first picture is currently selected;
causing, by the system, a next picture indicator to appear in association with a second picture indicating that the second picture will be selected next if the current picture indicator is advanced forwards by one picture; and
causing, by the system, a previous picture indicator to appear in association with a third picture indicating that the third picture will be selected next if the current picture indicator is advanced backwards by one picture.

18. The system of claim 1, wherein the one or more sensors include at least one sensor that senses a circular motion of the input device by a user, the circular motion of the input device being independent of the circular motion of the top shell with respect to the bottom shell, and the at least one sensor produces a signal that indicates the circular motion of the input device in response to sensing the circular motion.

19. The system of claim 1, wherein the one or more sensors include at least one sensor that senses turning the input device upside-down, and the input device produces a signal in response to sensing the turning of the input device upside-down.

20. The system of claim 1, wherein the input device further comprises a microphone that receives a voice command from the user and produces a signal in response to receiving the voice command.

21. The system of claim 1, wherein the one or more sensors detect multiple degrees of depression of the top shell towards the bottom shell, and generates a different signal based on a degree of depression selected from the multiple degrees of depression.

22. A system of claim 12 wherein
the first layout and the second layout have a different number of images and changing from the first layout to the second layout includes one or more pictures moving continuously through a series of locations from a location in the first layout, via a border of the display area, to a location that is outside of the a display area in which the second layout is viewed.

23. The system of claim 2, wherein the method implemented when the one or more machine instructions are invoked, further comprises receiving, at the computer, a signal indicative of a circular motion of the input device, and producing a signal that is sent to the display device and causing the display device to produce a visual indication of switching multiple folders having images.

* * * * *